United States Patent
Ziemkiewicz et al.

(10) Patent No.: US 11,827,954 B2
(45) Date of Patent: Nov. 28, 2023

(54) RARE EARTH ENRICHMENT PROCESS BY CONTACTING RAW MATERIAL WITH A BASE AT SPECIFIC PH VALUES

(71) Applicant: West Virginia University Board of Governors on Behalf of West Virginia University, Morgantown, WV (US)

(72) Inventors: Paul F. Ziemkiewicz, Morgantown, WV (US); James Constant, Foster, WV (US); David K. Hoffman, Waltersburg, PA (US); John D. Quaranta, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 17/876,332

(22) Filed: Jul. 28, 2022

(65) Prior Publication Data

US 2023/0039988 A1    Feb. 9, 2023

Related U.S. Application Data

(60) Continuation of application No. 17/706,584, filed on Mar. 28, 2022, which is a continuation-in-part of application No. 17/115,128, filed on Dec. 8, 2020, which is a division of application No. 16/795,471, filed on Feb. 19, 2020, now Pat. No. 10,954,582.

(60) Provisional application No. 62/875,502, filed on Jul. 17, 2019.

(51) Int. Cl.
*C22B 3/00* (2006.01)
*C22B 3/06* (2006.01)
*C22B 3/20* (2006.01)
*C22B 59/00* (2006.01)

(52) U.S. Cl.
CPC ............... *C22B 3/065* (2013.01); *C22B 3/20* (2013.01); *C22B 59/00* (2013.01)

(58) Field of Classification Search
CPC .. C22B 3/06; C22B 3/065; C22B 3/20; C22B 3/22
See application file for complete search history.

(56) References Cited

U.S. PATENT DOCUMENTS

| | | | |
|---|---|---|---|
| 8,936,770 B2 | 1/2015 | Burba, III | |
| 9,890,441 B2 | 2/2018 | Pingitore, Jr. | |
| 9,982,320 B2 | 5/2018 | Liddell et al. | |
| 10,718,036 B2 * | 7/2020 | Hajiani | C22B 3/22 |
| 11,155,897 B2 | 10/2021 | Zhang et al. | |
| 11,186,895 B2 | 11/2021 | Werner et al. | |
| 2011/0309017 A1 | 12/2011 | Hassler et al. | |
| 2013/0153437 A1 | 6/2013 | Sandoval et al. | |
| 2015/0104361 A1 | 4/2015 | Boudreault et al. | |
| 2018/0371578 A1 | 12/2018 | Liddell et al. | |
| 2022/0064759 A1 | 3/2022 | Zhang et al. | |

FOREIGN PATENT DOCUMENTS

| | | | |
|---|---|---|---|
| WO | WO 2016/201558 | * | 12/2016 |
| WO | WO 2018/195642 | * | 11/2018 |
| WO | 2018/195642 A1 | | 1/2019 |

* cited by examiner

*Primary Examiner* — Steven J Bos
(74) *Attorney, Agent, or Firm* — Johnson, Marcou, Isaacs & Nix, LLC

(57) ABSTRACT

Disclosed herein are methods for preparing a hydraulic pre-concentrate enriched in rare earth elements and critical minerals, the method comprising: (a) contacting a raw material with a first base in an amount sufficient to adjust the pH to a value from about 4.0 to about 6.0, thereby forming a mixture comprising a first aqueous phase and a first solid concentrate; (b) separating the first aqueous phase from the first solid concentrate; (c) contacting the first aqueous phase with a second base in an amount sufficient to adjust the pH to a value from about 7.0 to about 9.0, thereby forming a mixture comprising a second aqueous phase and the hydraulic pre-concentrate; (d) removing the second aqueous phase and collecting the hydraulic pre-concentrate; wherein the raw material comprises rare earth elements; and wherein the hydraulic pre-concentrate is enriched in rare earth elements.

26 Claims, 32 Drawing Sheets

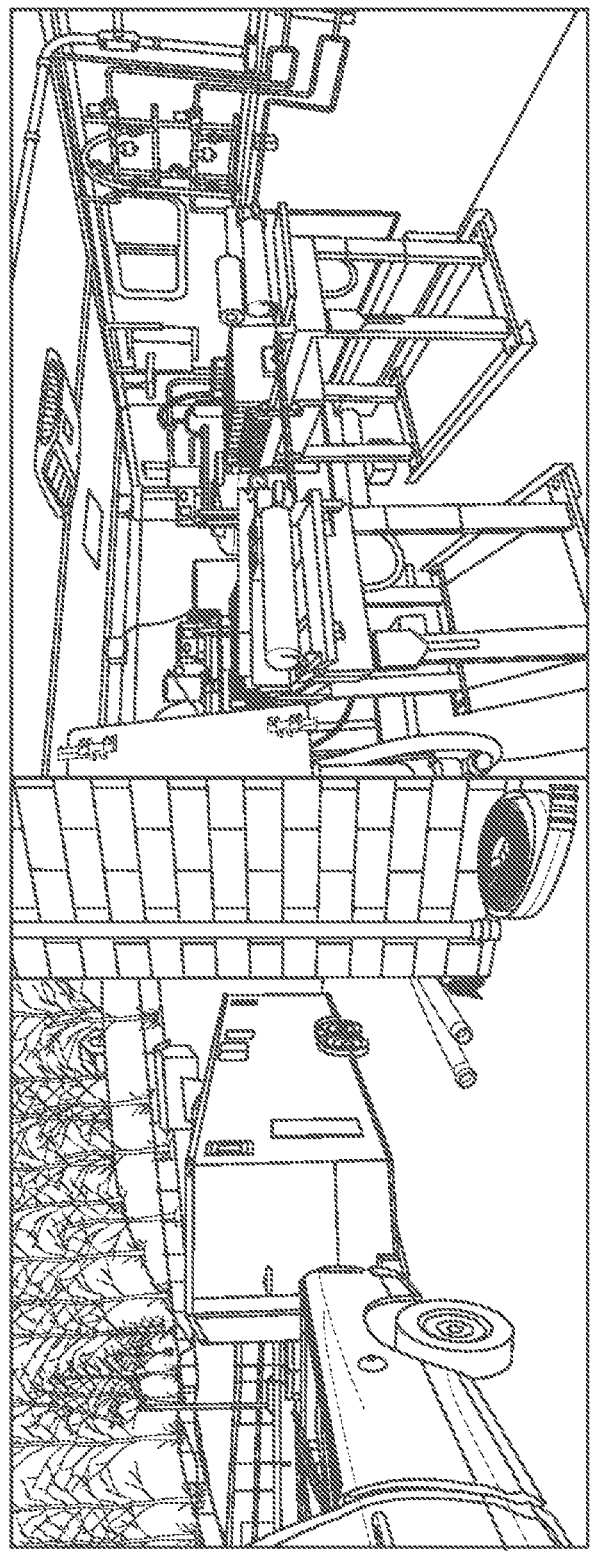

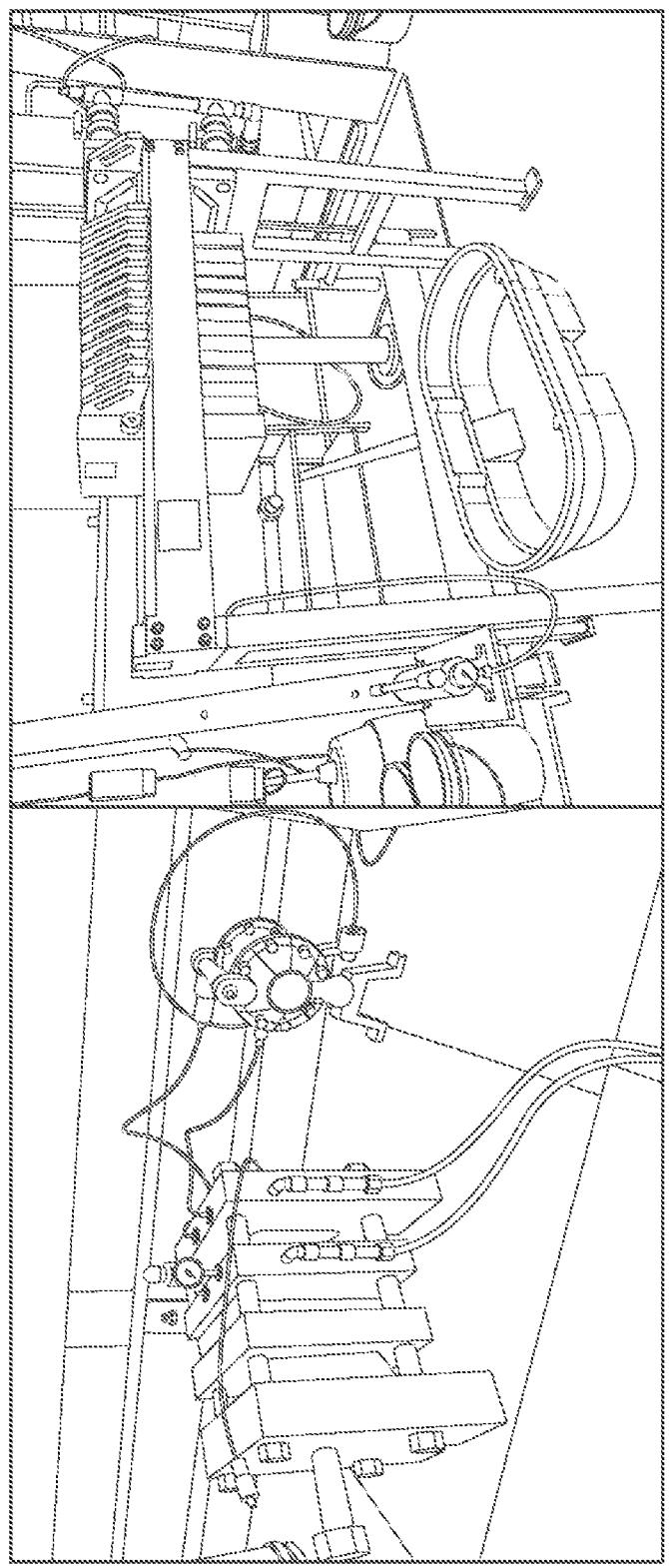

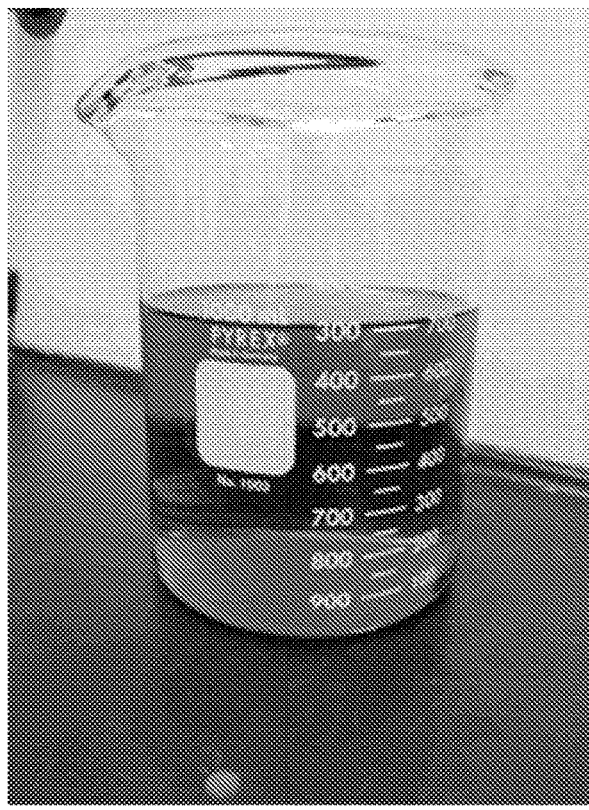 
FIG. 14A                                  FIG. 14B

RARE EARTH ENRICHMENT PROCESS BY CONTACTING RAW MATERIAL WITH A BASE AT SPECIFIC PH VALUES

CROSS-REFERENCE TO RELATED APPLICATIONS

This application is a continuation of U.S. application Ser. No. 17/706,584, filed on Mar. 28, 2022, which is a continuation-in-part of co-pending U.S. application Ser. No. 17/115,128, filed on Dec. 8, 2020, which is a continuation of and claims the benefit of U.S. application Ser. No. 16/795,471, filed on Feb. 19, 2020, which claims the benefit of U.S. Provisional Application No. 62/875,502, filed on Jul. 17, 2019, each of which is incorporated herein by reference in its entirety; and this application is also a continuation-in-part of co-pending U.S. application Ser. No. 17/627,484, filed on Jan. 14, 2022, a national stage application of International Application Serial No. PCT/US2020/042674, filed on Jul. 17, 2020, which claims the benefit of U.S. Provisional Application No. 62/875,502, filed on Jul. 17, 2019, and U.S. Utility application Ser. No. 16/795,471, filed Feb. 19, 2020, each of which is incorporated herein by reference in its entirety.

STATEMENT REGARDING FEDERALLY SPONSORED RESEARCH OR DEVELOPMENT

This invention was made with U.S. Government support under grant number DE-FE0031524 awarded by the U.S. Department of Energy. The U.S. government has certain rights in the invention.

BACKGROUND

Rare earth elements (REEs) are useful and necessary for the manufacture of batteries that power hybrid and electric vehicles, catalytic converters, computer memory, fluorescent lighting and lasers, smartphones and tablet computers, cameras including electronic components and lenses, e-readers, magnets, night-vision goggles, GPS and communications equipment, military applications including precision-guided weapons and vehicle armor, aircraft engines, personal protective equipment, and in other applications including defense applications. Some REEs can be used in air pollution control mechanisms, oil refineries, in medical diagnostic equipment such as, for example, X-ray and MRI machines, as phosphors, as catalysts, as components of ceramics and paints, and/or as polishing compounds. Although REEs and critical minerals (CM) can be extracted from many waste products and ores, few such resources are economically attractive. Due to current and possibly continuing export controls for REEs from China, it would be desirable to develop domestic sources of REEs.

Acid mine drainage (AMD) is a pollutant generated by coal and other mines and must be treated in compliance with federal and state clean water regulations to adjust pH and remove metal ions including iron, aluminum, and manganese. There are vast instances of acid mine drainage (AMD) in the northern, central, and southern Appalachian basins, as well as the Illinois coal basin and elsewhere in the U.S. Across the northern and central Appalachian Coal Basins, water pollution caused by AMD is the single greatest cause of stream impairment. Processes for treating AMD for regulatory compliance have been the subject of massive research and infrastructure investments since the early 1970s. It is estimated that, in the Appalachian states alone, more than 50 new, large AMD treatment plants will be installed in the next 10 years, in an effort to address increasing stream pollution. Although trace amounts of REEs are known to exist in AMD, a reliable method of concentrating and extracting them has not yet been developed.

Despite advances in the treatment of acid mine drainage, there is still a scarcity of methods that are able to recover REEs from AMD and that are environmentally sound, inexpensive, scalable, and able to be retrofitted to existing plants. Ideally, the method would produce insignificant amounts of naturally-occurring radioactive material and/or other noxious wastes as well as reducing stream pollution. Additionally, it would be desirable if the method could be adapted to extract REEs from other sources. It would also be advantageous for the process to operate continuously and without forming insoluble material such as, for example, aluminosilicate gels. It would further be desirable to have a domestic source of REEs. These needs and other needs are satisfied by the present disclosure.

SUMMARY

In accordance with the purpose(s) of the present disclosure, as embodied and broadly described herein, the disclosure, in one aspect, relates to a process for treating acid mine drainage to comply with Clean Water Act requirements while simultaneously recovering a high-grade rare earth concentrate suitable for extraction of commercially valuable rare earth oxides. In a further aspect, the high-grade rare earth preconcentrate is from about 0.1% to about 5% total rare earth elements ("REEs") on a dry weight basis. The disclosed processes may be a continuous process comprising discrete modules or steps as disclosed herein such that the discrete modules or steps are co-located at or near a site or source of acid mine discharge. In other aspects, the disclosed processes can be separated geographically and at different sites, e.g., one process module or site comprising disclosed methods may co-located at a site or source of acid mine discharge and produces a hydraulic pre-concentrate composition that is transported to a second module or site. The second module or site may comprise disclosed methods for utilizing the hydraulic pre-concentrate as a source material for production of a pregnant leach solution composition. The pregnant leach solution composition may then be transported to a third module or site comprising disclosed methods for utilizing the pregnant leach composition for production of one or more rare earth element oxides using solvent exchange methods. The one or more rare earth elements may be utilized at the third site for further processing to one or more reduced rare earth metal or a rare earth metal powder using disclosed methods. Alternatively, the one or more rare earth element oxides produced at the third module or site may be transported to a fourth module or site for further processing to one or more reduced rare earth metal or a rare earth metal powder using disclosed methods. Also disclosed herein is a method for processing the rare earth preconcentrate to generate a PLS that does not form gels or emulsions and that is suitable for processing via solvent extraction. In another aspect, disclosed herein is a system that includes a plant capable of carrying out the method disclosed herein. In yet another aspect, disclosed herein is a composition containing the REEs prepared by the disclosed process.

Disclosed herein are methods for preparing a hydraulic pre-concentrate enriched in rare earth elements and critical minerals, the method comprising: (a) contacting a raw material with a first base in an amount sufficient to adjust the pH to a value from about 4.0 to about 6.0, thereby forming a mixture comprising a first aqueous phase and a first solid concentrate; (b) separating the first aqueous phase from the first solid concentrate; (c) contacting the first aqueous phase with a second base in an amount sufficient to adjust the pH to a value from about 7.0 to about 9.0, thereby forming a mixture comprising a second aqueous phase and the hydraulic pre-concentrate; (d) removing the second aqueous phase and collecting the hydraulic pre-concentrate; wherein the raw material comprises rare earth elements; and wherein the hydraulic pre-concentrate is enriched in rare earth elements.

Also disclosed herein are methods for preparing a pregnant leach solution, the method comprising: transferring a disclosed first conditioned hydraulic pre-concentrate or a disclosed second conditioned hydraulic pre-concentrate to a mixing tank; and adding a first acid to the mixing tank in an amount sufficient to adjust the pH from about 2.0 to about 4.0, thereby forming the pregnant leach solution; wherein the first acid is mixed with the first conditioned hydraulic pre-concentrate or the second conditioned hydraulic pre-concentrate as the first acid is added.

Also disclosed herein are methods for preparing a pregnant leach solution, the method comprising: transferring a hydraulic pre-concentrate to a mixing tank; and adding a first acid to the mixing tank in an amount sufficient to adjust the pH from about 2.0 to about 4.0, thereby forming the pregnant leach solution; wherein the hydraulic pre-concentrate is enriched in rare earth elements compared to the rare earth elements concentration present in an acid mine discharge; and wherein the first acid is mixed with the hydraulic pre-concentrate as the first acid is added.

Also disclosed herein are methods for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises a disclosed hydraulic pre-concentrate, a disclosed pregnant leach solution, or combination thereof.

Also disclosed herein are methods for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises a hydraulic pre-concentrate, a pregnant leach solution, or combination thereof.

Also disclosed are hydraulic pre-concentrate compositions.

Also disclosed are hydraulic pre-concentrate compositions prepared by the disclosed methods.

Also disclosed are pregnant leach solution compositions.

Also disclosed are pregnant leach solution compositions prepared by the disclosed methods.

Also disclosed are rare earth element oxides.

Also disclosed are rare earth element oxides prepared by the disclosed methods.

Also disclosed are reduced rare earth element compositions or rare earth element powders.

Also disclosed are reduced rare earth element compositions or rare earth element powders prepared by the disclosed methods.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1B show a representative mobile Rare Earth Element/Critical Mineral (REE/CM) extraction unit at an Acid Mine Drainage (AMD) treatment plant useful in one aspect of the disclosure herein. FIG. 1A: trailer containing extraction unit. FIG. 1B: interior of trailer showing plate and frame filters (foreground) and mixing tanks (background).

FIG. 2A: example composition of Acid Mine Drainage (AMD) preconcentrate and oxide composition after processing through an Acid Leaching/Solvent Extraction (ALSX) process as disclosed herein. Not shown are elements making up less than 0.01% of the sample (i.e., Co, Mg, Mn, Ni). FIG. 2B: elemental distribution within the Mixed Rare Earth Oxide (MREO) fraction. Boxed element labels indicate critical minerals. Light Rare Earth Elements (LREE) (35.3%) are indicated by inset text, "LREE", adjacent to the element label, and HREE (64.7%) represent the balance. Sample was not acid washed prior to analysis.

FIG. 7A shows representative sensitivity analysis of maximum acid dose as a function of sludge feed grade. FIG. 7B shows representative sensitivity analysis of breakeven shipping distance as a function of feed grade and moisture.

FIGS. 13A-13B show representative components useful in the processes disclosed herein. FIG. 13A shows a 150 mm lab scale filter press; and FIG. 13B shows a 420 mm filter press.

FIGS. 14A-14B show photographic images of aspects of filtration of Pregnant Leach Solution (PLS). FIG. 14A shows a representative Pregnant Leach Solution (PLS) solution after filtration in plate and frame filters; and FIG. 14B shows a representative filter cake from cleaning a 2 ft$^3$ filter press used to process the Pregnant Leach Solution (PLS).

FIG. 25A shows steps 700-729 of a disclosed process for preparation of a Hydraulic Pre-Concentrate (HPC) and Pregnant Leach Solution (PLS). FIG. 25B a disclosed process for preparation of a Hydraulic Pre-Concentrate (HPC) and Pregnant Leach Solution (PLS) continuing step 729 in FIG. 25A to steps 750-742 of FIG. 25B.

FIG. 26A shows a representative disclosed process for processing of Acid Mine Drainage (AMD) through various subprocesses to preparation of a Pregnant Leach Solution (PLS) and storage of same in which primary and secondary cone tanks are utilized after clarifier #2 to dewater the hydraulic preconcentrate. FIG. 26B shows a representative disclosed process for processing of Acid Mine Drainage (AMD) through various subprocesses to preparation of a Pregnant Leach Solution (PLS) and storage of same in which geobags are utilized after clarifier #2 to dewater the hydraulic preconcentrate.

FIG. 27A shows a representative disclosed process for processing of Acid Mine Drainage (AMD) through various subprocesses to preparation of a Pregnant Leach Solution (PLS) and storage of same in which primary and secondary cone tanks are utilized after clarifier #2 to dewater the hydraulic preconcentrate in which the process of shown in FIG. 26A is subdivided into four subprocesses which may occur on four discrete sites labeled as Sites #1-4. FIG. 26B shows a representative disclosed process for processing of Acid Mine Drainage (AMD) through various subprocesses to preparation of a Pregnant Leach Solution (PLS) and storage of same in which geobags are utilized after clarifier #2 to dewater the hydraulic preconcentrate in which the process shown FIG. 26B is subdivided into four subprocesses which may occur on four discrete sites labeled as Sites #1-4.

Figure 2A:
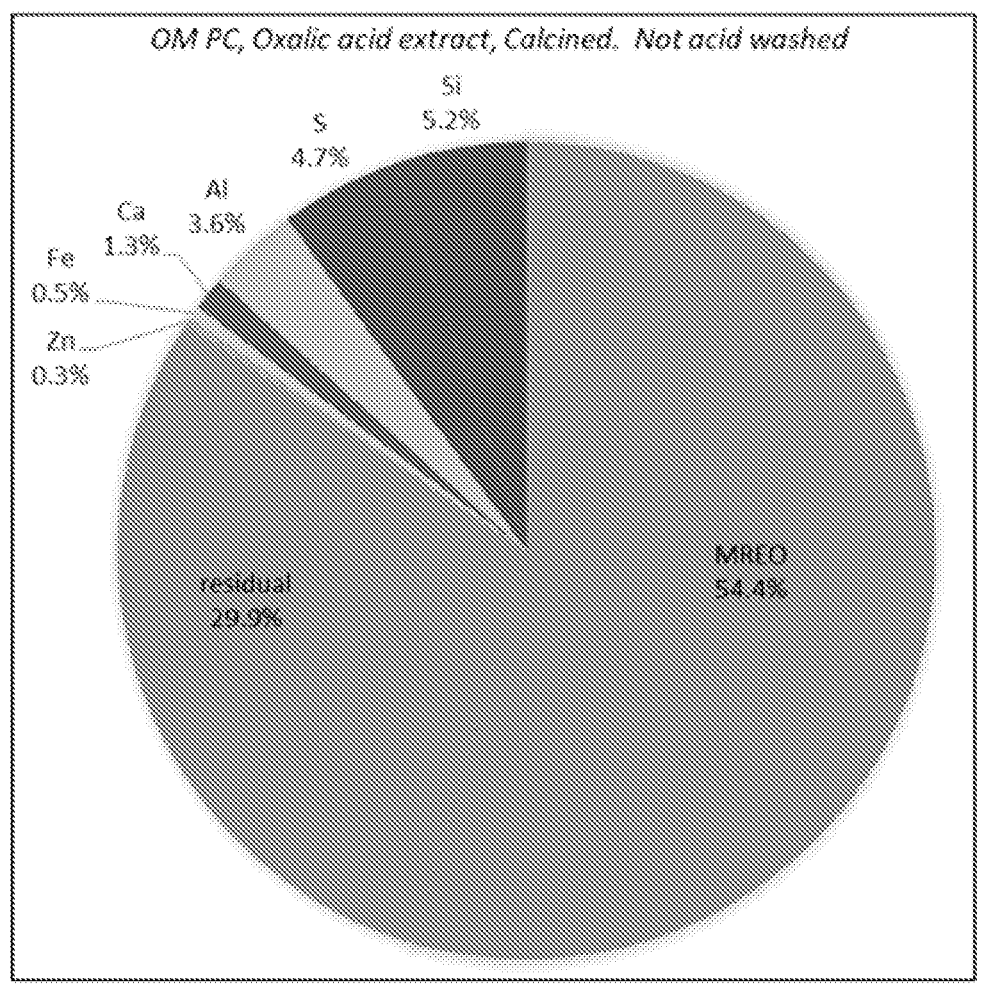
FIGS. 2A-2B show representative analysis of samples treated by the disclosed process.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a rare earth element" includes, but is not limited to, mixtures of two or more such rare earth elements, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a buffer refers to an amount that is sufficient to achieve the desired improvement in the property modulated by the formulation component, e.g. achieving and maintaining a desired solution pH. The specific level in terms of wt % in a composition required as an effective amount will depend upon a variety of factors including the amount and type of buffer, size of processing plant (i.e., bench top, mobile, or commercial scale), amount and type of feedstock being treated, and end use of the REEs recovered during the process.

As used herein, the terms "optional" or "optionally" means that the subsequently described event or circumstance can or cannot occur, and that the description includes instances where said event or circumstance occurs and instances where it does not.

As used herein, the term "rare earth element" (REE) is refers to a composition comprising one or more rare earth elements, including one or more of a lanthanide chemical element, i.e., lanthanum, cerium, praseodymium, neodymium, promethium, samarium, europium, gadolinium, terbium, dysprosium, holmium, erbium, thulium, ytterbium, lutetium. and can sometimes also include the elements scandium and yttrium. The elements scandium and yttrium often occur in the same ore deposits as lanthanides and also have some similar chemical properties. Rare earth elements are useful in a variety of applications in the electronics, defense, and medical industries, as well as in other applications. An oxide of a rare earth element is a "rare earth oxide" and can be used for analytical purposes or may be useful as a component of ceramics, catalysts, and/or coatings, among other uses. It is to be understood that when referencing rare earth elements that any of the elements can be present in a zero valence or elemental state, or in an ionized or valence state associated in the art with the individual element, and all forms are understood to be collectively included within the meaning of "rare earth elements". Moreover, it is to be understood that reference to any individual rare earth element, i.e., any one of lanthanum, cerium, praseodymium, neodymium, promethium, samarium, europium, gadolinium, terbium, dysprosium, holmium, erbium, thulium, ytterbium, lutetium, including scandium and yttrium, can be present in a zero valence or elemental state, or in an ionized or valence state associated in the art with the given element, and all forms are understood to be collectively included within the meaning of reference to said element. For example, reference to "lanthanum", "an element such as lanthanum", "a composition comprising lanthanum", and the like, it is understood that the reference inclusive any or all forms of lanthanum such as $La^0$, $La^{+1}$, $La^{+2}$, and $La^{+3}$. It is further understood that a reference to any given rare earth element is inclusive of all isotopic forms of the element.

As used herein, the terms "heavy rare earth elements" and "HREE" can be used interchangeably and refer to yttrium, gadolinium, terbium, dysprosium, holmium, erbium, thulium, ytterbium, and lutetium. It is to be understood that yttrium can be classified as a heavy rare earth element due to chemical properties and co-location with other HREEs in ores, but can also be yttrium is classified as a light rare earth element due to its lower atomic weight.

As used herein, the terms "light rare earth elements" and "LREE" can be used interchangeably and refer to scandium, lanthanum, cerium, praseodymium, neodymium, promethium, samarium, and europium. In some aspects, these designations may differ slightly but are generally based on atomic weight.

As used herein, the term "total rare earth elements" and "TREE" can be used interchangeably and refer the total REE present in a disclosed composition or product of a disclosed process, method, or device, wherein the REE comprises "Critical minerals" (CM) as used herein include minerals important to national security and the economy. REEs are considered critical minerals due to their numerous industrial uses. Other critical minerals may also be purified and concentrated using the disclosed process including, but not limited to, cobalt, gallium, germanium, hafnium, indium, niobium, rhenium, rubidium, tantalum, and tellurium.

As used herein, "gangue" metals and other materials are undesired materials that surround or are co-located with the REEs being isolated and concentrated by the disclosed process. In one aspect, in the present process, gangue material can include, but is not limited to, aluminum, calcium, magnesium, manganese, silicon, chloride, and the like. In some aspects, gangue materials may have little or no economic value. In other aspects, gangue materials may have industrial uses but their presence alongside more valuable REEs can complicate the recovery of the REEs.

"Acid mine drainage" (AMD) as used herein refers to acidic water that outflows from mines such as, for example, metal mines or coal mines. In one aspect, AMD intensifies in scale and scope when construction, mining, and other activities that disturb the earth occur in and around rocks containing sulfide minerals. AMD can have high concentrations of metal ions that can cause detrimental effects to aquatic environments, especially in combination with low pH. AMD from coal mines and other sources often contains trace amounts of REEs, as well. "Acid mine drainage" as understood within the definition herein can be aqueous effluent from mining operations, mill tailings, overburden from mining operations, excavations, acid process waste streams, seepages, and other aqueous flows having elevated levels of metal ions and/or anions. Acid mine drainage is characterized by the presence of metals such as iron, manganese, aluminum, cadmium, cobalt, copper, lead, magnesium, molybdenum, nickel, zinc, and others. Acid mine drainage may also include undesirable anions such as sulfate, fluoride, nitrate and chloride. As used in the present application, "mine" is understood to mean active, inactive or abandoned mining operations for removing minerals, metals, ores or coal from the earth. Environmental regulations promulgated by the Environmental Protection Agency under CAA, RCRA, and CERCLA, as well as those promulgated by state and local authorities, mandate that the concentration of certain minerals and metals in specific aqueous effluents be less than the established regulatory levels.

"AMD precipitate" (AMDp) as used herein refers to a byproduct of AMD treatment. In one aspect, AMDp contains REEs but may also contain gangue metals such as, for example, iron and aluminum. In one aspect, AMDp contains from about 0.06% to about 0.1% REE. As used herein, "enriched AMD precipitate" (eAMDp) refers to an AMD product having from about 0.1% to about 5% REE on a dry weight basis. In another aspect, eAMDp has a lower gangue metal content then AMDp.

A "feedstock" as used herein is a raw material processed to recover REEs and other valuable components (e.g., CMs). A feedstock may be too toxic to release into the natural environment and, in one aspect, the disclosed process can remove commercially valuable components from the feedstock while simultaneously rendering the feedstock suitable for environmental release.

As used herein, "pregnant leach solution" (PLS) is water with an acidic pH and a high metal content. In one aspect, PLS can be processed using several purification technologies including, but not limited to, solvent extraction, ion exchange resins, selective precipitation, and fractional crystallization to remove and/or concentrate the metals. In some aspects, PLS may have a high solids content and may require filtration prior to further processing.

"Raffinate," meanwhile, refers to a product of chemical separation, wherein one or more components have been removed. In one aspect, following solvent extraction as disclosed herein, raffinate is the aqueous component depleted in REE content. In another aspect, raffinate can include undesired gangue material.

As used herein, "GEOTUBE®" refers to a dewatering device made from a polypropylene fabric that can be produced according to the needs of a particular project or industry. In one aspect, sludge or other material to be separated is pumped into a GEOTUBE® container and a fabric liner keeps solids trapped inside while filtrate water escapes and can be directed to a treatment facility.

Unless otherwise specified, temperatures referred to herein are based on atmospheric pressure (i.e., one atmosphere).

Acronyms.

The following acronyms as follows are used herein throughout. It is understood that the fully written phrase or textual description can be used interchangeably with the acronym without changing the intended meaning.

ACRONYM BRIEF DESCRIPTION

AL Acid Leaching
ALSX Acid Leaching/Solvent Extraction
AMD Raw Acid Mine Drainage
AMDp Precipitate formed from AMD
CM Critical Minerals
HPC Hydraulic Pre-Concentrate
HREE Heavy Rare Earth Element
HREO Heavy Rare Earth Oxide
ICP-MS Inductively Coupled Plasma Mass Spectrometry
ICP-OES Inductively Coupled Plasma Optical Emission Spectrometry
LREE Light Rare Earth Elements
LREO Light Rare Earth Oxide
MREO Mixed Rare Earth Oxide
NPDES National Pollution Discharge Elimination System
OA Oxalic Acid
PC Pre-Concentrate
PLS Pregnant Leach Solution
PVDF Polyvinylidene fluoride
RE or REE Rare Earth or Rare Earth Element
REE/CM Rare Earth Element/Critical Mineral

ACRONYM BRIEF DESCRIPTION

REEF Rare Earth Extraction Facility
SX Solvent Extraction
WVU West Virginia University
WVDEP West Virginia Department of Environmental Protection Production of REE/CM from AMD—Multi-Modular Approach.

In various aspects, the present disclosure relates to the various modules or process components that can be utilized in geographical separated components to provide production of REE/CMs from an AMD feedstock material. Disclosed herein are various processes and methods for enrichment of REE/CMs from AMD, while at the same time removing materials deleterious or inhibitory to downstream processing steps.

The processing of AMD, as disclosed herein, can yield a HPC that is enriched in REE/CMs, and then further processed to a conditioned HPC. The HPC or conditioned HPC is in a form that can be easily transported to a site that may be geographically distant (or used on-site or facility proximal to the AMD site) for further process to provide a PLS. The PLS can be stored and then transported to a proximal production facility or geographically distant facility for further process and enrichment via solvent extraction, thereby yielding MREOs. Solvent extraction can be carried out by any means of solvent extraction known to the skilled artisan utilizing the disclosed PLS (e.g., see Xie, F., et al., "A critical review on solvent extraction of rare earths from aqueous solutions." Minerals Engineering 56 (2014) 10-28).

The MREOs can then be reduced to elemental rare earth metals. The present disclosure relates to each of these modules, which can be operated as discrete modules utilizing an input feedstock and providing an output material that can be used in a subsequent step. The present disclosure relates to each of these modules, processes or steps individually and linked to one another by utilizing the output material of one module or process as feedstock in the next module or process.

In various aspects, MREOs can be in the form of metal carboxylates, e.g., metal oxalates, which can be utilized in a module or process of reduction, e.g., as disclosed in U.S. Pat. Publ. No. US 2020/0047256, which is incorporated herein in its entirety as relates to manufacture of fine metal powders from metal carboxylate compounds such as metal oxalate compounds.

In a further aspect, MREOs can be utilized in an electrowinning or electrolytic process, e.g., a molten salt electrolysis process (for example, see Chamber, M. F. and Murphy, F. E. "Molten Salt Electrolysis of Neodymium from a Chloride Electrolyte." *The Minerals, Metals and Materials Society* (1988): 369-376; Krishnamurthy, N., and C. K. Gupta. "Rare Earth Metals and Alloys by Electrolytic Methods." *Mineral Processing and Extractive Metallurgy Review* 22.4 (2002): 477-507; and Siming, Pang, Yen Homer Shih Hung, Li Zongan, Chen Dehong, XuliHai, and Zhao Bin. "Preparation of Molten Salt Electrolysis of Rare Earth Metals and Their Alloys Technology Progress." *Chinese Journal of Rare Metals* 35.3 (2011): 440-50; each of which is incorporated herein). Alternatively, a metallothermic reduction process can also be utilized to further process MREOs.

Figure 25A:
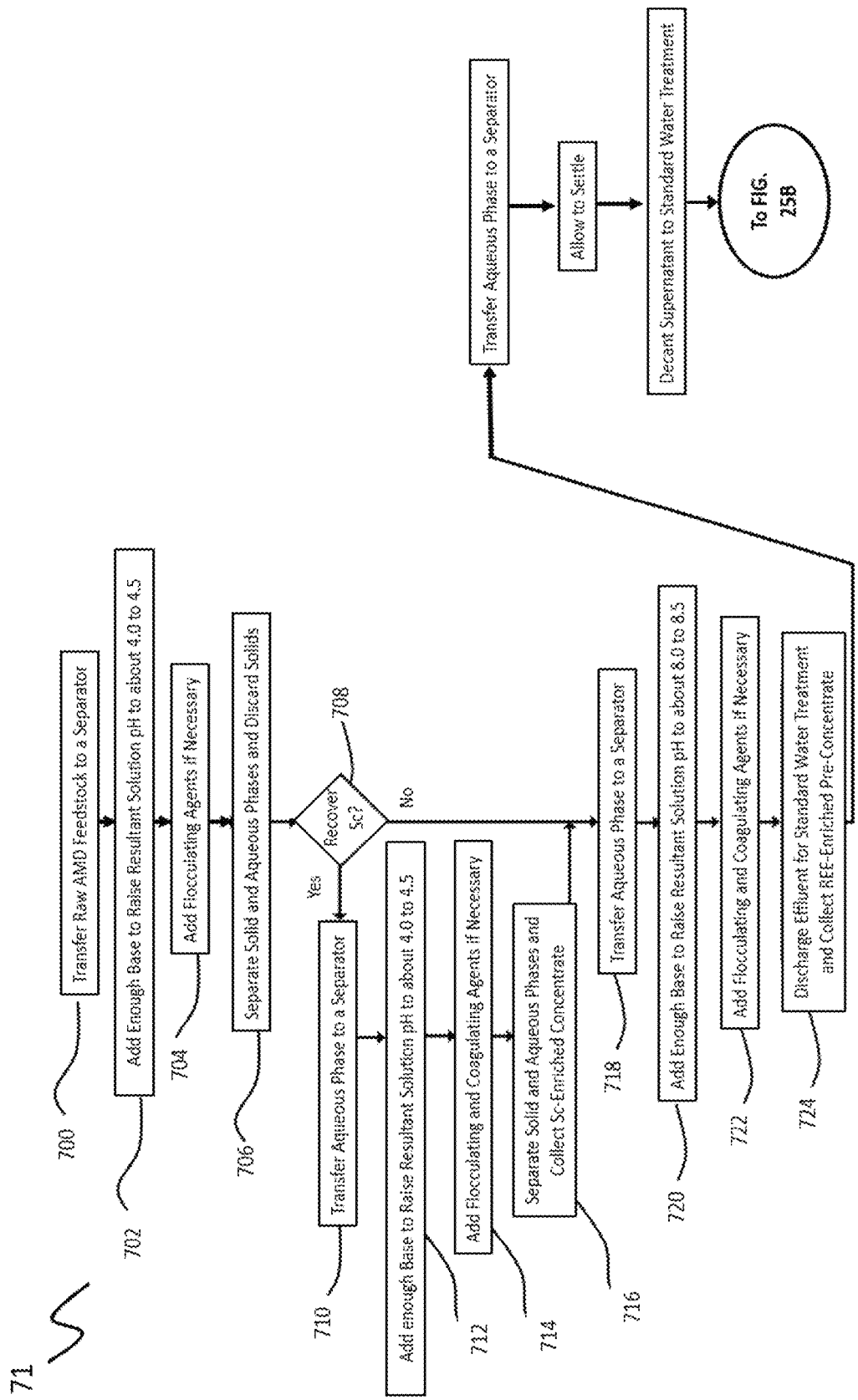
FIGS. 25A-25B show a flow chart of a disclosed process for preparation of a hydraulic preconcentrate Hydraulic Pre-Concentrate (HPC) and Pregnant Leach Solution (PLS).
Figure 25B:
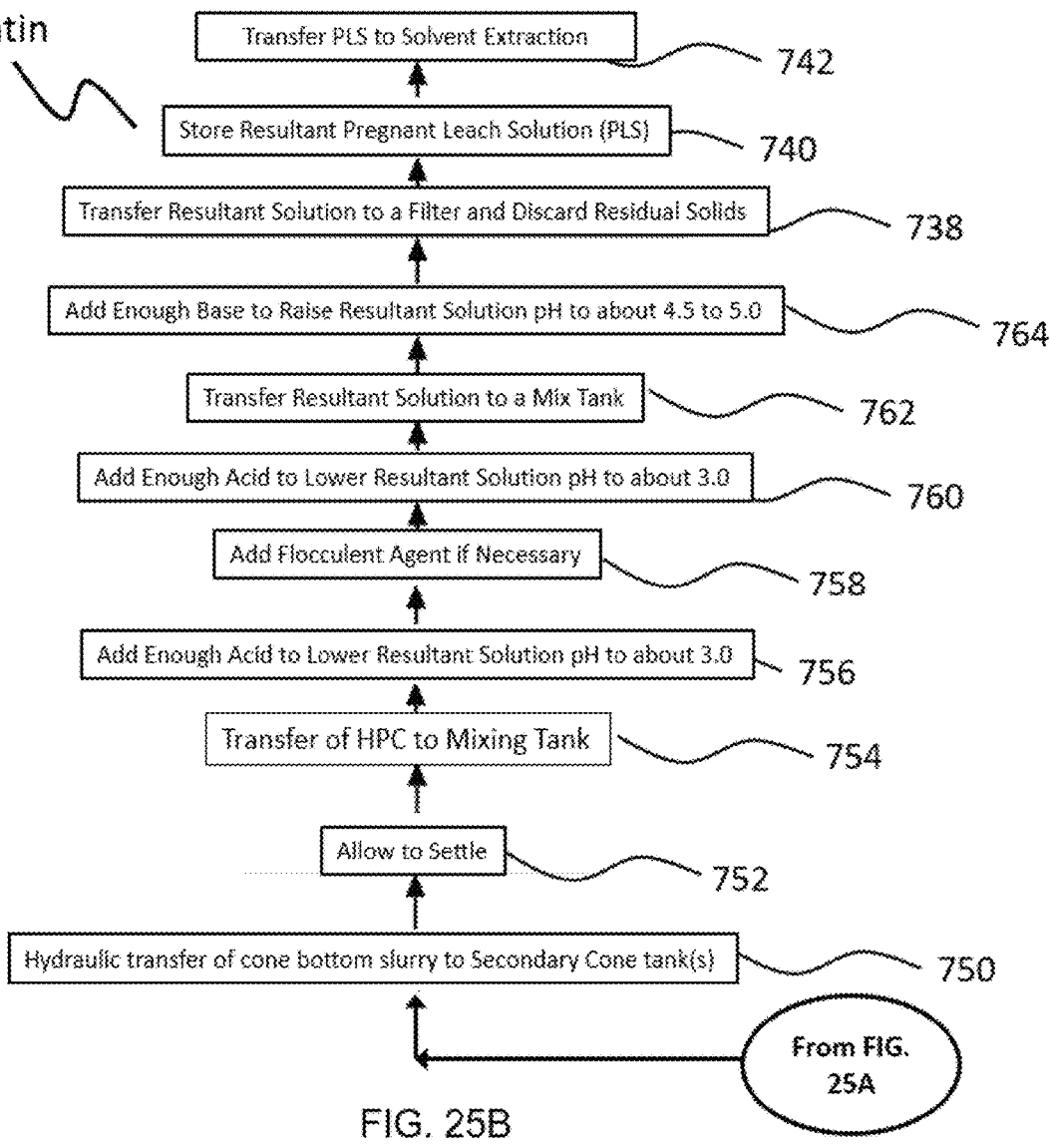
Figure 26A:
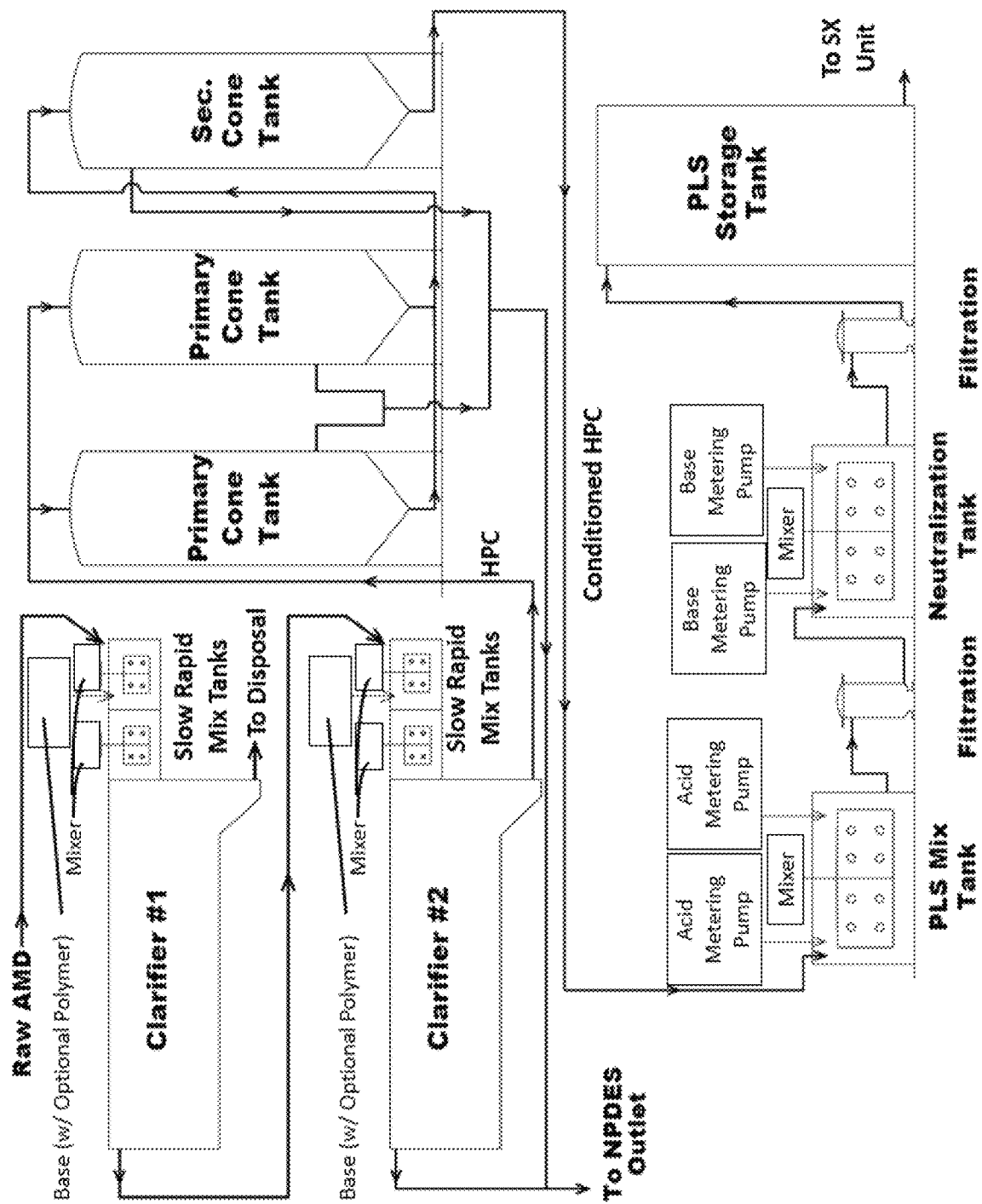
FIGS. 26A-26B show representative disclosed processes for processing of Acid Mine Drainage (AMD) through various subprocesses to preparation of a Pregnant Leach Solution (PLS) and storage of same.
Figure 26B:
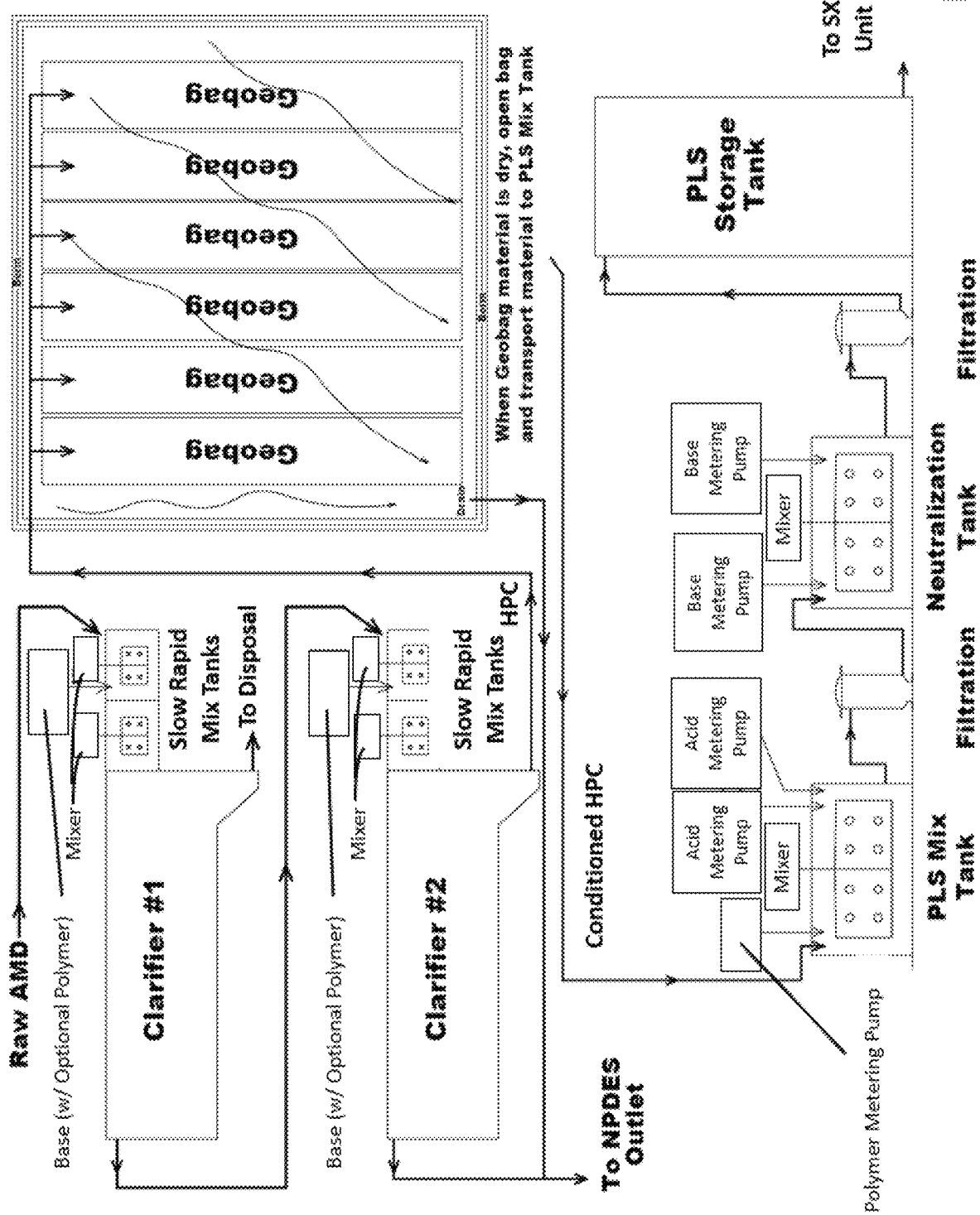
Figure 27A:
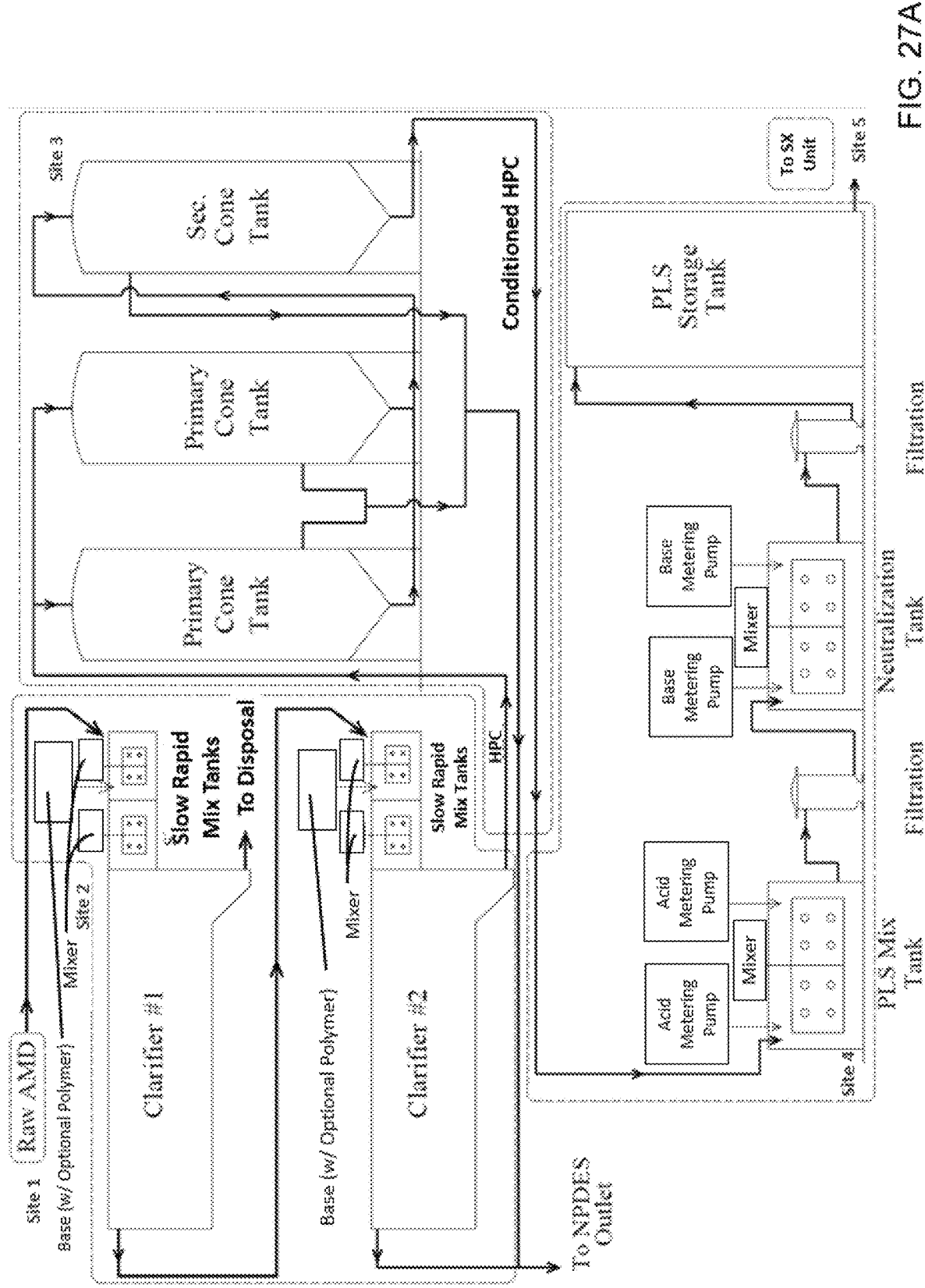
FIGS. 27A-27B show the show representative disclosed processes for processing of Acid Mine Drainage (AMD through various subprocesses to preparation of a Pregnant Leach Solution (PLS) and storage of same from FIGS. 26A-26B that have been segregated into subprocesses as shown herein FIGS. 27A-27B.

It should be noted that FIGS. 26A-26B show diagrams of an apparently integrated system that may occur on a single site or at discrete locations within a single site. However, the various steps discretely described in FIGS. 25A-25B, and shown diagrammatically in FIGS. 26A-26B, can be aggregated into subsystems or subprocesses to form separable production sites and subprocesses. In one aspect, the overall process diagrammatically shown in FIG. 26A is shown as four separate sub-processes in FIG. 27A labeled as Sites

Figure 27B:
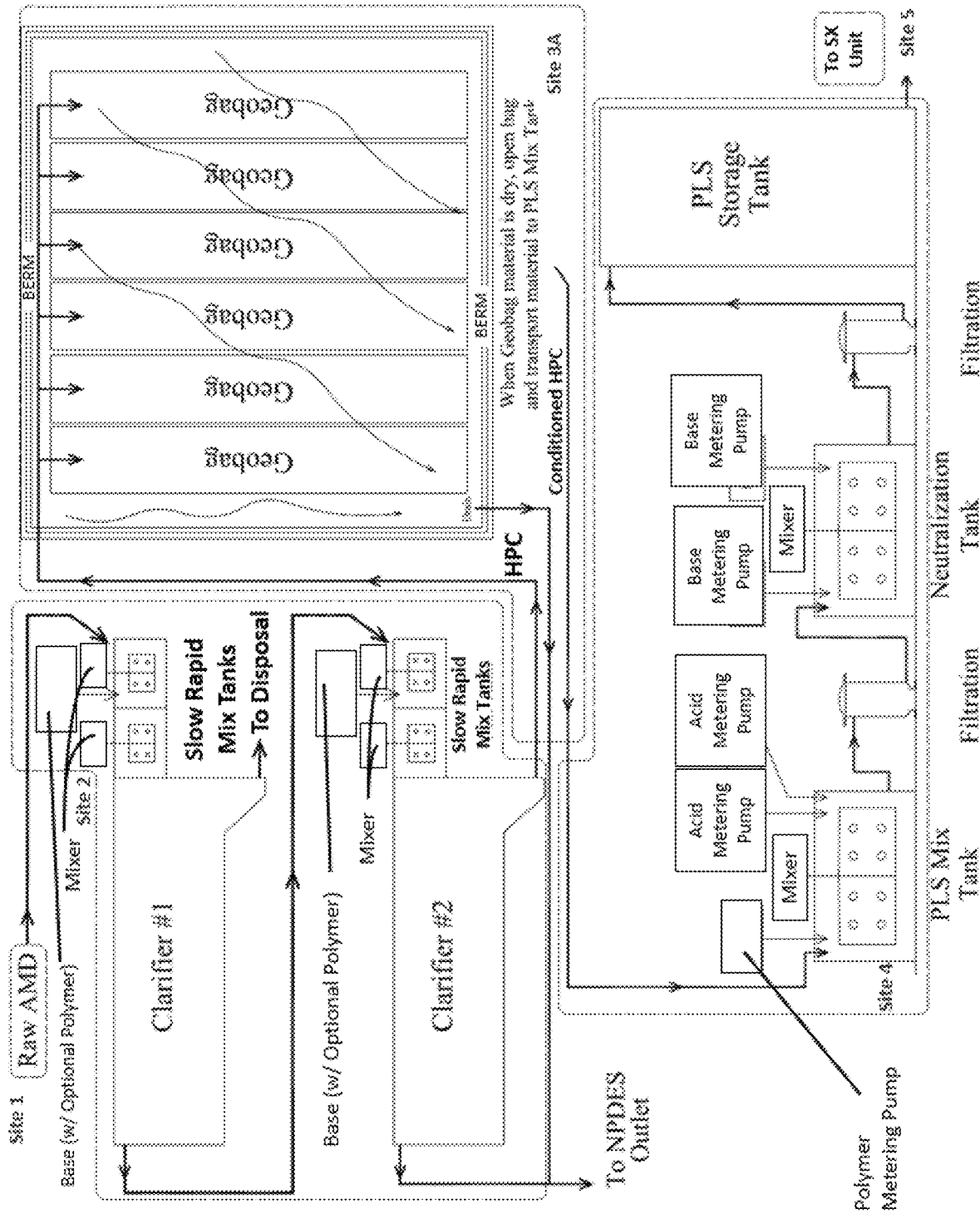

1-4. It is understood that Site #1 may be operated discretely in a location distinct from Sites #2-4, and the output of Site #1 transported for use at Site #2. Similarly, the output of the steps comprising Site #2 may be transported to a discrete Site #3. In a further aspect, the overall process diagrammatically shown in FIG. 26B is shown as four separate sub-processes in FIG. 27B labeled as Sites #1-4.

In various aspects, Site #1 (AMD localization) is a location that the REE Elements and Critical Materials are contained in the AMD that emanates from or on the ground (mine site, seep area, mine portal). This liquid can be treated at the location, can be pumped/piped to a treatment site, or hauled (drum, tanker truck, railcar, or other transportation means) to the next process at Site #2.

In a further aspect, Site #2 (Neutralization Facility—Preconcentrate Generation) can be located at or near Site #1 where the AMD liquid is pH adjusted up (base addition) to separate the gangue materials from the REE/CMs with at least two individual pH set points. The pH adjustments can be initiated at or near Site #1 or can be done distally from Site #1. These pH adjustments can be accomplished in rectangular or circular clarifiers or other apparatuses such as thickeners. Site #2 can encompass at least two clarifiers noted as Clarifier #1 and Clarifier #2. Clarifier #1 can produce a sludge (gangue) at the first pH set point. The solid material is separated from the liquid via gravity. This unit can have a polymer flocculant added to facilitate the gathering of the created solids which helps the solids materials to fall to the bottom in a timely manner. Clarifier #2 is fed additional base material to raise the pH set point of the influent supernatant from Clarifier #1. This pH adjustment takes the REE's and CM materials and creates a PC for the REE's and CM's to be concentrated and processed. Polymer flocculant may be added to help gather the PC in to large floc particles which aids in gravity settling. The supernatant water is released to the environment as clean treated water. The solid visible material contains the REE and CM product. This material can be gathered and delivered to Site #3. The solid material is the HPC.

In a further aspect, Site #3 (HPC Conditioning) receives material from Site #2. Site #3 can be located at or near Site #2 or can be transported to site 3 by drums, trucks or pumps/pipelines. Material in this step is conditioned by dewatering to increase the percent solids of the HPC. Dewatering can be completed by gravity settling in a series of cone bottom tanks or by placing the HPC in geobags. As discussed above, in an aspect, the HPC material can be placed in a primary conditioning cone tank. This will separate the solids from the liquids over a short period of time (approx. 1 hour). The supernatant can be drawn off the tank(s) with the liquid reporting for discharge from the site as clean water. The conditioned HPC material from the multiple primary tanks can be combined in a secondary conditioning tank(s) and the supernatant removal process repeated. The process increases the % solids of the HPC. The material can be transported to Site #4 via drum(s), tanker truck(s) or pump/pipeline. Alternatively, as discussed above, the HPC material from Site #2 is placed into a number of geobags. The geobag allows the water to decant through the designed bag leaving the HPC solids retained in the geobag. The geobags allow the material to continue to decant thus increasing the HPC % solids over time. When the material dries to an acceptable percent solids for future processing, the bag is cut open and the material transported to Site #4. The material can be transported in drums, roll off containers or trucks.

In a further aspect, Site #4 (PLS (Acid Leaching) Generation) can be at or near Site #3 or can be at a different location. The material from Site #3 is placed in the PLS tank to be acid leached. Acid is added to the material as it is being placed in the tank. A mixer is utilized to make a homogeneous product. When the product is mixed sufficiently, the mixer is stopped and a polymer flocculant is added to allow the residuals to settle. The initial liquid PLS material is drawn off the tank, filtered and placed in the neutralization tank for further processing. A base is added while mixing. Upon sufficient mixing, a polymer flocculant is added to expedite the residual settling. The supernatant (PLS) is drawn from the tank and placed in a tank. This tank could consist of tanks, drums, trucks, or pipeline for further processing through the Solvent Extraction process (Site #5).

As discussed herein throughout, following or concomitant with various pH adjustment steps, a flocculent or coagulant may optionally be included in the process. That is, the disclosed processes contemplate further use of polymer chemical type additives to flocculate aqueous effluents described herein. In some instances, the flocculent can be a polymer flocculant, e.g., a cationic emulsion polymer, having a medium charge density range of from about 40% to about 60%, a linear structure, and a medium molecular weight. Suitable cation emulsion polymer flocculants can have a specific gravity of from about 1.02 to 1.07 and an average non-volatile solids concentration between 30 to 45%. The bulk pH range of such cationic emulsion polymers can be from about 6 to about 8 and a viscosity of between about 1000 to about 3000 (cps). In use, the cationic emulsion polymer can be injected into the first stage effluent at a concentration range of 1 ppm to 40 ppm, and with a target resident reaction time of about 4 to 15 minutes.

In various aspects, raw, untreated, AMD can be conveyed to a treatment unit which includes a base chemical addition (hydrated lime solution) to adjust the water up to between 4.0 and 5.0 pH. The treatment unit can be a pond or a fabricated unit (round or rectangular shaped) that allows time to settle the particles via gravity after the base addition. Mechanical or chemical oxidization steps can be included to convert all ferrous ions to ferric (if needed). The oxidation process can be done with aeration (natural or mechanical) or chemical additions such as hydrogen peroxide. The raw water can be collected in a pond or other structure. The raw water can be brought to the plant and initial treatment can occur in a rapid mix tank where the base addition (such as hydrated lime or caustic soda solution) and polymer flocculent (optionally provided as appropriate for flocculation) is added. A rapid mixing device can be used to mix the base material with the raw water in order to obtain pH homogeneity. For example, this can be done mechanically with a paddle mixer or a tank eductor under pump pressure and volume. The water can enter a slow mix tank to allow particles to coagulate, thereby allowing flocked particles to grow in size and aiding settling of the solids. If a polymer flocculent is utilized, it is recommended that the specific polymer flocculent be jar tested on the specific water to be treated. The fluid from the slow mix tank can be introduced to a first clarifier, or alternatively, a settlement basin or another means of separating the liquid and solid fractions via gravity may be utilized, e.g., geobags as disclosed herein. Over a suitable period of time, particles settle to the bottom of the clarifier or other settlement system. The solid fraction thus obtained contains largely amounts of gangue metals which are dispatched to a disposal facility.

In various aspects, secondary AMD treatment can be carried out of the foregoing decant solution separated from particles. For example, the decant solution from the preceding step can be transferred to a second AMD treatment unit with the same design as described above. Additional base (hydrated lime solution) can be added to raise the pH of the decant solution to a pH range between about 7.5 and about 8.5 depending on the need to segregate the critical materials. Polymer flocculant can be added to facilitate particle agglomeration and settlement if needed. The same mixing process as described in the preceding paragraph can be used to prepare the solution for settling, and this provides for precipitation of REE, cobalt and other critical minerals as well as residual gangue metals to form hydraulic pre-concentrate (HPC). HPC consists of a slurry of fine floc containing both REE/CM and gangue suspended in water; solids are in the range of 0.1 to 1% on a mass basis. HPC is then collected in a settlement basin or clarifier while decanted water is dispatched to the approved discharge point.

In various aspects, HPC produced in the foregoing steps can be directed to a series of cone bottom "primary conditioning tanks." The conditioning tank(s) can be made of any suitable material, e.g., plastic tanks or plastic lined tanks resistant to high or low pH can be used. Specific height, width and capacities of the tanks will be site and flow specific as determined by the operator. In a further aspect, the cone bottom tanks comprise a cylindrical section above a conical section. The conical sections of the tanks can be manufactured in 15, 30, 45 and 60 degree angles from horizontal. Any of the conical angles are acceptable as the HPC will be in a slurry form and is believed to be able to readily flow. The top of the tank can comprise an opening to permit personnel access and tank cleaning or the tank can be an open top design. The cone bottom tanks can be designed to separate by gravity solid and liquid fractions of a slurry and funnel the settled materials (HPC) to a port for easy gathering. Gravity can separate the solids from the liquid with the solids falling through the liquid to make a solids free supernatant. The HPC from the second clarifier can be pumped in the top of the tank, while a lateral port(s) near the bottom of the cylindrical section allows withdrawal of supernatant and a port at the bottom of the conical section permits withdrawal of the settled solids comprising the HPC. The primary conditioning tanks can be sized and arranged to accommodate the HPC from a second clarifier treatment step.

In various aspects, a cone tank, i.e., a primary conditioning cone tank, can be hydraulically filled with a HPC slurry produced as described herein above. Briefly, a polymer flocculant can be added to accelerate HPC settlement. When the gravity settling is completed after a suitable period of time, e.g., 30 to 75 minutes, but dependent on tank volume and tank wall height, supernatant water can be decanted from a lateral port(s) above the cone portion and discharged. The foregoing process can reduce HPC volume by approximately 60-85%. The filling process can repeated in a plurality of conditioning tanks in a treatment train. The number of tanks required in the treatment system can designed to maximize HPC capture. The foregoing process provides a first conditioned HPC, i.e., the settled bottom tank material formed in the immediately preceding process.

In various aspects, the primary conditioned HPC can be utilized in the preparation of a second conditioned HPC. For example, the port on the bottom of each primary conditioning cone tank can opened after HPC settlement and the HPC material can be hydraulically transferred to another set of tanks, i.e., secondary conditioning cone tanks. After transfer of the HPC from the primary tanks, the ports are closed and the process of filling and settling is repeated as described above for the primary conditioning cone tank, including optionally providing a flocculent. The secondary conditioning cone tank(s) can gather the primary conditioned HPC from the primary conditioning tanks and further reduce the water in the slurry via gravity separation.

In various aspects, the secondary conditioning tank(s) receives the conditioned HPC material from the primary cone tank decant. This tank(s) gathers the conditioned HPC from the primary conditioning cone tanks to remove additional decantable water. When this conditioned HPC settles, the supernatant is decanted from the tank from the lateral port as was done in the primary cone tank. The conditioned HPC from this secondary cone tank train can hydraulically transported to an open top mix tank(s) for PLS generation. The process of primary and secondary decanting of the entrained water is repeated until sufficient conditioned HPC is placed in the PLS generation tank.

In various aspects, the method for preparation of the PLS can be carried as described herein below. Briefly, conditioned (primary or secondary conditioned) HPC can be mixed in a mixing structure, e.g., a vat or plastic tank, with a suitable amount of a suitable acid, e.g., nitric, sulfuric, and/or hydrochloric acid, such that the amount of acid added forms a solution with the pH in the range about 2.5 to about 3.5. The solution is mixed while adding the acid. After the pH stabilizes for a period of a time, e.g., about 30 minutes, a polymer flocculant can optionally be added to facilitate settling of particles. Upon settling, the supernatant form can be hydraulically pumped to a PLS Neutralization Tank and filtered, e.g., using a bag filter. The settled precipitates can also be filtered through a bag filter to recover the remaining aqueous PLS and the residuals discarded. The foregoing leaching process provides for dissolution of the HPC and creates an enriched solution comprising REE, other critical materials and residual gangue metals. Multiple charges of conditioned HPC can be added to the PLS tank with sufficient additional acid to maintain the desired pH (2.5-3.5). The REE/critical material concentration reaches a range of 1-10%.

In various aspects, the PLS can be neutralized using a base such as hydrated lime or caustic soda. The base is added to the PLS generated in the foregoing step in an amount sufficient to raise the pH to about 4.0-4.5. Base is added with mixing. Upon pH stabilization, polymer flocculant can optionally be added with mixing. Mixing is then terminated, and the solution allowed to settle. The neutralized PLS can be filtered in a bag filter and stored. The resulting filtrate is then ready for introduction to a solvent extraction circuit or other purification means.

In a further aspect, REE/CM can alternatively be captured at small or remote AMD treatment sites using passive filtration media such as a geobag or filtration bag. In some aspects, the alternative can be utilized at sites with limited electrical power and/or where the AMD discharge rate does not justify a mechanized AMD treatment plant as described above. Under this alternative approach, the pH of the raw AMD can be raised to between 4.0 and 5.0 using a base such as hydrated lime or caustic soda and the resulting precipitated gangue can be captured in a pond or other type of settlement structure. The supernatant from this first treatment step can then be directed a separate pond or settlement structure and treated to raise the pH to 7.5 to 8.5 by addition of a base such as hydrated lime slurry or a caustic soda solution. The pH adjusted supernatant can be directed into a parallel array of specifically designed geobags or filtration bags to capture the finely dispersed, solid REE/CM materials. As the captured precipitate fills each filtration bag can be taken offline and allowed to dewater and air dry to a solids content of between 20-80%. Upon reaching the desired solids content, the HPC thus formed be transported to a REE processing plant, e.g., via truck or rail. The filter cake can then be processed into PLS as described immediately below.

In various aspects, the filter cake produced in the immediately preceding step can be crushed and soaked in a strong acid, e.g., hydrochloric acid (about 6 to 12M). The ratio of filter cake to hydrochloric acid can be about 1-2 liters of hydrochloric acid per 1 kg of filter cake (dry weight basis). Additional water can be added to the foregoing, e.g., about 10-30 liters of water per 1 kg of initial filter cake material. This solution can be further processed as described herein above, e.g., conditioning and/or preparation of PLS.

The PLS can be further processed, e.g., neutralized as described above. The neutralized PLS can be used as a feedstock for solvent extraction as described herein.

In a further aspect, PLS carbonate material can be prepared after the above-described PLS neutralization. Briefly, the pH of supernatant from the PLS neutralization process can be adjusted to about 8-9, e.g., pH 8.5, by addition of a suitable carbonate base, e.g., calcium carbonate or sodium carbonate, with mixing. Optionally, polymer flocculant can be added with mixing to facilitate slurry settling. The mixer is terminated, and the carbonate formed is allowed to settle. The mixed PLS carbonate precipitate comprising REE/CM can be recovered for further processing. The raffinate (or supernatant) that is drained from the carbonate tank can be further processed to recover the cobalt, manganese and nickel via solvent extraction. The residual and remaining raffinate can filtered with the carbonate REEs retained on the filter media. The filtrate can be added to the raffinate for further processing of critical minerals via solvent extraction.

In a further aspect, PLS oxalate can be prepared from the PLS prepared as described herein above. Briefly, oxalic acid can be added to PLS to selectively precipitate a mixed REE oxalate product. The pH of the supernatant from the PLS process is lowered by addition of oxalic acid (about 15 g/L to about 25 g/L) with mixing. The pH of this solution is then raised while mixing with ammonium hydroxide to plus 1.5 pH points above the initial solution pH after the oxalic acid addition. The mixer is turned off to facilitate settling for a suitable period of time, e.g., about 30-120 minutes. Upon settling, the solution's supernatant can be removed, e.g., decanted, from the tank and the remaining solution filtered to gather the precipitated REE oxalate. The filtrate can be utilized for further processing to recover cobalt, manganese and nickel through solvent extraction. The precipitated REE oxalate can be calcined, e.g., at about 1000-1500° C. fora suitable period of time, e.g., about 1-12 hours. The REE oxalate solid thus obtained can be sequentially washed with a mild acid solution, e.g., a mild nitric acid solution, and water to remove carbonates and other impurities. The product is a mixed REE oxide.

Process for an Enriched Pregnant Leach Solution from Acid Mine Discharge.

In one aspect, the present disclosure relates to processes for providing a PLS enriched in REE materials or REE/CM materials, in which the feedstock for the process is an acid mine discharge ("AMD") feedstock. In a further aspect, the PLS can be utilized, as disclosed herein, in a solvent extraction process, or other suitable purification technology, as disclosed herein, and to obtain one or more REE that is further purified or enriched.

Disclosed herein are methods for preparing a hydraulic pre-concentrate enriched in rare earth elements and critical minerals, the method comprising: (a) contacting a raw material with a first base in an amount sufficient to adjust the pH to a value from about 4.0 to about 6.0, thereby forming a mixture comprising a first aqueous phase and a first solid concentrate; (b) separating the first aqueous phase from the first solid concentrate; (c) contacting the first aqueous phase with a second base in an amount sufficient to adjust the pH to a value from about 7.0 to about 9.0, thereby forming a mixture comprising a second aqueous phase and the hydraulic pre-concentrate; (d) removing the second aqueous phase and collecting the hydraulic pre-concentrate; wherein the raw material comprises rare earth elements; and wherein the hydraulic pre-concentrate is enriched in rare earth elements.

Also disclosed herein are methods for preparing a pregnant leach solution, the method comprising: transferring a disclosed first conditioned hydraulic pre-concentrate or a disclosed second conditioned hydraulic pre-concentrate to a mixing tank; and adding a first acid to the mixing tank in an amount sufficient to adjust the pH from about 2.0 to about 4.0, thereby forming the pregnant leach solution; wherein the first acid is mixed with the first conditioned hydraulic pre-concentrate or the second conditioned hydraulic pre-concentrate as the first acid is added.

Also disclosed herein are methods for preparing a pregnant leach solution, the method comprising: transferring a hydraulic pre-concentrate to a mixing tank; and adding a first acid to the mixing tank in an amount sufficient to adjust the pH from about 2.0 to about 4.0, thereby forming the pregnant leach solution; wherein the hydraulic pre-concentrate is enriched in rare earth elements compared to the rare earth elements concentration present in an acid mine discharge; and wherein the first acid is mixed with the hydraulic pre-concentrate as the first acid is added.

Also disclosed herein are methods for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises a disclosed hydraulic pre-concentrate, a disclosed pregnant leach solution, or combination thereof.

Also disclosed herein are methods for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises a hydraulic pre-concentrate, a pregnant leach solution, or combination thereof.

In a further aspect, the disclosed processes comprise the following steps: (1) transfer raw AMD feedstock to a separator; (2) aerate feedstock and add an effective amount of at least one base to the separator to raise the resultant mixture pH; (3) optionally add an effective amount of one or more flocculating and/or coagulating agent; (4) separate solid and aqueous phases, and discard solids; (5) optionally, if recovering scandium, transfer the aqueous phase from the preceding step to a separator and add an effective amount of base to raise resultant solution pH, followed by (5)(a) optionally, add an effective amount of coagulating and/or flocculating agents; and then, (5)(b) separate solid and aqueous phases and collect Sc-enriched solid concentrate; (6) transfer the aqueous phase from step (4) or from optional step (5) to a separator; (7) add an effective amount of at least one base to raise resultant mixture pH; (8) optionally add an effective amount of one or more flocculating and/or coagulating agent; (9) discharge effluent and collect REE-enriched pre-concentrate; (10) dewater pre-concentrate and transfer dewatered REE-enriched pre-concentrate to a mixer; (11) add an effective amount of at least one acid to lower a resultant solution pH, and optionally add an effective amount of one or more oxidizing agents; (12) optionally add an effective amount of one or more flocculating and/or coagulating agent; (13) transfer resultant solution to from the preceding step a filtration apparatus, filter, and discard residual solids retained by the filter; (14) transfer resultant filtrate solution from the preceding step to a mixer; (15) add an effective amount of at least one base to raise resultant solution pH; (16) transfer resultant solution to a filtration apparatus, filter, and discard residual solids retained by the filter; and (17) the resultant PLS may be stored. In a further aspect, the PLS may be utilized in a solvent extraction process, or other suitable purification technology, as disclosed herein, and to obtain one or more REE that is further purified or enriched.

Figure 23:
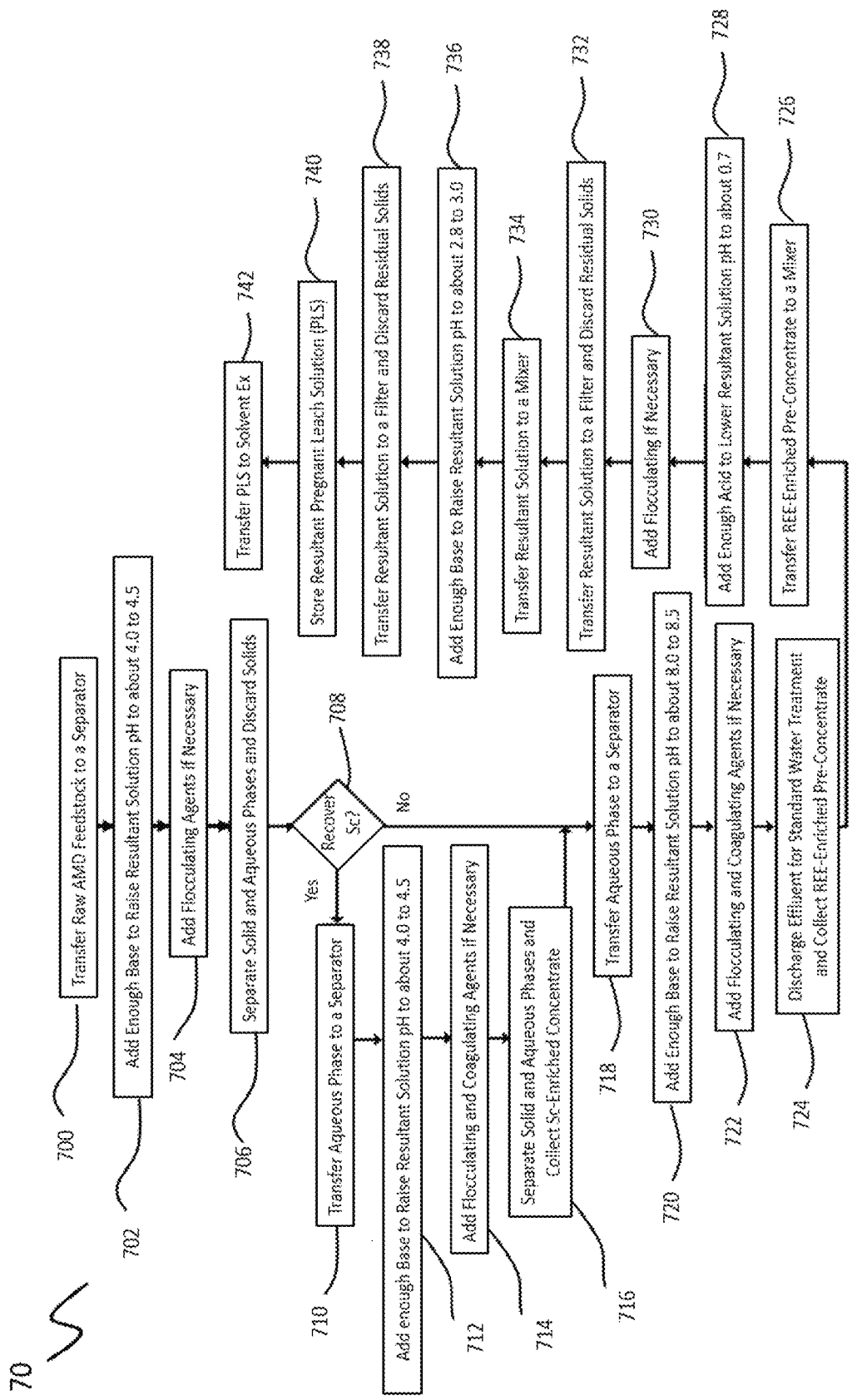
FIG. 23 shows a flow chart of a portion of a disclosed process, starting with transfer of raw Acid Mine Drainage (AMD) feedstock to a separator and ending with transfer of a Pregnant Leach Solution (PLS) to the disclosed solvent extraction process. An optional series of steps for recovering scandium are included.

FIG. 23 shows a flow diagram of an exemplary process to produce a PLS as disclosed herein. The plant includes a means 700 for transferring raw AMD feedstock to a separator and a means 702 for adding base to raise the resultant solution pH to from about 4 to about 4.5 as well as a means 704 for adding flocculating agents if necessary and a means 706 for separating solid and aqueous phases and for discarding solids. If scandium recovery is performed, an optional scandium recovery device 708 is incorporated at this stage. The scandium recovery device 708 includes a means 710 for transferring the aqueous phase to a separator, a means 712 for adding enough base to raise the resultant solution pH to from about 4.5 to about 5, a means 714 to add optional flocculating and/or coagulating agents, and a means 716 for separating solid and aqueous phases and collecting a scandium-enriched solid concentrated. The resultant material from this step or by a separation means 706 if scandium recovery is not performed is transferred to separator 718. A means 720 for adding base to the separator 718 dispenses base until solution pH is from about 8.0 to about 8.5, while a means 722 adds optional flocculating and/or coagulating agents and a device 724 discharged effluent for standard water treatment while collecting an REE-enriched preconcentrate for further processing. REE-enriched preconcentrate is transferred to a mixer by a mechanism 726 and a means 728 for adding acid dispenses acid to lower the solution pH to from about 0.1 to about 2.0, in a further aspect lower the solution pH to from about 0.3 to about 1.1, in a further aspect lower the solution pH to from about 0.5 to about 0.8, in a further aspect lower the solution pH to about 0.7, while a means 730 adds optional flocculating agents. Acidified solution is transferred by device 732 to a filter and residual solids are discarded. A means 734 transfers the resultant solution to a mixer where a base dispensing a means 736 dispenses base until the solution pH is from about 2.8 to about 3.0. A device 738 then transfers the resultant solution to a filter, wherein residual solids are discarded. Following this, a PLS is stored in storage by a means 740 until transferred to solvent extraction by a transfer means 742.

Figure 24:
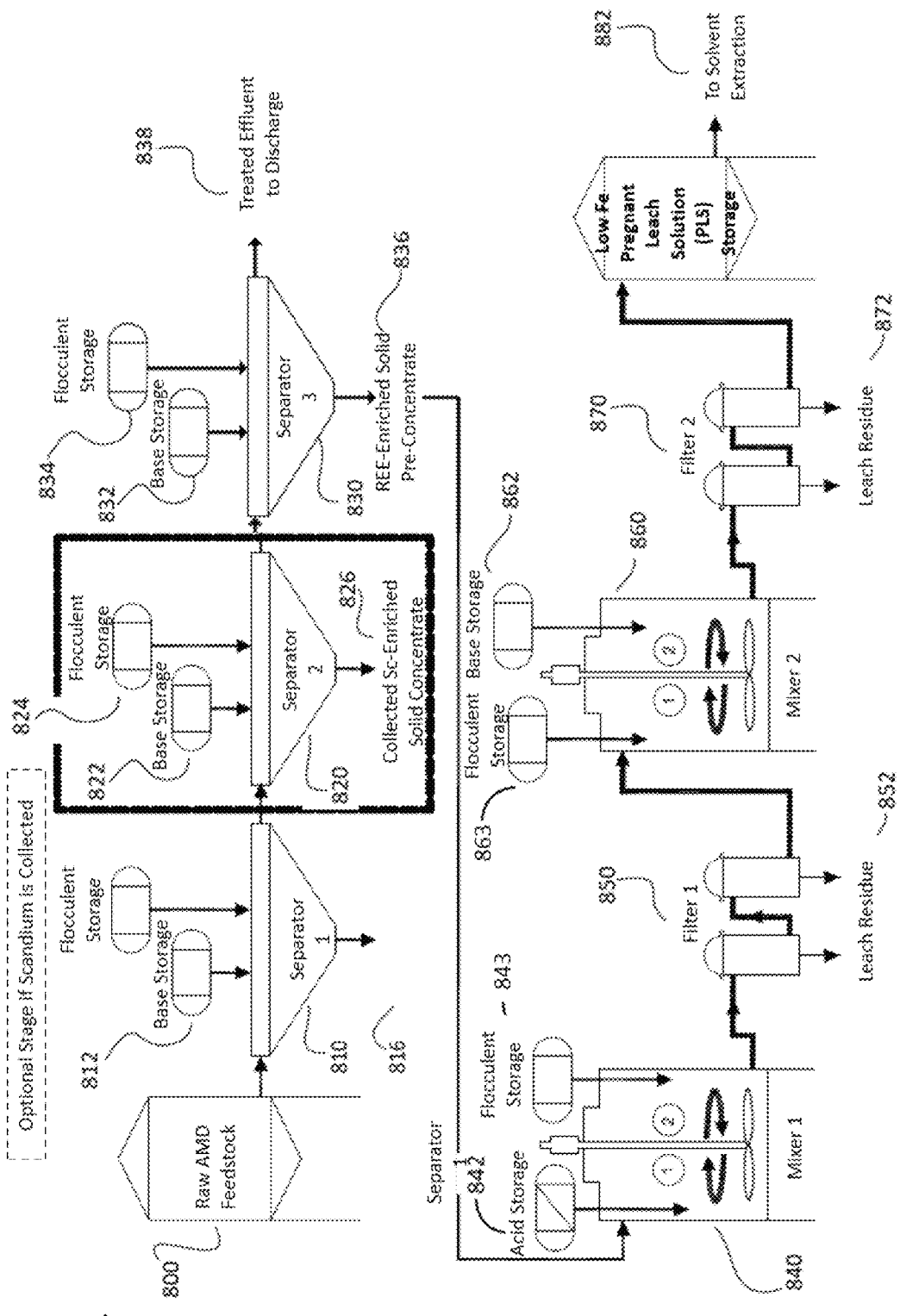
FIG. 24 shows a flow diagram of a disclosed process. In various aspects, a second separation and concentration step can be applied if it is desired to collect a scandium-enriched solid concentrate.

FIG. 24 shows a diagram of a plant that can produce a PLS according to the process in FIG. 23 or another exemplary process as disclosed herein. Raw AMD feedstock 800 is transferred to a first separator 810, wherein the separator is connected to a base storage unit 812 and a flocculant storage unit 814 that can dispense base and flocculant as needed into the separator 810; solids 816 that precipitate at this point include mostly iron and aluminum and are transferred for waste disposal or further processing as desired. If scandium recovery is performed, the liquids from the first separator 810 are transferred to a second separator 820, which is also connected to a base storage unit 822 and a flocculant storage unit 824 that can dispense base and flocculant as needed according to the process disclosed herein. Scandium precipitates from the second separator 820 as a scandium-enriched solid concentrate 826 and the remainder of the material still containing significant REEs is passed to a third separator 830. If scandium is not collected, REE-containing material is passed from the first separator 810 directly to the third separator 830. The third separator 830 is connected to base storage unit 832 and flocculant storage unit 834 that can dispense base and flocculant as needed into the third separator 830; effluent from this process 838 is discharged from the system and the REE-enriched solid pre-concentrate 836 produced by this process is transferred to a first mixer 840, wherein the mixer is connected to an acid storage unit 842 that can dispense acid into the mixer 840 as needed to control the pH of the solution as disclosed herein. Material passes from the mixer 840 to a first filter 850 wherein leach residue 852 is separated from liquid material that is then transferred to a second mixer 860 that is connected to a base storage unit 862 that can dispense base into the mixer 860 as needed. From mixer 860 liquids are passed to a second filter 870 and leach residue 872 is discarded while filtrate is transferred as PLS to storage unit 880 for later use in solvent extraction procedures 882.

In one aspect, feedstock useful in step 1 can include raw AMD. In a further aspect, distribution of REE and major elements in 155 AMD sources in the Central Appalachian coal basin AMD source (CAPP) and Northern Appalachian coal basin AMD source (NAPP) are provided in Table 3 below.

TABLE 3

Distribution of REE and Major Elements in Appalachian AMD Sources.

| | Mean | Confidence Interval | Number of Samples | CI:Mean Ratio |
|---|---|---|---|---|
| | CAPP AMD | | | |
| REE (µg/L) | | | | |
| Sc | 3.12 | 1.12 | 49 | 0.36 |
| Y | 50.48 | 20.53 | 51 | 0.41 |
| La | 27.27 | 15.21 | 51 | 0.56 |
| Ce | 54.55 | 27.65 | 51 | 0.51 |
| Pr | 8.16 | 3.95 | 50 | 0.48 |
| Nd | 37.82 | 17.19 | 51 | 0.45 |
| Sm | 9.88 | 4.04 | 50 | 0.41 |
| Eu | 2.68 | 0.98 | 50 | 0.37 |
| Gd | 12.59 | 4.95 | 51 | 0.39 |
| Tb | 1.98 | 0.71 | 50 | 0.36 |
| Dy | 10.76 | 4.31 | 50 | 0.40 |
| Ho | 1.98 | 0.73 | 50 | 0.37 |
| Er | 5.08 | 2.09 | 50 | 0.41 |
| Tm | 0.82 | 0.25 | 49 | 0.30 |
| Yb | 3.95 | 1.58 | 50 | 0.40 |
| Lu | 0.72 | 0.21 | 49 | 0.29 |
| TREE | 231.85 | 103.12 | 50 | 0.44 |
| HREE | 91.48 | | | |
| LREE | 140.36 | | | |
| Median | 6.62 | 3.02 | 50 | 0.40 |
| Major Metal (mg/L) | | | | |
| Influent pH | 4.95 | 0.43 | 51 | 0.09 |
| Al | 13.23 | 5.21 | 51 | 0.39 |
| Ca | 169.84 | 27.19 | 51 | 0.16 |

TABLE 3-continued

Distribution of REE and Major Elements in Appalachian AMD Sources.

| | Mean | Confidence Interval | Number of Samples | CI:Mean Ratio |
|---|---|---|---|---|
| Fe | 19.06 | 13.09 | 10 | 0.69 |
| Mg | 126.06 | 26.86 | 51 | 0.21 |
| Mn | 10.93 | 3.37 | 51 | 0.31 |
| Na | 37.37 | 18.89 | 51 | 0.51 |
| Si | 11.06 | 2.27 | 51 | 0.21 |
| Cl | 5.40 | 2.94 | 50 | 0.54 |
| SO$_4$ | 1111.84 | 193.95 | 50 | 0.17 |
| TMM | 1504.77 | 293.78 | 51 | 3.19 |
| Median | 19.06 | 13.09 | 51 | 0.31 |
| NAPP AMD | | | | |
| REE (µg/L) | | | | |
| Sc | 6.34 | 1.55 | 131 | 0.24 |
| Y | 80.54 | 23.92 | 134 | 0.30 |
| La | 21.09 | 6.69 | 134 | 0.32 |
| Ce | 63.15 | 19.09 | 134 | 0.30 |
| Pr | 9.79 | 2.81 | 133 | 0.29 |
| Nd | 45.84 | 13.15 | 134 | 0.29 |
| Sm | 13.25 | 3.57 | 133 | 0.27 |
| Eu | 3.78 | 1.02 | 131 | 0.27 |
| Gd | 18.54 | 5.17 | 134 | 0.28 |
| Tb | 3.13 | 0.83 | 132 | 0.26 |
| Dy | 16.94 | 4.79 | 133 | 0.28 |
| Ho | 3.28 | 0.89 | 132 | 0.27 |
| Er | 8.28 | 2.40 | 133 | 0.29 |
| Tm | 1.28 | 0.30 | 130 | 0.23 |
| Yb | 6.36 | 1.79 | 134 | 0.28 |
| Lu | 1.08 | 0.25 | 130 | 0.23 |
| TREE | 302.69 | 85.99 | 133 | 0.28 |
| HREE | 145.79 | | | |
| LREE | 156.90 | | | |
| Median | 9.03 | 2.60 | 133 | 0.28 |
| Major Metal (mg/L) | | | | |
| Influent pH | 4.21 | 0.34 | 132 | 0.08 |
| Al | 22.98 | 4.82 | 134 | 0.21 |
| Ca | 176.68 | 22.57 | 134 | 0.13 |
| Fe | 61.05 | 22.15 | 134 | 0.36 |
| Mg | 75.34 | 10.71 | 134 | 0.14 |
| Mn | 9.43 | 2.42 | 134 | 0.26 |
| Na | 519.65 | 185.99 | 134 | 0.36 |
| Si | 14.23 | 1.64 | 134 | 0.12 |
| Cl | 304.07 | 239.70 | 130 | 0.79 |
| SO$_4$ | 1704.43 | 337.54 | 130 | 0.20 |
| TMM | 2887.85 | 827.54 | 133 | 2.56 |
| Median | 75.34 | 22.15 | 134 | 0.21 |

In a further aspect, feedstocks with the compositional ranges in Table 3 are useful in the process disclosed herein. In one aspect, AMD can be the feedstock for the disclosed process; however, other feedstocks are also contemplated. In one aspect, the feedstocks useful herein do not include high levels of uranium, thorium, or other hazardous components.

Figure 22:
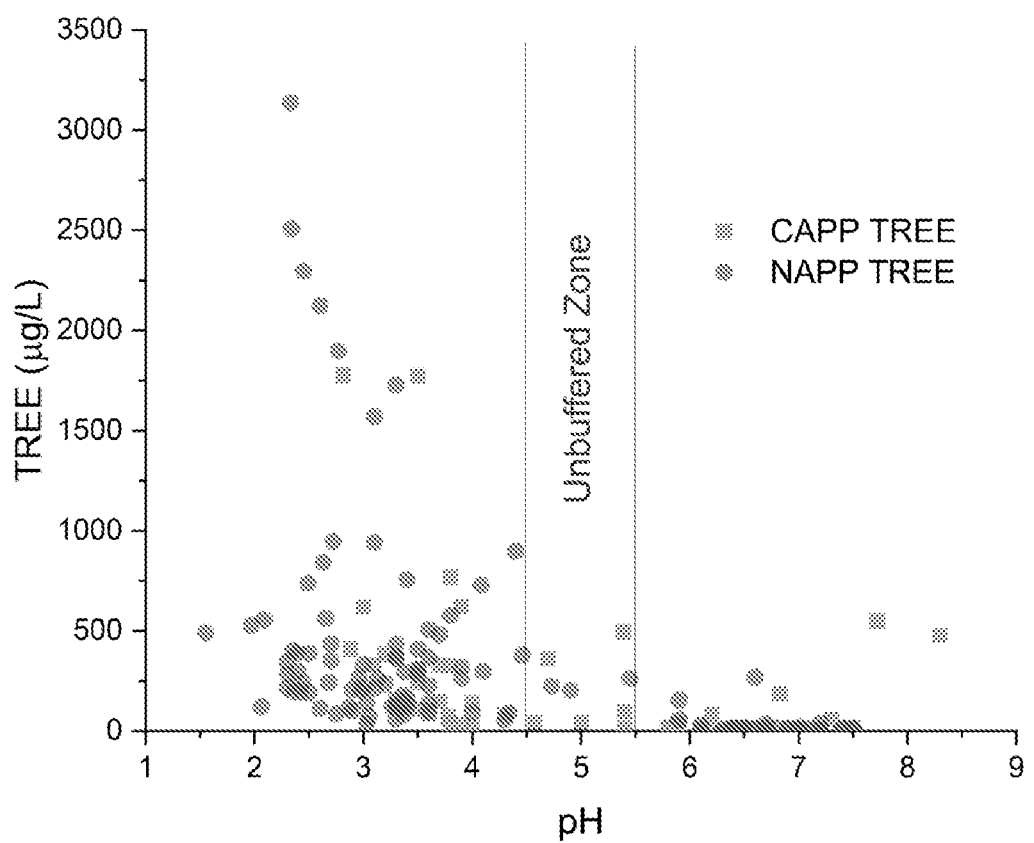
FIG. 22 shows representative data for distribution of Acid Mine Drainage (AMD) Rare Earth Elements (REE) concentrations as a function of pH, where Central Appalachian coal basin AMD source (CAPP) and Northern Appalachian coal basin AMD source (NAPP) represent, respectively, sources enriched in Rare Earth Elements (REEs).

In one aspect, the process disclosed can utilize an AMD feedstock with a pH of from less than 2 to less than about 5.5, or of about less than 2, 2.5, 3, 3.5, 4, 4.5, 5, or 5.5. In one aspect, the feedstock pH is less than 3. In another aspect, the feedstock pH is less than 2. A typical distribution of AMD REE concentrations as a function of pH can be seen in FIG. 22.

In one aspect, in step 2 as disclosed above, an effective amount of at least one base is an amount sufficient to raise the resultant mixture pH to about 4 to about 4.5, or at least about 4, 4.1, 4.2, 4.3, 4.4, or about 4.5, or a combination of any of the foregoing values, or a range encompassing any of the foregoing values. In a further aspect, the base can be NaOH, KOH, ammonia or ammonium hydroxide, calcium pellets, quicklime, lime slurry, or a combination thereof. In one aspect, the base is lime slurry.

In a further aspect, in step 4 as disclosed above, the discarded solids can comprise iron or aluminum and/or other gangue metals with similar chemical and physical properties.

In one aspect, if scandium is being recovered and step 5 in the disclosed process is being performed, when base is added, the desired resultant pH can be from about 4.9 to about 5.1, or about 4.9, 5.0, or about 5.1, or a combination of any of the foregoing values, or a range encompassing any of the foregoing values. In a further aspect, the base can be NaOH, KOH, ammonia or an ammonium compound, calcium pellets, quicklime, lime slurry, or a combination thereof. In one aspect, the base is lime slurry.

In one aspect, in step 7 as disclosed above, an effective amount of at least one base is an amount sufficient to raise the resultant mixture pH to about 8 to about 8.5, or at least about 7.8, 7.9, 8, 8.1, 8.2, 8.3, 8.4, 8.5, 8.6, or about 8.7, or a combination of any of the foregoing values, or a range encompassing any of the foregoing values. In a further aspect, the base can be NaOH, KOH, ammonia or ammonium hydroxide, calcium pellets, quicklime, lime slurry, or a combination thereof. In one aspect, the base is lime slurry. In one aspect, a higher pH from within the disclosed range may aid in recovering additional cobalt.

In one aspect, in step 11 as disclosed above, the desired resultant pH is from about 0.5 to about 3.2, or is about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, or about 3.2, or a combination of any of the foregoing values, or a range encompassing any of the foregoing values. In some aspects, pH in this step can be chosen based on economic considerations such as, for example, sales value of product versus cost of acid added in this step. In another aspect, various acids are contemplated in this step including, but not limited to, sulfuric acid, nitric acid, hydrochloric acid, or a combination thereof. In one aspect, the acid is nitric acid. In another aspect, the acid is hydrochloric acid.

In a further aspect, acid contact with the feedstock, raw material, or AMDp/eAMDp preconcentrate occurs in a reactor that is open to the atmosphere. In another aspect, this step can be conducted at room temperature. In a still further aspect, prior to acid addition, the feedstock, raw material, or AMDp/eAMDp preconcentrate can be contacted with water while mixing to create a slurry. In a yet further aspect, the slurry is mixed with acid in step 11 as described above with continuous mixing to dissolve the REEs out of the solid feedstock.

In a further aspect, as noted above, optionally step 11 can further comprise addition of an oxidizing agent. In a still further aspect, the step 11 comprises the addition of an oxidizing agent, such that this aspect is not an optional aspect. In a still further aspect, the oxidizing agent can be hydrogen peroxide. Without wishing to be bound by a particular theory, it is believed that the addition of an oxidizing agent can enhance the efficiency of gangue metal separation from REE in the aqueous phase. It is believed, moreover, without wishing to be bound by theory, the reducing agent may precipitate iron and manganese hydroxides from the PLS. In a further aspect, and without wishing to be bound by theory, filtration at an acidic pH in this step prevents the formation of aluminosilicate gels and/or emulsions. It is believed, in addition, without wishing to be bound by a particular theory, it is believed that gels and emulsions can prevent downstream steps of the process from proceeding to completion and can interfere with pumping and mixing. In an even further aspect, an effective amount of an oxidizing agent can be added to based on the equation:

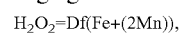

$H_2O_2 = Df(Fe + (2Mn))$, where:
   $H_2O_2$=hydrogen peroxide (moles)
   Df=design factor
   Fe=total iron (moles)
   Mn=total manganese (moles)
such that Df has a value of about 1.05 to about 1.7, about 1.1 to about 1.6, about 1.2 to about 1.5; or a sub-range within the foregoing ranges; or a value or set of values within any of the foregoing ranges.

In any of the above aspects, mixers in any step that requires a mixer can be connected in sequence to aid in product transfer from one mixer to the next. In some aspects, any of the above processes can be conducted partially (i.e., not to completion) if it is desired to reduce cost.

In a further aspect, in step 12, as disclosed above,

In one aspect, in step 13 as disclosed above, residual solids discarded in this step can include a large portion of silicon. In a further aspect, step 13 removes essentially all silicon from the feedstock. In a further aspect, a filter or other separation mechanism such as, for example, a plate and frame filter press, can be used to separate solids from liquid. In a further aspect, solids are retained in the filter or filter press, which is then cleaned and can be re-used. In some aspects, the filtering component can be made from or lined with polypropylene cloth.

In another aspect, in step 15 as disclosed above, the desired resultant solution pH can be from about 2.8 to about 3, or can be about 2.8, 2.85, 2.9, 2.95, or about 3, or a combination of any of the foregoing values, or a range encompassing any of the foregoing values. In some aspects, when HCl is used as the acid in step 13, MgO may be a suitable base for use in step 15. In other aspects, other bases can be used including, but not limited to, NaOH, KOH, ammonia or ammonium hydroxide, calcium pellets, quicklime, lime slurry, or a combination thereof. In one aspect, the base is NaOH.

In one aspect, in step 16 as disclosed herein, residual solids discarded typically include iron. In a further aspect, step 13 removes essentially all iron from the feedstock. In a further aspect, a filter or other separation mechanism such as, for example, a filter press or a plate and frame filter press, can be used to separate solids from liquid. In a further aspect, solids are retained in the filter or filter press, which is then cleaned and can be re-used. In some aspects, the filtering component can be made from or lined with polypropylene cloth. In some aspects, an oxidizing agent can optionally be used in step 13 to convert ferrous iron to ferric iron, which, without wishing to be bound by theory, may help with precipitation of iron compounds. In a further aspect, the oxidizing compound can be hydrogen peroxide or another chemical oxidizer. In an alternative aspect, mechanical or electrochemical oxidation can be used.

A flow diagram of the disclosed process can be seen in FIG. 23. A graphical representation of the disclosed process including optional scandium collection (step 5) can be seen in FIG. 24. In a further aspect, the process described herein can be implemented in a mobile- or commercial-scale plant described herein as follows.

FIGS. 25A-25B show a flow diagram of an exemplary process to produce a PLS as disclosed herein. The plant includes means 700 for transferring raw AMD feedstock to a separator and a means 702 for adding base to raise the resultant solution pH to from about 4 to about 4.5 as well as a means 704 for adding flocculating agents if necessary and a means 706 for separating solid and aqueous phases and for discarding solids. If scandium recovery is performed, an optional scandium recovery device 708 is incorporated at this stage. The scandium recovery device 708 includes a means 710 for transferring the aqueous phase to a separator, a means 712 for adding enough base to raise the resultant solution pH to from about 4.5 to about 5, a means 714 to add optional flocculating and/or coagulating agents, and a means 716 for separating solid and aqueous phases and collecting a scandium-enriched solid concentrated. The resultant material from this step or from separation a means 706 if scandium recovery is not performed is transferred to separator 718. A means 720 for adding base to the separator 718 dispenses base until solution pH is from about 8.0 to about 8.5, while a means 722 adds optional flocculating and/or coagulating agents and a device 724 discharged effluent for standard water treatment while collecting an REE-enriched preconcentrate for further processing. The collected REE-enriched pre-concentrate, i.e., the HPC, is hydraulically transferred to a primary cone settling tank 725, and settling is allowed to proceed such that the solids collect in the lower portion of the cone tank 727, and the supernatant is removed and can be further processed by standard water treatment methods 729. The slurry in the lower portion of the cone tank 727 is hydraulically transferred 750 to a secondary cone tank and settling allowed to proceed 752. The slurry that has collected in the lower portion of the secondary cone tank forms a conditioned HPC that can be transferred to a mixing tank 754. The transfer of the conditioned HPC to a mixing tank can be direct or the conditioned HPC may be transferred to containers or vessels for transport to the mixing tank, e.g., the conditioned HPC can be transferred to suitable drums, tanker railroad car or tanker truck. After transfer to a mixing tank 754, a mineral acid is added in an amount sufficient to lower the pH of the conditioned HPC to about 3.0 as shown at 756. Optionally, a flocculent agent may be added after acid addition 758. The solution is filtered to remove residual solids as shown at 760, which are discarded, and the filtrate is transferred to a mixing tank 762. A base is then added in an amount sufficient to raise the pH of the solution to a pH about 4.5-5.0 as shown at 764. The solution is then subject to filtration to remove residual solids as shown at 738, which are disposed of, and the filtrate is the PLS 740. The PLS 740 can be utilized directly in a solvent extraction process 742. Alternatively, the PLS 740 can be stored, e.g., suitable storage tank or system. It can also be dispensed into suitable containers or vessels for transport to a site for solvent extraction, e.g., dispensed to drums, railroad tanker cars, or truck tanker.

FIG. 26A shows a diagram of a plant that can produce a PLS according to the process of FIGS. 25A-25B or another exemplary process as disclosed herein. The cone tank concentrating steps described can be replaced by use of geobags. A diagram of such a process is shown in FIG. 26B. A geobag, e.g., a geosynthetic geobag, can be constructed of woven geotextile materials, nonwoven textile materials, or combinations thereof. A geobag can be used int the disclosed processes for the purposes of storage, filtration, and drainage over a period of time suitable for the solids in concentration to aggregate into flocs, settle, filter, and drain of aqueous effluent. The nonwoven geotextile materials can comprise polypropylene, low- and high density polyethylene fibers extruded or sprayed into a stable and continuous network of fibers having round, square, or high surface area contoured cross sections that will retain relative position under performance application. Moreover, these materials exhibit low degradation when exposed to chemical, alkali, acidic, and biological exposure. The characteristics of the woven planar geotextiles are yarn or thread fibers having high tenacity monofilament or slit film which retain their relative position and furthermore, will exhibit low degradation when exposed to chemical, alkali, acidic, and biological exposure.

In various aspects, as shown diagrammatically in FIGS. 26A-26B, the HPC from clarifier #2 can be concentrated or dewatered by at least two alternative processes as discussed above. In a first process for dewatering, primary and secondary cone tanks can be utilized. The HPC entering the cone tank can have a solids concentration of ~0.2% solids after being dosed with cationic polymer flocculant have a potential range of concentrations between 0.5 to 4 ppm. Following 1 hour of gravity settling, the solids content can reach ~1% solids. The supernatant water is decanted, and the solids are transferred to a second cone tank (secondary cone tank). This slurry can settle for approximately 1 hour and following the solids settling, the supernatant is removed and the resulting solids content is approximately 1.4%.

Alternatively, a second process for dewatering comprises use of geobags. The HPC from the clarifier #2 can be transferred to a group of geobags and water allowed to drain. The geobags are designed to retain the HPC in the geobag and allow the HPC particulates to filter. The decant water can drain through the bag. The bags can be maximized in length and girth and be fitted in the given laydown area. The HPC filtration and dewatering process can use multiples of two geobags that may be filled singularly in series, in parallel, or by alternating between the two bags. This filling process maximizes HPC solids generation to the rate of solids' filtration and dewatering. The decanted and filtered water can be collected and discharged in compliance with the permitted environmental discharge limits. The HPC can remain in the geobag until the proper percent solids is obtained. When the proper percent solids are acceptable, the geobag(s) can be cut open and the dewatered HPC material can be removed and transported to the PLS mixing vessel. The geobag material can be removed for off-site disposal, and new geobag(s) can be installed to repeat the process. The process cycles with filling the bags, allowing them to decant until a desired percentage of solids is obtained, followed by material removal and new bag placement. The bags can be designed to allow for maximum vertical storage and allow for drying in a reasonable amount of time. It was determined in exemplary studies that based on a 200 gallon per minute inflow of HPC with 0.05 to 0.3% solids content, the HPC can be dewatered to a targeted average Total Solids of 4.0 to 6.0% between initial fills. Potential increases in Total Solids up to 90% may be achieved depending on controlling the HPC flocculation process and environmental exposure conditions (heat, humidity, wind, rain).

The geobag specifications of the woven type can range in Apparent Opening Size (AOS) between 0.25 to 0.50 mm, and for nonwoven type the AOS range can be about 0.10 to 0.20 mm as measured according to ASTM D4751. Geobags can be configured as geocomposite multi-layered planar surfaces of an outer woven layer to develop radial tensile strength, coupled with an internal nonwoven layer to develop low permittivity and low AOS. The functional performance range of the outer woven layer functions in grab tensile strength ranging 300-400 N and at an elongation strain of 12-17% (as determined according to ASTM D4632). The inner non-woven layer performance range for filtration and drainage exhibits the AOS range is about 0.10 to 0.32 mm as measured to ASTM D4751 and a permittivity ranging from about 0.75 to 0.95 sec-1 (as determined according to ASTM D4491).

Suitable commercially available geobag products include, but are not limited to, Tencate (Mirafi®) brand for woven fabrics include the FW 300, 402, 403, 404, and 700 products; and for nonwoven fabrics include 140N, 170N, and 1100N products.

Upstream Concentrator.

Full-Scale Unit Construction. In one aspect, disclosed herein is a full-scale AMD treatment plant with an integrated REE/CM recovery operation. In a further aspect, potential alterations to the treatment plant can include, but are not limited to: (1) staged precipitation using multiple clarifiers/thickeners in series; (2) independent pH control in each clarifier; and (3) additional materials handling and filtration units to recover and dewater the REE-enriched concentrates.

In a further aspect, to augment the traditional AMD treatment system, a state-of-the-art automation and control system to remotely monitor key operating parameters is disclosed herein. In another aspect, this package can provide real-time measurements of pump and mixer motor conditions, pH measurements, select ion concentrations, and other variables. In still another aspect, these values can be logged in an archival data format and used for feedback loop control.

In one aspect, all parts of the process disclosed herein can be conducted while following all pertinent local, state, and federal regulations. In another aspect, upon completion of the construction activities a safety analysis/review can be performed prior to equipment startup and shakedown.

Full-Scale Unit Operation. In one aspect, disclosed herein are the following parameters for full-scale operation of an upstream concentrator as disclosed herein: (1) the specific locations of sampling points within the system and expected consistency of those samples (liquid, solid, or slurry); (2) the specific procedures for obtaining, handling, transporting, and storing various sample types; (3) the expected frequency and extent of sample collection for both routine and intensive analysis; (4) the specific protocols for analyzing samples and interpreting the resultant data; and (5) the protocols for retaining and archiving samples.

In one aspect, disclosed herein is a test matrix to gather performance data under different operating conditions while ensuring that the final water discharge meets National Pollutant Discharge Elimination System (NPDES) permit requirements. In a further aspect, the test matrix is based on results from the small-scale unit evaluation and includes expected variations in AMD flow and REE concentration that follow seasonal variations throughout the calendar year. In a further aspect, these natural variations can be tracked over time and used to evaluate the robustness and resiliency of the REE/CM enrichment process.

In a further aspect, after identifying and validating the optimal process operational parameters, the upstream concentrator will be operated continuously at those settings. In one aspect, REE/CM preconcentrates generated during this time will be collected into 55-gallon drums or geotextile super sacks and stored for future testing in the disclosed downstream processing units.

Acid Leaching/Solvent Extraction.

System Design. In one aspect, disclosed herein is a system that processes the preconcentrates generated from the large-scale upstream concentration unit, e.g., from PLS or HPC as disclosed herein. Further in this aspect, the system includes, but is not limited to: (1) a mass-balanced process flowsheet, (2) piping and instrumentation diagrams, (3) a proposed facility layout, (4) a construction cost estimate based on vendor quotes, (5) a daily operational cost estimate, and (6) final engineering drawings of the pilot-scale plant.

In one aspect, the pilot-scale facility is co-located with the upstream concentrator at the host site. Further in this aspect, this location has adequate access to water, power, and other utilities that will be required for the pilot-scale system. In still another aspect, only minimal changes to the facility will be required prior to system commissioning.

System Procurement, Construction, and Installation. In one aspect, site preparation may include clearing unnecessary equipment, reinforcing foundations or structures, and/or adding mechanical and electrical utilities. In a further aspect, these initial preparations ensure that equipment installation and assembly can be completed in a timely manner. In a still further aspect, fabricated components and final equipment can be shipped directly to the host site.

System Shakedown, Training, and Troubleshooting. In one aspect, the primary safety hazard expected herein is the use of strong acids in the leaching and solvent extraction units. At a minimum, acid resistant gloves and gowns and adequate ventilation in the testing area can be used to minimize risk to personnel, as will laboratory safety and chemical hygiene training.

In one aspect, a series of shakedown tests will be conducted to identify and resolve operational issues that may arise during the detailed system testing. In a further aspect, shakedown testing can provide an opportunity to mitigate these issues while providing key operational data that can support a detailed test campaign. In a still further aspect, specific goals of this testing program include, but are not limited to: (1) verify vendor specifications on capacity and power; (2) ensure the sufficiency of various ancillary equipment and utilities; (3) identify the operational limits to be used in detailed system testing. In a still further aspect, shakedown testing can be conducted by operating all unit operations under "water-only" conditions to first ensure the structural integrity of the process units. Further in this aspect, after water-only testing, solids can be slowly incorporated into the test regimen to ensure the adequacy of valves, pumps, and other fittings. In another aspect, strong acids and other chemicals can be added only after the system has been proven in these more benign conditions.

In one aspect, disclosed herein is a state-of-art real time monitoring and control system that can provide real-time measurements of pump and mixer motor conditions, pH measurements, select ion concentrations, and other variables. In a further aspect, these values can be logged in an archival data format and used for feedback loop control. In still another aspect, this task also includes all troubleshooting needed to ensure consistent and safe operation of the pilot-scale system.

System Parametric Testing. In one aspect, using feedstocks produced from previous stages of the process disclosed herein, acid leaching and solvent extraction tests can be conducted over an extended operating period. In another aspect, each experimental condition may require at least 64 hours of continuous testing, and the solvent extraction (SX) operation is anticipated to run continuously for 24 hours per day. In still another aspect, the specific items to be analyzed during this test campaign may include but are not limited to: (1) the influence of SX extractant type and concentration; (2) the influence of SX solvent type and ratio; (3) the influence of extracting and stripping acid type and pH; (4) the number of extracting and stripping stages needed to reach the target purity level. In another aspect, provided herein are pathways to remove non-target impurities and optimize the process with regards to separation efficiency, solvent recycling, and waste minimization. In one aspect, a test matrix can be generated using a statistical design of experiments, and specific conditions can be blocked and repeated to assess experimental error while mitigating the influence of covariates, such as ambient environmental conditions. In yet another aspect, results from this experimental design can be analyzed using a response surface methodology to identify the optimal conditions leading to the highest recovery and selectivity.

Alternative Feedstock Testing.

In one aspect, after meeting objectives using the preferred AMD feedstock, other feedstocks can be evaluated in the ALSX pilot plant. In a further aspect, specific examples include, but are not limited to, AMD treatment sludges, coal refuse and under clays, fly ash and gasification char, other REE-enriched coal byproducts, and combinations thereof.

Laboratory Support and Testing.

In one aspect, both aqueous and solid samples can be routinely analyzed for REE/CM, major gangue metals, trace gangue metals, and CMs. In a further aspect, REE aqueous concentrations can be determined using inductively coupled plasma-mass spectrometry (ICP-MS). In a still further aspect, solid samples can be digested by sodium peroxide ($Na_2O_2$) fusion and re-dissolution in hydrochloric acid and resulting aqueous analysis can then be undertaken using ICP-MS. In one aspect, major ions such as iron (Fe) and aluminum (Al) will be determined by a suitable technique such as, for example, inductively coupled plasma optical emission spectrometry (ICP-OES).

In yet another aspect, a broad scan of feedstocks can be used to identify other CMs and, if economically attractive, ensure that the disclosed ALSX process is modified for their recovery.

Economic Systems Analysis.

In one aspect, experimental results from the various testing campaigns as well as model results from the system design optimization can be compiled into a techno-economic analysis (TEA). Further in this aspect, the analysis can report costs and performance at the existing scale and project those costs to the next design scale and/or a commercial implementation using standard scaling factors and itemized costs as appropriate. In one aspect, all analyses will use guidelines and assumptions provided by the National Energy Technology Laboratory (NETL), and results will be presented in accordance with NI 43-101 reporting standards for disclosing mineral projects. In any of these aspects, at a minimum, this analysis will include: a clear statement of the assumptions; cash forecasts on an annual basis; a discussion of potential net present value (NPV) and internal rate of return (IRR); a summary of the tax structure imposed; and a sensitivity analysis with respect to grade, price, and other significant input factors.

In one aspect, an environmental systems analysis can be conducted concurrently with the other project activities and may focus on two specific objectives: materials handling considerations and environmental compliance. In one aspect, the materials handling design will address the dewatering, filtration, and the short- and long-term material storage requirements for the upstream concentration process. In one aspect, specific research tasks to be addressed for the material handling system design include, but are not limited to:

1. In one aspect, the following elements for the woven geotextile GEOTUBE® bags proposed for the first and second splits have been explored at field scale: engineering strength and permittivity design, GEOTUBE® proportion sizing (length and diameter ratios), GEOTUBE® stacking configurations and techniques to ensure safe and environmentally benign dewatering operations.

2. In another aspect process treatment requirements for the GEOTUBE® water filtrate, primary liquid containment, liquid transport design and layout, and geotechnical material characterization consisting of material testing for physical, strength and permeability properties will be determined.
3. In another aspect, a series of numerical modeling activities can be performed for mathematical characterization of drainage in the system and the potential improvements. The outcome of the modeling is to compare and contrast with the laboratory testing and field results.
4. In still another aspect, increasing process efficiency can be studied to identify and reduce barriers to future technology entry into the REE/CM commercialization. Further in this aspect, one specific area for efficiency improvement is sediment dewatering of the feedstock from splits 2 and 3, and the iron-rich sediment from split 1.

Figure 9:
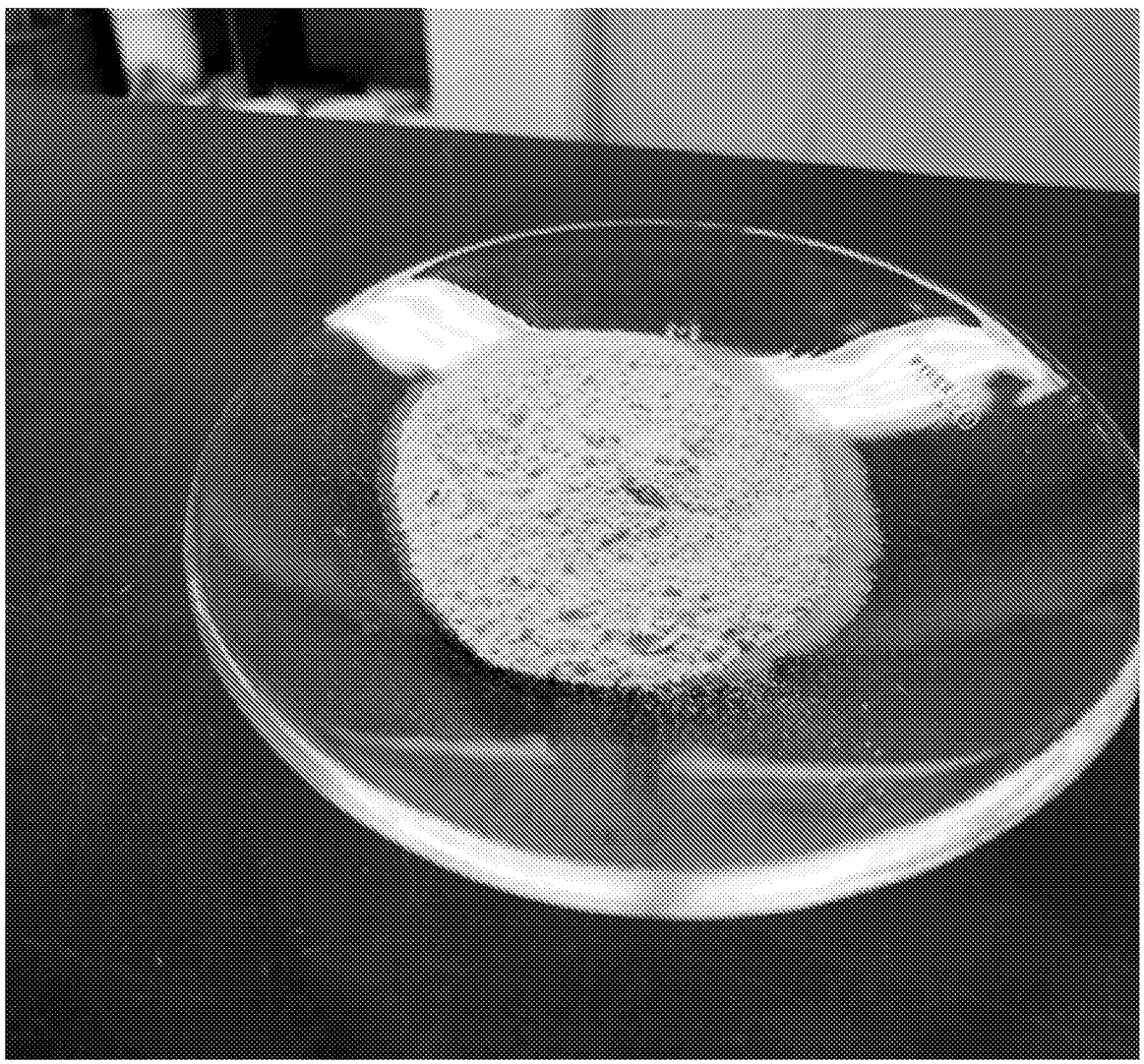
FIG. 9 shows a photographic image of representative high grade (80%) rare earth concentrate produced by a process disclosed herein.

In one aspect, using hydrometallurgical methods in the disclosed process at the bench scale, a concentrate with 80% rare earth oxides was produced from AMD treatment sludge (FIG. 9).

In one aspect, extraction of REE/CM from AMD treatment precipitates and from untreated AMD was evaluated. In one aspect, unprocessed AMD treatment solids can be transported to a central ALSX facility for final processing into a high grade MREO. In an alternative aspect, a field concentrate can be extracted and dewatered upstream of a conventional AMD treatment plant and transported to the ALSX facility. In a further aspect, the process disclosed herein can accept and produce an REE/CM concentrate from either source.

HPC Composition.

In various aspects, the present disclosure pertains to a HPC composition obtained from an input source, e.g., an AMD feedstock material, using the disclosed processes, methods, and systems. In a further aspect, the disclosed HPC composition is enriched in one or more REE material compared to the AMD feedstock material used. The disclosed HPS composition can be used in further steps, as disclosed herein, to further enrich or purify one or more REE material, e.g., as a feedstock material for production of a disclosed PLS composition.

PLS Composition.

In various aspects, the present disclosure pertains to a PLS composition obtained from an input source, e.g., a HPC composition, using the disclosed processes, methods, and systems. In a further aspect, the disclosed PLS composition is enriched in one or more REE material compared to the HPC composition used. The disclosed PLS composition can be used in further steps, as disclosed herein, to further enrich or purify one or more REE material.

AMD may occur from coal and hard rock mining activities and the like. A treatment location site may include but is not limited to hard rock mines, backfilled coal mining waste, backfilled mining waste, waste rock piles, copper mines, gold mines, lead mines, silver mines, coal mines, and the like. In various aspects, the AMD used in the disclosed methods and composition include at least one acid mine drainage generation source. An acid mine drainage generation source may be identified at a treatment location site with an acid mine drainage generation source identifier. Identification may include human evaluation, site survey methods, electromagnetic induction surveys, ground electromagnetic induction surveys, air electromagnetic surveys, and the like.

The least one acid mine drainage generation source providing AMD feedstock material may be derived from, associated with, or originate with various coal and hard rock mining activities and the like. A treatment location site may include but is not limited to hard rock mines, backfilled coal mining waste, backfilled mining waste, waste rock piles, copper mines, gold mines, lead mines, silver mines, coal mines, and the like. In embodiments, a treatment location site may include at least one acid mine drainage generation source. An acid mine drainage generation source may be identified at a treatment location site with an acid mine drainage generation source identifier. Identification may include human evaluation, site survey methods, electromagnetic induction surveys, ground electromagnetic induction surveys, air electromagnetic surveys, and the like. Utilization of electromagnetic induction surveys, sometimes referred to as EM mapping, may determine areas of low resistance in a treatment location site and may even measure changes in subsurface resistivity throughout a site. Low resistance may be an indication of acid mine drainage generation source material. Accordingly, EM mapping may provide valuable information in potential hotspots and perhaps even acid mine drainage plume movement within a site. From an identification of an acid mine drainage generation source, at least one treatment area may be determined as optimal for administering a treatment injection. As such, at least one injection well may be installed in the treatment areas.

In a further aspect, the PLS composition can vary depending on the composition of the AMD feedstock used. Representative average values that were experimentally determined for multiple PLS compositions prepared using the disclosed processes, methods, and devices are shown in Tables 1 below.

TABLE 1

Distribution of Elemental Concentrations from Typical PLS Samples.

| Element | Number of Samples | Mean* | Median* | Min.* | Max.* | Standard Deviation* | Confidence Interval* |
|---|---|---|---|---|---|---|---|
| Al | 33 | 4701.78 | 2736.24 | 2130.78 | 21,446.32 | 4637.25 | 1644.30 |
| Ca | 33 | 1008.67 | 745.22 | 590.10 | 2605.74 | 537.24 | 190.50 |
| Co | 33 | 43.56 | 24.04 | 18.43 | 195.29 | 46.09 | 16.34 |
| Fe | 33 | 363.78 | 4.96 | 2.20 | 3823.39 | 961.16 | 340.81 |
| Mg | 33 | 3068.26 | 2353.81 | 164.19 | 13,134.87 | 3109.94 | 1102.74 |
| Mn | 33 | 987.22 | 707.77 | 74.44 | 3689.29 | 963.37 | 341.60 |
| Na | 33 | 9225.59 | 9619.27 | 47.55 | 28,475.75 | 6479.95 | 2297.69 |
| Ni | 17 | 56.25 | 49.94 | 38.63 | 91.94 | 16.24 | 8.35 |
| Si | 33 | 346.34 | 73.96 | 32.54 | 3559.26 | 783.14 | 277.69 |
| Zn | 17 | 242.70 | 110.26 | 85.24 | 686.61 | 222.97 | 114.64 |

TABLE 1-continued

Distribution of Elemental Concentrations from Typical PLS Samples.

| Element | Number of Samples | Mean* | Median* | Min.* | Max.* | Standard Deviation* | Confidence Interval* |
|---|---|---|---|---|---|---|---|
| SO₄ | 33 | 1059.86 | 1011.56 | 25.39 | 3141.38 | 518.79 | 183.96 |
| Cl | 33 | 9.38 | 5.06 | 2.04 | 77.87 | 12.86 | 4.56 |
| Sc | 31 | 552.50 | 133.92 | 74.75 | 2822.18 | 785.28 | 288.04 |
| Y | 33 | 23,970.81 | 13,527.36 | 7151.53 | 111,224.38 | 24,997.97 | 8863.89 |
| La | 33 | 6221.13 | 2697.71 | 1477.79 | 32,650.27 | 7826.85 | 2775.28 |
| Ce | 33 | 16,906.87 | 7749.36 | 4906.65 | 86,414.33 | 20,395.50 | 7231.93 |
| Pr | 33 | 2405.26 | 1281.05 | 782.96 | 10,803.77 | 2498.28 | 885.85 |
| Nd | 33 | 11,344.41 | 6492.20 | 3688.07 | 48,145.36 | 10,774.42 | 3820.44 |
| Sm | 33 | 3178.51 | 2087.37 | 1133.53 | 12,001.32 | 2548.86 | 903.78 |
| Eu | 33 | 838.37 | 530.82 | 302.10 | 3,223.56 | 688.45 | 244.12 |
| Gd | 33 | 4850.06 | 3046.42 | 1820.15 | 18,229.43 | 3932.68 | 1394.47 |
| Tb | 33 | 789.93 | 484.26 | 339.07 | 3,021.65 | 660.37 | 234.16 |
| Dy | 33 | 4491.55 | 2574.64 | 1995.76 | 18,229.21 | 4100.69 | 1454.04 |
| Ho | 33 | 885.34 | 487.86 | 354.92 | 3639.79 | 830.31 | 294.41 |
| Er | 33 | 2317.29 | 1227.86 | 908.26 | 10,032.59 | 2302.52 | 816.44 |
| Tm | 33 | 296.40 | 151.07 | 112.90 | 1291.24 | 298.81 | 105.95 |
| Yb | 33 | 1645.19 | 827.17 | 638.35 | 7380.85 | 1707.64 | 605.50 |
| Lu | 33 | 242.53 | 123.16 | 91.79 | 1100.99 | 251.70 | 89.25 |
| Th | 25 | 37.28 | 6.14 | 0.06 | 322.19 | 75.65 | 31.23 |
| U | 33 | 359.75 | 267.88 | 198.47 | 1205.17 | 219.05 | 77.67 |

*Units for aluminum through chloride are mg/L. Units for scandium through uranium are μg/L.

Further representative average values that were experimentally determined for multiple PLS compositions prepared using the disclosed processes, methods, and devices are shown in Table 2 below.

TABLE 2

Typical PLS Composition.

| aqueous 20'0852 | mg/L | % TREE |
|---|---|---|
| Sc | 0.3 | 1.3% |
| Y | 5.7 | 24.5% |
| La | 1.5 | 6.3% |
| Ce | 3.8 | 16.2% |
| Pr | 0.7 | 3.1% |
| Nd | 2.9 | 12.6% |
| Sm | 1.3 | 5.5% |
| Eu | 0.3 | 1.4% |
| Gd | 1.9 | 8.3% |
| Tb | 0.4 | 1.6% |
| Dy | 1.9 | 8.0% |
| Ho | 0.4 | 1.7% |
| Er | 1.0 | 4.3% |
| Tm | 0.2 | 0.7% |
| Yb | 0.9 | 3.9% |
| Lu | 0.1 | 0.6% |
| TREE | 23.3 | |
| Co | 17.9 | 77% |
| TREE + Co | 41.2 | |
| Th + U | 0.4 | 1.8% |

| | mg/L |
|---|---|
| Gangue | |
| Al | 2,625.7 |
| Fe | 10.2 |
| Mn | 84.6 |
| Ni | 41.2 |
| Si | 25.7 |
| Zn | 126.6 |
| | 2,913.9 |
| other ions | |
| Ca | 1,546.0 |
| Mg | 528.6 |

TABLE 2-continued

Typical PLS Composition.

| Na | 27,548.2 |
|---|---|
| SO4 | 0.0 |
| Cl | 5.4 |
| | 29,628.2 |

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least three of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least four of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least five of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least six of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least seven of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least eight of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least nine of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises at least ten of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of at least about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, about 25 mg/L, about 26 mg/L, about 27 mg/L, about 28 mg/L, about 29 mg/L, about 30 mg/L, about 31 mg/L, about 32 mg/L, about 33 mg/L, about 34 mg/L, about 35 mg/L, about 36 mg/L, about 37 mg/L, about 38 mg/L, about 39 mg/L, about 40 mg/L, about 41 mg/L, about 42 mg/L, about 43 mg/L, about 44 mg/L, about 45 mg/L, about 46 mg/L, about 47 mg/L, about 48 mg/L, about 49 mg/L, about 50 mg/L; or a range encompassed by any two of the foregoing values; or any set of the foregoing values; wherein it is understood that the TREE comprises lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises three or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least three of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least four of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least five of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least six of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least seven of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least eight of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least nine of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises at least ten of lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises TREE present at a concentration of about 5 mg/L to 100 mg/L, 5 mg/L to 95 mg/L, 5 mg/L to 85 mg/L, 5 mg/L to 80 mg/L, 5 mg/L to 75 mg/L, 5 mg/L to 70 mg/L, 5 mg/L to 65 mg/L, 5 mg/L to 60 mg/L, 5 mg/L to 55 mg/L, 5 mg/L to 50 mg/L, 5 mg/L to 45 mg/L, 5 mg/L to 40 mg/L; or a sub-range within any of the foregoing ranges; or any set of the values with the foregoing ranges; wherein it is understood that the TREE comprises lanthanum, cerium, praseodymium, neodymium, promethium, samarium, europium, gadolinium, terbium, dysprosium, holmium, erbium, thulium, ytterbium, lutetium, scandium, and yttrium.

In a further aspect, the PLS composition comprises four or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises fiver or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises six or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises seven or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises eight or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises nine or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L;

Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises ten or more of the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the PLS composition comprises the following materials in the indicated amounts: Sc present at a concentration of from about 0.05 mg/L to about 1 mg/L; Y present at a concentration of from about 0.5 mg/L to about 10 mg/L; La present at a concentration of from about 0.05 mg/L to about 5 mg/L; Ce present at a concentration of from about 0.5 mg/L to about 7.5 mg/L; Pr present at a concentration of from about 0.05 mg/L to about 2.5 mg/L; Nd present at a concentration of from about 0.5 mg/L to about 10 mg/L; Sm present at a concentration of from about 0.1 mg/L to about 2.5 mg/L; Eu present at a concentration of from about 0.05 mg/L to about 1.5 mg/L; Gd present at a concentration of from about 0.1 mg/L to about 5 mg/L; Tb present at a concentration of from about 0.05 mg/L to about 1.5 mg/L; Dy present at a concentration of from about 0.1 mg/L to about 5 mg/L; Ho present at a concentration of from about 0.05 mg/L to about 2 mg/L; Er present at a concentration of from about 0.1 mg/L to about 5 mg/L; Tm present at a concentration of from about 0.05 mg/L to about 2 mg/L; Yb present at a concentration of from about 0.05 mg/L to about 5 mg/L; and Lu present at a concentration of from about 0.01 mg/L to about 1 mg/L; or a sub-range within any of the foregoing ranges; or one or more discrete values within any of the foregoing ranges.

In a further aspect, the disclosed PLS composition comprises Fe a lower concentration than present in the AMD feedstock. In a still further aspect, the disclosed PLS composition comprises Fe at a concentration less than about 25 mg/L, about 24 mg/L, about 23 mg/L, about 20 mg/L, about 19 mg/L, about 18 mg/L, about 17 mg/L, about 16 mg/L, about 15 mg/L, about 14 mg/L, about 13 mg/L, about 12 mg/L, about 10 mg/L, about 9 mg/L, about 8 mg/L, about 7 mg/L, about 6 mg/L, about 5 mg/L; or a range having a lower limit of essentially about 0 mg/L to an upper limit that is any of the foregoing values; or a range having a lower limit of essentially about 5 mg/L to an upper limit that is any of the foregoing values; or a range having a lower limit of essentially about 7.5 mg/L to an upper limit that is any of the foregoing values; or any combination of the foregoing values.

In a further aspect, the disclosed PLS composition comprises thorium and uranium present in a total concentration of less than about 10 mg/L, about 9 mg/L, about 8 mg/L, about 7 mg/L, about 6 mg/L, about 5 mg/L, about 4 mg/L, about 3 mg/L, about 2 mg/L, about 1 mg/L, about 0.9 mg/L, about 0.8 mg/L, about 0.7 mg/L, about 0.6 mg/L, about 0.5 mg/L, about 0.4 mg/L, about 0.3 mg/L, about 0.2 mg/L, about 0.1 mg/L; or a range encompassed by any two of the foregoing values; or any set of the foregoing values.

In a further aspect, the disclosed PLS composition comprises cobalt in an amount of about 1 mg/L to about 30 mg/L, about 1 mg/L to about 25 mg/L, about 1 mg/L to about 20 mg/L, about 1 mg/L to about 15 mg/L, about 5 mg/L to about 30 mg/L, about 5 mg/L to about 25 mg/L, about 5 mg/L to about 20 mg/L, about 5 mg/L to about 15 mg/L, about 10 mg/L to about 30 mg/L, about 10 mg/L to about 25 mg/L, about 10 mg/L to about 20 mg/L, about 10 mg/L to about 15 mg/L, about 15 mg/L to about 30 mg/L, about 15 mg/L to about 25 mg/L, about 15 mg/L to about 20 mg/L, about 20 mg/L to about 30 mg/L, about 20 mg/L to about 25 mg/L; or a sub-range within any of the foregoing ranges; or a set of values within any of the foregoing ranges.

In a further aspect, the disclosed PLS composition comprises about 50 wt % to about 80 wt % cobalt, about 55 wt % to about 80 wt % cobalt, about 60 wt % to about 80 wt % cobalt, about 65 wt % to about 80 wt % cobalt, about 70 wt % to about 80 wt % cobalt, about 50 wt % to about 85 wt % cobalt, about 55 wt % to about 85 wt % cobalt, about 60 wt % to about 85 wt % cobalt, about 65 wt % to about 85 wt % cobalt, about 70 wt % to about 85 wt % cobalt, about 50 wt % to about 90 wt % cobalt, about 55 wt % to about 90 wt % cobalt, about 60 wt % to about 90 wt % cobalt, about 65 wt % to about 90 wt % cobalt, about 70 wt % to about 90 wt % cobalt; or any sub-range within the foregoing ranges; or any set of values within the foregoing ranges.

REFERENCES

The following references are cited herein throughout.

Ref 1. Stumm, W., and Morgan, J. J. 1995. Aquatic Chemistry, Chemical Equilibria and Rates in Natural Waters, 3rd ed. Hoboken, NJ: John Wiley & Sons, Inc.: 1022 pp.

Ref 2. Kim, E and Osseo-Asare, K. 2012. "Aqueous stability of thorium and rare earth metals in monazite hydrometallurgy: Eh-pH diagrams for the systems Th—, Ce—, La—, Nd—(PO4)-(SO4)-H2O at 25° C.," Hydrometallurgy, 113-114:67-78.

Ref 3. Pourbaix, M., 1966. Atlas of electrochemical equilibrium in aqueous solution. New York, NY: Pergamon.

Ref 4. Bourricaudy, Ernesto et al. 2016. "Commissioning of a Mini SX Pilot Plant at SGS Minerals—Lakefield Site". In: IMPC 2016: XXVIII International Mineral Processing Congress Proceedings. Quebec, Canada: pp. 1-16.

Ref 5. Chiarizia, Renato and Alexandra Briand, 2007. "Third phase formation in the extraction of inorganic acids by TBP in n-Octane," Solvent Extraction and Ion Exchange, 25:351-371.

Ref 6. Kedari, C S et al., 2006. "Third Phase Formation in the Solvent Extraction System Ir (IV)— Cyanex 923," Solvent Extraction and Ion Exchange, 23:545-559.

Ref 7. Koermer, Scott and Aaron Noble (2018). "Unpublished Solvent Extraction Research". PhD thesis. Virginia Polytechnic University.

Ref 8. Ren, Panpan, 2019. "Recovery of Rare Earth Elements (REEs) from Coal Mine Drainage Sludge Leachate," PhD thesis. West Virginia University.

Ref 9. Ritcey, G. M., 1980. "Crud in solvent extraction processing—a review of causes and treatment," Hydrometallurgy, 5:97-107.

Ref 10. Ritcey, G. M. and A. W. Ashbrook, 1979. Solvent Extraction Principles and Applications to Process Metallurgy Part II. Volume 1. Amsterdam: Elsevier Scientific Publishing.

Ref 11. Ritcey, G. M. and A. W. Ashbrook, 1984. Solvent extraction Principles and Applications to Process Metallurgy Part I. Volume 1. Amsterdam: Elsevier Scientific Publishing.

Ref 12. Takeno, Naoto, 2005. "Atlas of Eh-pH diagrams—Intercomparison of thermodynamic databases" Geological Survey of Japan, Tech. Rep. 419:1-287.

Ref 13. Wang, Weiwei, Yoko Pranolo, and Chu Yong Cheng, 2013. "Recovery of scandium from synthetic red mud leach solutions by solvent extraction with D2EHPA," Separation and Purification Technology, 108: 96-102.

Aspects.

The following listing of exemplary aspects supports and is supported by the disclosure provided herein.

Aspect 1. A method for preparing a HPC enriched in rare earth elements and critical minerals, the method comprising: (a) contacting a raw material with a first base in an amount sufficient to adjust the pH to a value from about 4.0 to about 6.0, thereby forming a mixture comprising a first aqueous phase and a first solid concentrate; (b) separating the first aqueous phase from the first solid concentrate; (c) contacting the first aqueous phase with a second base in an amount sufficient to adjust the pH to a value from about 7.0 to about 9.0, thereby forming a mixture comprising a second aqueous phase and the hydraulic pre-concentrate; (d) removing the second aqueous phase and collecting the hydraulic pre-concentrate; wherein the raw material comprises rare earth elements; and wherein the hydraulic pre-concentrate is enriched in rare earth elements; and optionally wherein the first solid concentrate is enriched in Sc compared to the raw material.

Aspect 2. The method of Aspect 1, wherein the raw material comprises raw acid mine drainage (AMD), an AMD precipitate (AMDp), an enriched AMD precipitate (eAMDp), or combinations thereof.

Aspect 3. The method of Aspect 2, wherein the raw material comprises raw acid mine drainage (AMD).

Aspect 4. The method of any one of Aspect 1-Aspect 3, wherein the raw material has a pH less than about 4.0.

Aspect 5. The method of Aspect 4, wherein the raw material has a pH of from about 0.1 to about 4.0.

Aspect 6. The method of Aspect 4, wherein the raw material has a pH of from about 0.5 to about 4.0.

Aspect 7. The method of Aspect 4, wherein the raw material has a pH of from about 0.6 to about 4.0.

Aspect 8. The method of Aspect 4, wherein the raw material has a pH of from about 0.7 to about 4.0.

Aspect 9. The method of Aspect 4, wherein the raw material has a pH of from about 0.8 to about 4.0.

Aspect 10. The method of Aspect 4, wherein the raw material has a pH of from about 0.9 to about 4.0.

Aspect 11. The method of Aspect 4, wherein the raw material has a pH of from about 1.0 to about 4.0.

Aspect 12. The method of Aspect 4, wherein the raw material has a pH of from about 0.1 to about 3.5.

Aspect 13. The method of Aspect 4, wherein the raw material has a pH of from about 0.5 to about 3.5.

Aspect 14. The method of Aspect 4, wherein the raw material has a pH of from about 0.6 to about 3.5.

Aspect 15. The method of Aspect 4, wherein the raw material has a pH of from about 0.7 to about 3.5.

Aspect 16. The method of Aspect 4, wherein the raw material has a pH of from about 0.8 to about 3.5.

Aspect 17. The method of Aspect 4, wherein the raw material has a pH of from about 0.9 to about 3.5.

Aspect 18. The method of Aspect 4, wherein the raw material has a pH of from about 1.0 to about 3.5.

Aspect 19. The method of Aspect 4, wherein the raw material has a pH of from about 0.1 to about 3.0.

Aspect 20. The method of Aspect 4, wherein the raw material has a pH of from about 0.5 to about 3.0.

Aspect 21. The method of Aspect 4, wherein the raw material has a pH of from about 0.6 to about 3.0.

Aspect 22. The method of Aspect 4, wherein the raw material has a pH of from about 0.7 to about 3.0.

Aspect 23. The method of Aspect 4, wherein the raw material has a pH of from about 0.8 to about 3.0.

Aspect 24. The method of Aspect 4, wherein the raw material has a pH of from about 0.9 to about 3.0.

Aspect 25. The method of Aspect 4, wherein the raw material has a pH of from about 1.0 to about 3.0.

Aspect 26. The method of Aspect 4, wherein the raw material has a pH of from about 0.1 to about 2.5.

Aspect 27. The method of Aspect 4, wherein the raw material has a pH of from about 0.5 to about 2.5.

Aspect 28. The method of Aspect 4, wherein the raw material has a pH of from about 0.6 to about 2.5.

Aspect 29. The method of Aspect 4, wherein the raw material has a pH of from about 0.7 to about 2.5.

Aspect 30. The method of Aspect 4, wherein the raw material has a pH of from about 0.8 to about 2.5.

Aspect 31. The method of Aspect 4, wherein the raw material has a pH of from about 0.9 to about 2.5.

Aspect 32. The method of Aspect 4, wherein the raw material has a pH of from about 1.0 to about 2.5.

Aspect 33. The method of Aspect 4, wherein the raw material has a pH of from about 0.1 to about 2.0.

Aspect 34. The method of Aspect 4, wherein the raw material has a pH of from about 0.5 to about 2.0.

Aspect 35. The method of Aspect 4, wherein the raw material has a pH of from about 0.6 to about 2.0.

Aspect 36. The method of Aspect 4, wherein the raw material has a pH of from about 0.7 to about 2.0.

Aspect 37. The method of Aspect 4, wherein the raw material has a pH of from about 0.8 to about 2.0.

Aspect 38. The method of Aspect 4, wherein the raw material has a pH of from about 0.9 to about 2.0.

Aspect 39. The method of Aspect 4, wherein the raw material has a pH of from about 1.0 to about 3.0.

Aspect 40. The method of any one of Aspect 1-Aspect 39, wherein the first base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 41. The method of Aspect 40, wherein the first base comprises calcium hydroxide.

Aspect 42. The method of any one of Aspect 1-Aspect 39, wherein the contacting the raw material with the first base is in an amount sufficient to adjust the pH to a value from about 4.0 to about 5.0.

Aspect 43. The method of Aspect 42, wherein the contacting the raw material with the first base is in an amount sufficient to adjust the pH to a value from about 4.0 to about 4.9.

Aspect 44. The method of Aspect 42, wherein the contacting the raw material with the first base is in an amount sufficient to adjust the pH to a value from about 4.0 to about 4.8.

Aspect 45. The method of Aspect 42, wherein the contacting the raw material with the first base is in an amount sufficient to adjust the pH to a value from about 4.0 to about 4.7.

Aspect 46. The method of Aspect 42, wherein the contacting the raw material with the first base is in an amount sufficient to adjust the pH to a value from about 4.0 to about 4.6.

Aspect 47. The method of Aspect 42, wherein the contacting the raw material with the first base is in an amount sufficient to adjust the pH to a value from about 4.0 to about 4.5.

Aspect 48. The method of Aspect 42, wherein the contacting the raw material with the first base is in an amount sufficient to adjust the pH to a value from about 4.0 to about 4.4.

Aspect 49. The method of Aspect 42, wherein the contacting the raw material with the first base is in an amount sufficient to adjust the pH to a value from about 4.0 to about 4.3.

Aspect 50. The method of Aspect 42, wherein the contacting the raw material with the first base is in an amount sufficient to adjust the pH to a value from about 4.0 to about 4.2.

Aspect 51. The method of Aspect 42, wherein the contacting the raw material with the first base is in an amount sufficient to adjust the pH to a value from about 4.0 to about 4.1.

Aspect 52. The method of Aspect 42, wherein the contacting the raw material with the first base is in an amount sufficient to adjust the pH to a value from about 4.1 to about 5.0.

Aspect 53. The method of Aspect 42, wherein the contacting the raw material with the first base is in an amount sufficient to adjust the pH to a value from about 4.1 to about 4.9.

Aspect 54. The method of Aspect 42, wherein the contacting the raw material with the first base is in an amount sufficient to adjust the pH to a value from about 4.1 to about 4.8.

Aspect 55. The method of Aspect 42, wherein the contacting the raw material with the first base is in an amount sufficient to adjust the pH to a value from about 4.1 to about 4.7.

Aspect 56. The method of Aspect 42, wherein the contacting the raw material with the first base is in an amount sufficient to adjust the pH to a value from about 4.1 to about 4.6.

Aspect 57. The method of Aspect 42, wherein the contacting the raw material with the first base is in an amount sufficient to adjust the pH to a value from about 4.1 to about 4.5.

Aspect 58. The method of Aspect 42, wherein the contacting the raw material with the first base is in an amount sufficient to adjust the pH to a value from about 4.1 to about 4.4.

Aspect 59. The method of Aspect 42, wherein the contacting the raw material with the first base is in an amount sufficient to adjust the pH to a value from about 4.1 to about 4.3.

Aspect 60. The method of Aspect 42, wherein the contacting the raw material with the first base is in an amount sufficient to adjust the pH to a value from about 4.1 to about 4.2.

Aspect 61. The method of Aspect 42, wherein the contacting the raw material with the first base is in an amount sufficient to adjust the pH to a value from about 4.2 to about 5.0.

Aspect 62. The method of Aspect 42, wherein the contacting the raw material with the first base is in an amount sufficient to adjust the pH to a value from about 4.2 to about 4.9.

Aspect 63. The method of Aspect 42, wherein the contacting the raw material with the first base is in an amount sufficient to adjust the pH to a value from about 4.2 to about 4.8.

Aspect 64. The method of Aspect 42, wherein the contacting the raw material with the first base is in an amount sufficient to adjust the pH to a value from about 4.2 to about 4.7.

Aspect 65. The method of Aspect 42, wherein the contacting the raw material with the first base is in an amount sufficient to adjust the pH to a value from about 4.2 to about 4.6.

Aspect 66. The method of Aspect 42, wherein the contacting the raw material with the first base is in an amount sufficient to adjust the pH to a value from about 4.2 to about 4.5.

Aspect 67. The method of Aspect 42, wherein the contacting the raw material with the first base is in an amount sufficient to adjust the pH to a value from about 4.2 to about 4.4.

Aspect 68. The method of Aspect 42, wherein the contacting the raw material with the first base is in an amount sufficient to adjust the pH to a value from about 4.2 to about 4.3.

Aspect 69. The method of Aspect 42, wherein the contacting the raw material with the first base is in an amount sufficient to adjust the pH to a value from about 4.3 to about 5.0.

Aspect 70. The method of Aspect 42, wherein the contacting the raw material with the first base is in an amount sufficient to adjust the pH to a value from about 4.3 to about 4.9.

Aspect 71. The method of Aspect 42, wherein the contacting the raw material with the first base is in an amount sufficient to adjust the pH to a value from about 4.3 to about 4.8.

Aspect 72. The method of Aspect 42, wherein the contacting the raw material with the first base is in an amount sufficient to adjust the pH to a value from about 4.3 to about 4.7.

Aspect 73. The method of Aspect 42, wherein the contacting the raw material with the first base is in an amount sufficient to adjust the pH to a value from about 4.3 to about 4.6.

Aspect 74. The method of Aspect 42, wherein the contacting the raw material with the first base is in an amount sufficient to adjust the pH to a value from about 4.3 to about 4.5.

Aspect 75. The method of Aspect 42, wherein the contacting the raw material with the first base is in an amount sufficient to adjust the pH to a value from about 4.3 to about 4.4.

Aspect 76. The method of Aspect 42, wherein the contacting the raw material with the first base is in an amount sufficient to adjust the pH to a value from about 4.4 to about 5.0.

Aspect 77. The method of Aspect 42, wherein the contacting the raw material with the first base is in an amount sufficient to adjust the pH to a value from about 4.4 to about 4.9.

Aspect 78. The method of Aspect 42, wherein the contacting the raw material with the first base is in an amount sufficient to adjust the pH to a value from about 4.4 to about 4.8.

Aspect 79. The method of Aspect 42, wherein the contacting the raw material with the first base is in an amount sufficient to adjust the pH to a value from about 4.4 to about 4.7.

Aspect 80. The method of Aspect 42, wherein the contacting the raw material with the first base is in an amount sufficient to adjust the pH to a value from about 4.4 to about 4.6.

Aspect 81. The method of Aspect 42, wherein the contacting the raw material with the first base is in an amount sufficient to adjust the pH to a value from about 4.4 to about 4.5.

Aspect 82. The method of Aspect 42, wherein the contacting the raw material with the first base is in an amount sufficient to adjust the pH to a value from about 4.5 to about 5.0.

Aspect 83. The method of Aspect 42, wherein the contacting the raw material with the first base is in an amount sufficient to adjust the pH to a value from about 4.5 to about 4.9.

Aspect 84. The method of Aspect 42, wherein the contacting the raw material with the first base is in an amount sufficient to adjust the pH to a value from about 4.5 to about 4.8.

Aspect 85. The method of Aspect 42, wherein the contacting the raw material with the first base is in an amount sufficient to adjust the pH to a value from about 4.5 to about 4.7.

Aspect 86. The method of Aspect 42, wherein the contacting the raw material with the first base is in an amount sufficient to adjust the pH to a value from about 4.5 to about 4.6.

Aspect 87. The method of Aspect 42, wherein the contacting the raw material with the first base is in an amount sufficient to adjust the pH to a value from about 4.1 to about 4.2.

Aspect 88. The method of any one of Aspect 1-Aspect 39, wherein the contacting the raw material with the first base is in an amount sufficient to adjust the pH to a value from about 3.5 to about 4.5.

Aspect 89. The method of Aspect 88, wherein the contacting the raw material with the first base is in an amount sufficient to adjust the pH to a value from about 3.6 to about 4.5.

Aspect 90. The method of Aspect 88, wherein wherein the contacting the raw material with the first base is in an amount sufficient to adjust the pH to a value from about 3.7 to about 4.5.

Aspect 91. The method of Aspect 88, wherein wherein the contacting the raw material with the first base is in an amount sufficient to adjust the pH to a value from about 3.8 to about 4.5.

Aspect 92. The method of Aspect 88, wherein wherein the contacting the raw material with the first base is in an amount sufficient to adjust the pH to a value from about 3.9 to about 4.5.

Aspect 93. The method of Aspect 88, wherein wherein the contacting the raw material with the first base is in an amount sufficient to adjust the pH to a value from about 4.0 to about 4.5.

Aspect 94. The method of Aspect 88, wherein wherein the contacting the raw material with the first base is in an amount sufficient to adjust the pH to a value from about 3.5 to about 4.4.

Aspect 95. The method of Aspect 88, wherein wherein the contacting the raw material with the first base is in an amount sufficient to adjust the pH to a value from about 3.6 to about 4.4.

Aspect 96. The method of Aspect 88, wherein wherein the contacting the raw material with the first base is in an amount sufficient to adjust the pH to a value from about 3.7 to about 4.4.

Aspect 97. The method of Aspect 88, wherein the contacting the raw material with the first base is in an amount sufficient to adjust the pH to a value from about 3.8 to about 4.4.

Aspect 98. The method of Aspect 88, wherein the contacting the raw material with the first base is in an amount sufficient to adjust the pH to a value from about 3.9 to about 4.4.

Aspect 99. The method of Aspect 88, wherein the contacting the raw material with the first base is in an amount sufficient to adjust the pH to a value from about 4.0 to about 4.4.

Aspect 100. The method of Aspect 88, wherein the contacting the raw material with the first base is in an amount sufficient to adjust the pH to a value from about 3.5 to about 4.3.

Aspect 101. The method of Aspect 88, wherein the contacting the raw material with the first base is in an amount sufficient to adjust the pH to a value from about 3.6 to about 4.3.

Aspect 102. The method of Aspect 88, wherein the contacting the raw material with the first base is in an amount sufficient to adjust the pH to a value from about 3.7 to about 4.3.

Aspect 103. The method of Aspect 88, wherein the contacting the raw material with the first base is in an amount sufficient to adjust the pH to a value from about 3.8 to about 4.3.

Aspect 104. The method of Aspect 88, wherein the contacting the raw material with the first base is in an amount sufficient to adjust the pH to a value from about 3.9 to about 4.3.

Aspect 105. The method of Aspect 88, wherein the contacting the raw material with the first base is in an amount sufficient to adjust the pH to a value from about 4.0 to about 4.3.

Aspect 106. The method of Aspect 88, wherein the contacting the raw material with the first base is in an amount sufficient to adjust the pH to a value from about 3.5 to about 4.2.

Aspect 107. The method of Aspect 88, wherein the contacting the raw material with the first base is in an amount sufficient to adjust the pH to a value from about 3.6 to about 4.2.

Aspect 108. The method of Aspect 88, wherein the contacting the raw material with the first base is in an amount sufficient to adjust the pH to a value from about 3.7 to about 4.2.

Aspect 109. The method of Aspect 88, wherein the contacting the raw material with the first base is in an amount sufficient to adjust the pH to a value from about 3.8 to about 4.2.

Aspect 110. The method of Aspect 88, wherein the contacting the raw material with the first base is in an amount sufficient to adjust the pH to a value from about 3.9 to about 4.2.

Aspect 111. The method of Aspect 88, wherein the contacting the raw material with the first base is in an amount sufficient to adjust the pH to a value from about 4.0 to about 4.2.

Aspect 112. The method of Aspect 88, wherein the contacting the raw material with the first base is in an amount sufficient to adjust the pH to a value from about 3.5 to about 4.1.

Aspect 113. The method of Aspect 88, wherein the contacting the raw material with the first base is in an amount sufficient to adjust the pH to a value from about 3.6 to about 4.1.

Aspect 114. The method of Aspect 88, wherein the contacting the raw material with the first base is in an amount sufficient to adjust the pH to a value from about 3.7 to about 4.1.

Aspect 115. The method of Aspect 88, wherein the contacting the raw material with the first base is in an amount sufficient to adjust the pH to a value from about 3.8 to about 4.1.

Aspect 116. The method of Aspect 88, wherein the contacting the raw material with the first base is in an amount sufficient to adjust the pH to a value from about 3.9 to about 4.1.

Aspect 117. The method of Aspect 88, wherein the contacting the raw material with the first base is in an amount sufficient to adjust the pH to a value from about 4.0 to about 4.1.

Aspect 118. The method of any one of Aspect 1-Aspect 117, wherein the contacting the raw material with the first base is carried out in a pond, a mixing, or combinations thereof.

Aspect 119. The method of any one of Aspect 1-Aspect 118, further comprising oxidation; wherein oxidation is mechanical oxidation, electrochemical oxidation, chemical oxidation, or combinations thereof.

Aspect 120. The method of Aspect 119, wherein oxidation comprises adding to the raw material and the first base an oxidizing agent.

Aspect 121. The method of Aspect 120, wherein the oxidizing agent comprises a peroxide, ozone, a permanganate, or combinations thereof.

Aspect 122. The method of Aspect 121, wherein the oxidizing agent is hydrogen peroxide.

Aspect 123. The method of Aspect 122, wherein the hydrogen peroxide is added in an mol amount that is equal to:

$$Df \times (Fe + (2 \times Mn)),$$

wherein Df is a number having a value of about 1.2 to about 1.5; wherein Fe represents the mol amount of iron present; and Mn represents the mol amount of manganese present.

Aspect 124. The method of any one of Aspect 1-Aspect 123, wherein the contacting the raw material with the first base further comprises adding a flocculating agent, a coagulating agent, or combinations thereof.

Aspect 125. The method of any one of Aspect 1-Aspect 124, wherein the separating the first aqueous phase from the first solid concentrate comprises using a clarifier, a settlement basin, or combinations thereof.

Aspect 126. The method of any one of Aspect 1-Aspect 125, wherein the second base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 127. The method of Aspect 126, wherein the second base comprises calcium hydroxide.

Aspect 128. The method of any one of Aspect 1-Aspect 127, wherein the contacting the first aqueous phase with the second base is in an amount sufficient to adjust the pH to a value from about 8.0 to about 8.5.

Aspect 129. The method of Aspect 128, wherein the contacting the first aqueous phase with the second base is in an amount sufficient to adjust the pH to a value from about 8.0 to about 8.4.

Aspect 130. The method of Aspect 128, wherein the contacting the first aqueous phase with the second base is in an amount sufficient to adjust the pH to a value from about 8.0 to about 8.3.

Aspect 131. The method of Aspect 128, wherein the contacting the first aqueous phase with the second base is in an amount sufficient to adjust the pH to a value from about 8.0 to about 8.2.

Aspect 132. The method of Aspect 128, wherein the contacting the first aqueous phase with the second base is an amount sufficient to adjust the pH to a value from about 8.0 to about 8.1.

Aspect 133. The method of Aspect 128, wherein the contacting the first aqueous phase with the second base is an amount sufficient to adjust the pH to a value from about 8.1 to about 8.5.

Aspect 134. The method of Aspect 128, wherein the contacting the first aqueous phase with the second base is an amount sufficient to adjust the pH to a value from about 8.1 to about 8.4.

Aspect 135. The method of Aspect 128, wherein the contacting the first aqueous phase with the second base is an amount sufficient to adjust the pH to a value from about 8.1 to about 8.3.

Aspect 136. The method of Aspect 128, wherein the contacting the first aqueous phase with the second base is an amount sufficient to adjust the pH to a value from about 8.1 to about 8.2.

Aspect 137. The method of Aspect 128, wherein the contacting the first aqueous phase with the second base is an amount sufficient to adjust the pH to a value from about 8.2 to about 8.5.

Aspect 138. The method of Aspect 128, wherein the contacting the first aqueous phase with the second base is an amount sufficient to adjust the pH to a value from about 8.2 to about 8.4.

Aspect 139. The method of Aspect 128, wherein the contacting the first aqueous phase with the second base is an amount sufficient to adjust the pH to a value from about 8.2 to about 8.3.

Aspect 140. The method of Aspect 128, wherein the contacting the first aqueous phase al with the second base is an amount sufficient to adjust the pH to a value from about 8.3 to about 4.5.

Aspect 141. The method of Aspect 128, wherein the contacting the first aqueous phase with the second base is an amount sufficient to adjust the pH to a value from about 8.3 to about 8.4.

Aspect 142. The method of Aspect 128, wherein the contacting the first aqueous phase with the second base is an amount sufficient to adjust the pH to a value from about 8.4 to about 8.5.

Aspect 143. The method of Aspect 128, wherein the contacting the first aqueous phase with the second base is an amount sufficient to adjust the pH to a value from about 8.1 to about 8.2.

Aspect 144. The method of any one of Aspect 1-Aspect 39, wherein the contacting the first aqueous phase with the second base is in an amount sufficient to adjust the pH to a value from about 7.5 to about 8.5.

Aspect 145. The method of Aspect 144, wherein the contacting the first aqueous phase with the second base is in an amount sufficient to adjust the pH to a value from about 7.6 to about 8.5.

Aspect 146. The method of Aspect 144, wherein the contacting the first aqueous phase with the second base an amount sufficient to adjust the pH to a value from about 7.7 to about 8.5.

Aspect 147. The method of Aspect 144, wherein the contacting the first aqueous phase with the second base an amount sufficient to adjust the pH to a value from about 7.8 to about 8.5.

Aspect 148. The method of Aspect 144, wherein the contacting the first aqueous phase with the second base an amount sufficient to adjust the pH to a value from about 7.9 to about 8.5.

Aspect 149. The method of Aspect 144, wherein the contacting the first aqueous phase with the second base an amount sufficient to adjust the pH to a value from about 4.0 to about 8.5.

Aspect 150. The method of Aspect 144, wherein the contacting the first aqueous phase with the second base an amount sufficient to adjust the pH to a value from about 7.5 to about 8.4.

Aspect 151. The method of Aspect 144, wherein the contacting the first aqueous phase with the second base an amount sufficient to adjust the pH to a value from about 7.6 to about 8.4.

Aspect 152. The method of Aspect 144, wherein the contacting the first aqueous phase with the second base an amount sufficient to adjust the pH to a value from about 7.7 to about 8.4.

Aspect 153. The method of Aspect 144, wherein the contacting the first aqueous phase with the second base an amount sufficient to adjust the pH to a value from about 7.8 to about 8.4.

Aspect 154. The method of Aspect 144, wherein the contacting the first aqueous phase with the second base an amount sufficient to adjust the pH to a value from about 7.9 to about 8.4.

Aspect 155. The method of Aspect 144, wherein the contacting the first aqueous phase with the second base an amount sufficient to adjust the pH to a value from about 4.0 to about 8.4.

Aspect 156. The method of Aspect 144, wherein the contacting the first aqueous phase with the second base an amount sufficient to adjust the pH to a value from about 7.5 to about 8.3.

Aspect 157. The method of Aspect 144, wherein the contacting the first aqueous phase with the second base an amount sufficient to adjust the pH to a value from about 7.6 to about 8.3.

Aspect 158. The method of Aspect 144, wherein the contacting the first aqueous phase with the second base an amount sufficient to adjust the pH to a value from about 7.7 to about 4.3.

Aspect 159. The method of Aspect 144, wherein the contacting the first aqueous phase with the second base an amount sufficient to adjust the pH to a value from about 7.8 to about 8.3.

Aspect 160. The method of Aspect 144, wherein the contacting the first aqueous phase with the second base an amount sufficient to adjust the pH to a value from about 7.9 to about 8.3.

Aspect 161. The method of Aspect 144, wherein the contacting the first aqueous phase with the second base an amount sufficient to adjust the pH to a value from about 4.0 to about 8.3.

Aspect 162. The method of Aspect 144, wherein the contacting the first aqueous phase with the second base an amount sufficient to adjust the pH to a value from about 7.5 to about 8.2.

Aspect 163. The method of Aspect 144, wherein the contacting the first aqueous phase with the second base an amount sufficient to adjust the pH to a value from about 7.6 to about 8.2.

Aspect 164. The method of Aspect 144, wherein the contacting the first aqueous phase with the second base an amount sufficient to adjust the pH to a value from about 7.7 to about 8.2.

Aspect 165. The method of Aspect 144, wherein the contacting the first aqueous phase with the second base an amount sufficient to adjust the pH to a value from about 7.8 to about 8.2.

Aspect 166. The method of Aspect 144, wherein the contacting the first aqueous phase with the second base an amount sufficient to adjust the pH to a value from about 7.9 to about 8.2.

Aspect 167. The method of Aspect 144, wherein the contacting the first aqueous phase with the second base an amount sufficient to adjust the pH to a value from about 8.0 to about 8.2.

Aspect 168. The method of Aspect 144, wherein the contacting the first aqueous phase with the second base an amount sufficient to adjust the pH to a value from about 7.5 to about 8.1.

Aspect 169. The method of Aspect 144, wherein the contacting the first aqueous phase with the second base an amount sufficient to adjust the pH to a value from about 7.6 to about 8.1.

Aspect 170. The method of Aspect 144, wherein the contacting the first aqueous phase with the second base an amount sufficient to adjust the pH to a value from about 7.7 to about 8.1

Aspect 171. The method of Aspect 144, wherein the contacting the first aqueous phase with the second base an amount sufficient to adjust the pH to a value from about 7.8 to about 8.1.

Aspect 172. The method of Aspect 144, wherein the contacting the first aqueous phase with the second base an amount sufficient to adjust the pH to a value from about 7.9 to about 8.1.

Aspect 173. The method of Aspect 144, wherein the contacting the first aqueous phase with the second base an amount sufficient to adjust the pH to a value from about 8.0 to about 8.1.

Aspect 174. The method of any one of 1-Aspect 173, wherein the HPC has solids concentration from about 0.05% solids to about 5% solids.

Aspect 175. The method of Aspect 174, wherein the HPC has solids concentration from about 0.1% solids to about 4.5% solids.

Aspect 176. The method of Aspect 174, wherein the HPC has solids concentration from about 0.1% solids to about 4.0% solids.

Aspect 177. The method of Aspect 174, wherein the HPC has solids concentration from about 0.1% solids to about 3.5% solids.

Aspect 178. The method of Aspect 174, wherein the HPC has solids concentration from about 0.1% solids to about 3.0% solids.

Aspect 179. The method of Aspect 174, wherein the HPC has solids concentration from about 0.1% solids to about 2.5% solids.

Aspect 180. The method of Aspect 174, wherein the HPC has solids concentration from about 0.1% solids to about 2.0% solids.

Aspect 181. The method of Aspect 174, wherein the HPC has solids concentration from about 0.1% solids to about 1.5% solids.

Aspect 182. The method of Aspect 174, wherein the HPC has solids concentration from about 0.1% solids to about 1.0% solids.

Aspect 183. The method of Aspect 174, wherein the HPC has solids concentration from about 0.1% solids to about 0.7% solids.

Aspect 184. The method of Aspect 174, wherein the HPC has solids concentration from about 0.1% solids to about 0.5% solids.

Aspect 185. The method of any one of 1-Aspect 184, further comprising adding water or an aqueous solution to the HPC so that the solids concentration is from about 0.1% solids to about 1% solids.

Aspect 186. The method of any one of 1-Aspect 185, wherein the contacting the first aqueous phase with the second base further comprises adding a flocculating agent, a coagulating agent, or combinations thereof.

Aspect 187. The method of any one of 1-Aspect 186, wherein the removing the aqueous effluent and the collecting a HPC comprises using a clarifier, a settlement basin, a flexible planar geotextile fabric of woven or nonwoven construction, or combinations thereof, or combinations thereof.

Aspect 188. The method of any one of 1-Aspect 187, further comprising: (e) transferring the HPC to a geosynthetic geobag; and (f) conditioning the HPC in the first conditioning tank for a period of time sufficient and a temperature suitable for the solids concentration in the geosynthetic geobag to increase from 1.1-fold to about 15-fold compared to the solids concentration of the HPC solids concentration.

Aspect 189. The method of Aspect 188, wherein the geosynthetic geobag comprises woven materials, non-woven materials, or combinations thereof.

Aspect 190. The method of any one of 1-Aspect 187, further comprising: (e) transferring the HPC to a first conditioning tank; and (f) condition the HPC in the first conditioning tank for a period of time sufficient and a temperature suitable for the solids concentration in the lower sloped portion to increase from 1.1-fold to about 15-fold compared to the solids concentration of the HPC solids concentration; thereby forming in the lower portion of the first conditioning tank a first conditioned HPC.

Aspect 191. The method of Aspect 190, wherein the first conditioning tank is a plurality of two or more first conditioning tanks.

Aspect 192. The method of Aspect 190 or Aspect 191, wherein the transferring is hydraulic pumping.

Aspect 193. The method of any one of Aspect 190-Aspect 192, wherein the first conditioning tank comprises an upper reservoir portion and a lower sloped portion; and wherein the sloped portion is an slope angle; wherein the sloped angle is an angle from about 15° to about 60° from a horizontal normal perpendicular to the sides of the upper reservoir portion; and wherein the lower sloped portion comprises an outlet.

Aspect 194. The method of Aspect 193, wherein first conditioning tank is a cone conditioning tank; wherein the upper reservoir portion has a cylindrical shape; and wherein the lower sloped portion has a right circular conical shape.

Aspect 195. The method of any one of Aspect 190-Aspect 194, wherein the period of time sufficient and the temperature suitable for the solids concentration in the lower sloped portion to reach a first conditioned pre-hydraulic solids concentration; wherein the first conditioned pre-hydraulic solids concentration is increased from 1.2-fold to about 10-fold compared to the solids concentration of the HPC solids concentration; wherein the period of time is from about 10 min to about 72 hours; and wherein the temperature is from about 5° C. to about 50° C.

Aspect 196. The method of Aspect 195, wherein the first conditioned pre-hydraulic solids concentration is increased from 1.3-fold to about 10-fold compared to the solids concentration of the HPC solids concentration.

Aspect 197. The method of Aspect 195, wherein the first conditioned pre-hydraulic solids concentration is increased from 1.4-fold to about 10-fold compared to the solids concentration of the HPC solids concentration.

Aspect 198. The method of Aspect 195, wherein the first conditioned pre-hydraulic solids concentration is increased from 1.5-fold to about 10-fold compared to the solids concentration of the HPC solids concentration.

Aspect 199. The method of Aspect 195, wherein the first conditioned pre-hydraulic solids concentration is increased from 1.6-fold to about 10-fold compared to the solids concentration of the HPC solids concentration.

Aspect 200. The method of Aspect 195, wherein the first conditioned pre-hydraulic solids concentration is increased from 1.7-fold to about 10-fold compared to the solids concentration of the HPC solids concentration.

Aspect 201. The method of Aspect 195, wherein the first conditioned pre-hydraulic solids concentration is increased from 1.8-fold to about 10-fold compared to the solids concentration of the HPC solids concentration.

Aspect 202. The method of Aspect 195, wherein the first conditioned pre-hydraulic solids concentration is increased from 1.9-fold to about 10-fold compared to the solids concentration of the HPC solids concentration.

Aspect 203. The method of Aspect 195, wherein the first conditioned pre-hydraulic solids concentration is increased from 2-fold to about 10-fold compared to the solids concentration of the HPC solids concentration.

Aspect 204. The method of Aspect 195, wherein the first conditioned pre-hydraulic solids concentration is increased from 1.1-fold to about 7-fold compared to the solids concentration of the HPC solids concentration.

Aspect 205. The method of Aspect 195, wherein the first conditioned pre-hydraulic solids concentration is increased from 1.2-fold to about 7-fold compared to the solids concentration of the HPC solids concentration.

Aspect 206. The method of Aspect 195, wherein the first conditioned pre-hydraulic solids concentration is increased from 1.3-fold to about 7-fold compared to the solids concentration of the HPC solids concentration.

Aspect 207. The method of Aspect 195, wherein the first conditioned pre-hydraulic solids concentration is increased from 1.4-fold to about 7-fold compared to the solids concentration of the HPC solids concentration.

Aspect 208. The method of Aspect 195, wherein the first conditioned pre-hydraulic solids concentration is increased from 1.5-fold to about 7-fold compared to the solids concentration of the HPC solids concentration.

Aspect 209. The method of Aspect 195, wherein the first conditioned pre-hydraulic solids concentration is increased from 1.6-fold to about 7-fold compared to the solids concentration of the HPC solids concentration.

Aspect 210. The method of Aspect 195, wherein the first conditioned pre-hydraulic solids concentration is increased from 1.7-fold to about 7-fold compared to the solids concentration of the HPC solids concentration.

Aspect 211. The method of Aspect 195, wherein the first conditioned pre-hydraulic solids concentration is increased from 1.8-fold to about 7-fold compared to the solids concentration of the HPC solids concentration.

Aspect 212. The method of Aspect 195, wherein the first conditioned pre-hydraulic solids concentration is increased from 1.9-fold to about 7-fold compared to the solids concentration of the HPC solids concentration.

Aspect 213. The method of Aspect 195, wherein the first conditioned pre-hydraulic solids concentration is increased from 2-fold to about 7-fold compared to the solids concentration of the HPC solids concentration.

Aspect 214. The method of Aspect 195, wherein the first conditioned pre-hydraulic solids concentration is increased from 1.1-fold to about 5-fold compared to the solids concentration of the HPC solids concentration.

Aspect 215. The method of Aspect 195, wherein the first conditioned pre-hydraulic solids concentration is increased from 1.2-fold to about 5-fold compared to the solids concentration of the HPC solids concentration.

Aspect 216. The method of Aspect 195, wherein the first conditioned pre-hydraulic solids concentration is increased from 1.3-fold to about 5-fold compared to the solids concentration of the HPC solids concentration.

Aspect 217. The method of Aspect 195, wherein the first conditioned pre-hydraulic solids concentration is increased from 1.4-fold to about 5-fold compared to the solids concentration of the HPC solids concentration.

Aspect 218. The method of Aspect 195, wherein the first conditioned pre-hydraulic solids concentration is increased from 1.5-fold to about 5-fold compared to the solids concentration of the HPC solids concentration.

Aspect 219. The method of Aspect 195, wherein the first conditioned pre-hydraulic solids concentration is increased from 1.6-fold to about 5-fold compared to the solids concentration of the HPC solids concentration.

Aspect 220. The method of Aspect 195, wherein the first conditioned pre-hydraulic solids concentration is increased from 1.7-fold to about 5-fold compared to the solids concentration of the HPC solids concentration.

Aspect 221. The method of Aspect 195, wherein the first conditioned pre-hydraulic solids concentration is increased from 1.8-fold to about 5-fold compared to the solids concentration of the HPC solids concentration.

Aspect 222. The method of Aspect 195, wherein the first conditioned pre-hydraulic solids concentration is increased from 1.9-fold to about 5-fold compared to the solids concentration of the HPC solids concentration.

Aspect 223. The method of Aspect 195, wherein the first conditioned pre-hydraulic solids concentration is increased from 2-fold to about 5-fold compared to the solids concentration of the HPC solids concentration.

Aspect 224. The method of Aspect 195, wherein the first conditioned pre-hydraulic solids concentration is increased from 2.5-fold to about 5-fold compared to the solids concentration of the HPC solids concentration.

Aspect 225. The method of Aspect 195, wherein the first conditioned pre-hydraulic solids concentration is increased from 3-fold to about 5-fold compared to the solids concentration of the HPC solids concentration.

Aspect 226. The method of Aspect 195, wherein the first conditioned pre-hydraulic solids concentration is increased from 3.5-fold to about 5-fold compared to the solids concentration of the HPC solids concentration.

Aspect 227. The method of Aspect 195, wherein the first conditioned pre-hydraulic solids concentration is increased from 3.5-fold to about 4.5-fold compared to the solids concentration of the HPC solids concentration.

Aspect 228. The method of any one of Aspect 195-Aspect 227, wherein the period of time is from about 10 min to about 24 hours.

Aspect 229. The method of Aspect 228, wherein the period of time is from about 10 min to about 12 hours.

Aspect 230. The method of Aspect 228, wherein the period of time is from about 10 min to about 6 hours.

Aspect 231. The method of Aspect 228, wherein the period of time is from about 10 min to about 3 hours.

Aspect 232. The method of Aspect 228, wherein the period of time is from about 10 min to about 2 hours.

Aspect 233. The method of Aspect 228, wherein the period of time is from about 10 min to about 90 minutes.

Aspect 234. The method of Aspect 228, wherein the period of time is from about 10 min to about 80 minutes.

Aspect 235. The method of Aspect 228, wherein the period of time is from about 10 min to about 70 minutes.

Aspect 236. The method of Aspect 228, wherein the period of time is from about 10 min to about 60 minutes.

Aspect 237. The method of Aspect 228, wherein the period of time is from about 10 min to about 50 minutes.

Aspect 238. The method of Aspect 228, wherein the period of time is from about 10 min to about 40 minutes.

Aspect 239. The method of Aspect 228, wherein the period of time is from about 10 min to about 30 minutes.

Aspect 240. The method of Aspect 228, wherein the period of time is from about 30 min to about 90 minutes.

Aspect 241. The method of Aspect 228, wherein the period of time is from about 30 min to about 80 minutes.

Aspect 242. The method of Aspect 228, wherein the period of time is from about 30 min to about 75 minutes.

Aspect 243. The method of Aspect 228, wherein the period of time is from about 30 min to about 70 minutes.

Aspect 244. The method of Aspect 228, wherein the period of time is from about 30 min to about 60 minutes.

Aspect 245. The method of Aspect 228, wherein the period of time is from about 30 min to about 50 minutes.

Aspect 246. The method of Aspect 228, wherein the period of time is from about 30 min to about 45 minutes.

Aspect 247. The method of Aspect 228, wherein the period of time is from about 30 min to about 40 minutes.

Aspect 248. The method of any one of Aspect 190-Aspect 247, further comprising collecting the first conditioned HPC.

Aspect 249. The method of Aspect 248, wherein the collecting comprises collecting the first conditioned HPC to a tanker truck, a rail tanker car, a plurality of transport drums, or combinations thereof.

Aspect 250. The method of Aspect 248, wherein the collecting further comprises: (g) transferring the first condition HPC to a second conditioning tank; and (h) condition the first conditioned HPC in the second conditioning tank for a period of time sufficient and at a temperature suitable for the solids concentration in the lower sloped portion to increase from 1.1-fold to about 5-fold compared to the solids concentration of the first conditioned HPC solids concentration; thereby forming in the lower portion of the second conditioning tank a second conditioned HPC.

Aspect 251. The method of Aspect 250, wherein the transferring is hydraulic pumping.

Aspect 252. The method of Aspect 250 or Aspect 251, wherein the second conditioning tank comprises an upper reservoir portion and a lower sloped portion; and wherein the sloped portion is an slope angle; wherein the sloped angle is an angle from about 15° to about 60° from a horizontal normal perpendicular to the sides of the upper reservoir portion; and wherein the lower sloped portion comprises an outlet.

Aspect 253. The method of Aspect 252, wherein second conditioning tank is a cone conditioning tank; wherein the upper reservoir portion has a cylindrical shape; and wherein the lower sloped portion has a right circular conical shape.

Aspect 254. The method of any one of Aspect 250-Aspect 253, wherein the period of time sufficient and the temperature suitable for the solids concentration in the lower sloped portion to increase from 1.2-fold to about 5-fold compared to the solids concentration of the HPC solids concentration is a period of time from about 30 min to about 72 hours at a temperature of from about 5° C. to about 50° C.

Aspect 255. The method of Aspect 254, wherein the second conditioned pre-hydraulic solids concentration is increased from 1.1-fold to about 3-fold compared to the first conditioned HPC solids concentration.

Aspect 256. The method of Aspect 254, wherein the second conditioned pre-hydraulic solids concentration is increased from 1.2-fold to about 3-fold compared to the first conditioned HPC solids concentration.

Aspect 257. The method of Aspect 254, wherein the second conditioned pre-hydraulic solids concentration is increased from 1.3-fold to about 3-fold compared to the first conditioned HPC solids concentration.

Aspect 258. The method of Aspect 254, wherein the second conditioned pre-hydraulic solids concentration is increased from 1.4-fold to about 3-fold compared to the first conditioned HPC solids concentration.

Aspect 259. The method of Aspect 254, wherein the second conditioned pre-hydraulic solids concentration is increased from 1.5-fold to about 3-fold compared to the first conditioned HPC solids concentration.

Aspect 260. The method of Aspect 254, wherein the second conditioned pre-hydraulic solids concentration is increased from 1.6-fold to about 3-fold compared to the first conditioned HPC solids concentration.

Aspect 261. The method of Aspect 254, wherein the second conditioned pre-hydraulic solids concentration is increased from 1.7-fold to about 3-fold compared to the first conditioned HPC solids concentration.

Aspect 262. The method of Aspect 254, wherein the second conditioned pre-hydraulic solids concentration is increased from 1.8-fold to about 3-fold compared to the first conditioned HPC solids concentration.

Aspect 263. The method of Aspect 254, wherein the second conditioned pre-hydraulic solids concentration is increased from 1.9-fold to about 3-fold compared to the first conditioned HPC solids concentration.

Aspect 264. The method of Aspect 254, wherein the second conditioned pre-hydraulic solids concentration is increased from 2-fold to about 3-fold compared to the first conditioned HPC solids concentration.

Aspect 265. The method of Aspect 254, wherein the second conditioned pre-hydraulic solids concentration is increased from 1.1-fold to about 5-fold compared to the first conditioned HPC solids concentration.

Aspect 266. The method of Aspect 254, wherein the second conditioned pre-hydraulic solids concentration is increased from 1.2-fold to about 5-fold compared to the first conditioned HPC solids concentration.

Aspect 267. The method of Aspect 254, wherein the second conditioned pre-hydraulic solids concentration is increased from 1.3-fold to about 5-fold compared to the first conditioned HPC solids concentration.

Aspect 268. The method of Aspect 254, wherein the second conditioned pre-hydraulic solids concentration is increased from 1.4-fold to about 5-fold compared to the first conditioned HPC solids concentration.

Aspect 269. The method of Aspect 254, wherein the second conditioned pre-hydraulic solids concentration is increased from 1.5-fold to about 5-fold compared to the first conditioned HPC solids concentration.

Aspect 270. The method of Aspect 254, wherein the second conditioned pre-hydraulic solids concentration is increased from 1.6-fold to about 5-fold compared to the first conditioned HPC solids concentration.

Aspect 271. The method of Aspect 254, wherein the second conditioned pre-hydraulic solids concentration is increased from 1.7-fold to about 5-fold compared to the first conditioned HPC solids concentration.

Aspect 272. The method of Aspect 254, wherein the second conditioned pre-hydraulic solids concentration is increased from 1.8-fold to about 5-fold compared to the first conditioned HPC solids concentration.

Aspect 273. The method of Aspect 254, wherein the second conditioned pre-hydraulic solids concentration is increased from 1.9-fold to about 5-fold compared to the first conditioned HPC solids concentration.

Aspect 274. The method of Aspect 254, wherein the second conditioned pre-hydraulic solids concentration is increased from 2-fold to about 5-fold compared to the first conditioned HPC solids concentration.

Aspect 275. The method of Aspect 254, wherein the second conditioned pre-hydraulic solids concentration is increased from 2.5-fold to about 5-fold compared to the first conditioned HPC solids concentration.

Aspect 276. The method of Aspect 254, wherein the second conditioned pre-hydraulic solids concentration is increased from 3-fold to about 5-fold compared to the first conditioned HPC solids concentration.

Aspect 277. The method of Aspect 254, wherein the second conditioned pre-hydraulic solids concentration is increased from 3.5-fold to about 5-fold compared to the first conditioned HPC solids concentration.

Aspect 278. The method of Aspect 254, wherein the second conditioned pre-hydraulic solids concentration is increased from 3.5-fold to about 4.5-fold compared to the first conditioned HPC solids concentration.

Aspect 279. The method of any one of Aspect 250-Aspect 278, wherein the period of time is from about 10 min to about 24 hours.

Aspect 280. The method of Aspect 279, wherein the period of time is from about 10 min to about 12 hours.

Aspect 281. The method of Aspect 279, wherein the period of time is from about 10 min to about 6 hours.

Aspect 282. The method of Aspect 279, wherein the period of time is from about 10 min to about 3 hours.

Aspect 283. The method of Aspect 279, wherein the period of time is from about 10 min to about 2 hours.

Aspect 284. The method of Aspect 279, wherein the period of time is from about 10 min to about 90 minutes.

Aspect 285. The method of Aspect 279, wherein the period of time is from about 10 min to about 80 minutes.

Aspect 286. The method of Aspect 279, wherein the period of time is from about 10 min to about 70 minutes.

Aspect 287. The method of Aspect 279, wherein the period of time is from about 10 min to about 60 minutes.

Aspect 288. The method of Aspect 279, wherein the period of time is from about 10 min to about 50 minutes.

Aspect 289. The method of Aspect 279, wherein the period of time is from about 10 min to about 40 minutes.

Aspect 290. The method of Aspect 279, wherein the period of time is from about 10 min to about 30 minutes.

Aspect 291. The method of Aspect 279, wherein the period of time is from about 30 min to about 90 minutes.

Aspect 292. The method of Aspect 279, wherein the period of time is from about 30 min to about 80 minutes.

Aspect 293. The method of Aspect 279, wherein the period of time is from about 30 min to about 75 minutes.

Aspect 294. The method of Aspect 279, wherein the period of time is from about 30 min to about 70 minutes.

Aspect 295. The method of Aspect 279, wherein the period of time is from about 30 min to about 60 minutes.

Aspect 296. The method of Aspect 279, wherein the period of time is from about 30 min to about 50 minutes.

Aspect 297. The method of Aspect 279, wherein the period of time is from about 30 min to about 45 minutes.

Aspect 298. The method of Aspect 279, wherein the period of time is from about 30 min to about 40 minutes.

Aspect 299. The method of any one of Aspect 250-Aspect 298, further comprising collecting the second conditioned HPC.

Aspect 300. The method of Aspect 248, wherein the collecting comprises collecting the second conditioned HPC to a tanker truck, a rail tanker car, a plurality of transport drums, or combinations thereof.

Aspect 301. The method of any one of Aspect 248, Aspect 249, Aspect 255, or Aspect 300, further comprising: transferring the first conditioned HPC or the second conditioned hydraulic pre-concentrate to mixing tank; adding a first acid to the mixing tank in an amount sufficient to adjust the pH from about 2.0 to about 4.0; and wherein the first acid is mixed with the first conditioned hydraulic pre-concentrate or the second conditioned hydraulic pre-concentrate as the first acid is added; thereby forming PLS.

Aspect 302. The method of Aspect 301, wherein the acid is a mineral acid.

Aspect 303. The method of Aspect 302, wherein the mineral acid comprises a mineral acid selected from nitric acid, hydrochloric acid, phosphoric acid, sulfuric acid, sulfurous acid, and combinations thereof.

Aspect 304. The method of Aspect 303, wherein the mineral acid comprises sulfuric acid.

Aspect 305. The method of any one of Aspect 301-Aspect 304, further comprising adding a flocculating agent, coagulating agent, or combinations thereof.

Aspect 306. The method of any one of Aspect 301-Aspect 305, wherein the PLS is transferred to a filtration apparatus; and wherein the filtrate comprising a filtered PLS is collected.

Aspect 307. The method of Aspect 306, wherein the filtration apparatus is selected from bag filter, geo synthetic membrane, pan filter, plate and frame filter, drum filter, centrifuge, screw filter, hydrocyclone, and combinations thereof.

Aspect 308. The method of any one of Aspect 301-Aspect 307, wherein the PLS composition comprises lanthanum, cerium, praseodymium, neodymium, promethium, samarium, europium, gadolinium, terbium, dysprosium, holmium, erbium, thulium, ytterbium, lutetium, scandium, and yttrium; wherein each of the foregoing is independently present at a concentration and sum of each concentration is a total rare earth element concentration; and wherein the total rare earth concentration is about 5 mg/L to about 500 mg/L.

Aspect 309. The method of Aspect 308, wherein the total rare earth concentration is about 50 mg/L to about 500 mg/L.

Aspect 310. The method of Aspect 308, wherein the total rare earth concentration is about 100 mg/L to about 500 mg/L.

Aspect 311. The method of Aspect 308, wherein the total rare earth concentration comprises scandium at a concentration of from about 0.01 mg/L to about 0.5 mg/L; yttrium at a concentration of from about 1.0 mg/L to about 200 mg/L; lanthanum at a concentration of from about 0.01 mg/L to about 5 mg/L; cerium at a concentration of from about 0.5 mg/L to about 70 mg/L; praseodymium at a concentration of from about 0.1 mg/L to about 15 mg/L; neodymium at a concentration of from about 0.5 mg/L to about 80 mg/L; samarium at a concentration of from about 0.2 mg/L to about 30 mg/L; europium at a concentration of from about 0.05 mg/L to about 10 mg/L; gadolinium at a concentration of from about 0.2 mg/L to about 50 mg/L; terbium at a concentration of from about 0.05 mg/L to about 10 mg/L; dysprosium at a concentration of from about 0.2 mg/L to about 50 mg/L; holmium at a concentration of from about 0.05 mg/L to about 10 mg/L; erbium at a concentration of from about 0.1 mg/L to about 30 mg/L; thullium at a concentration of from about 0.01 mg/L to about 3 mg/L; ytterbium at a concentration of from about 0.05 mg/L to about 10 mg/L; and lutetium at a concentration of from about 0.01 mg/L to about 1 mg/L.

Aspect 312. The method of Aspect 308, wherein the total rare earth concentration comprises scandium at a concentration of from about 0.05 mg/L to about 0.15 mg/L; yttrium at a concentration of from about 20 mg/L to about 45 mg/L;

lanthanum at a concentration of from about 0.3 mg/L to about 0.75 mg/L; cerium at a concentration of from about 5 mg/L to about 15 mg/L; praseodymium at a concentration of from about 1 mg/L to about 3.5 mg/L; neodymium at a concentration of from about 5 mg/L to about 20 mg/L; samarium at a concentration of from about 2 mg/L to about 7 mg/L; europium at a concentration of from about 0.5 mg/L to about 2 mg/L; gadolinium at a concentration of from about 5 mg/L to about 15 mg/L; terbium at a concentration of from about 0.5 mg/L to about 2 mg/L; dysprosium at a concentration of from about 4 mg/L to about 15 mg/L; holmium at a concentration of from about 0.5 mg/L to about 3 mg/L; erbium at a concentration of from about 2.5 mg/L to about 6 mg/L; thullium at a concentration of from about 0.2 mg/L to about 0.7 mg/L; ytterbium at a concentration of from about 0.7 mg/L to about 2.5 mg/L; and lutetium at a concentration of from about 0.05 mg/L to about 0.3 mg/L.

Aspect 313. The method of any one of Aspect 250-Aspect 311, further comprising neutralizing the PLS or the filtered PLS by contacting the PLS or the filtered PLS with a third base in an amount sufficient to raise the pH of the PLS to a pH of from about 4.0 to 5.5, thereby forming a neutralized PLS.

Aspect 314. The method of Aspect 313, wherein the third base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 315. The method of Aspect 314, wherein the third base comprises ammonium hydroxide.

Aspect 316. The method of any one of Aspect 311-Aspect 315, wherein the contacting the PLS or the filtered PLS with the third base is in an amount sufficient to adjust the pH to a value from about 4.0 to about 5.1.

Aspect 317. The method of Aspect 316, wherein the contacting the PLS or the filtered PLS with the third base is in an amount sufficient to adjust the pH to a value from about 4.0 to about 5.0.

Aspect 318. The method of Aspect 316, wherein the contacting the PLS or the filtered PLS with the third base is in an amount sufficient to adjust the pH to a value from about 4.0 to about 4.9.

Aspect 319. The method of Aspect 316, wherein the contacting the PLS or the filtered PLS with the third base is in an amount sufficient to adjust the pH to a value from about 4.0 to about 4.8.

Aspect 320. The method of Aspect 316, wherein the contacting the PLS or the filtered PLS with the third base is in an amount sufficient to adjust the pH to a value from about 4.0 to about 4.7.

Aspect 321. The method of Aspect 316, wherein the contacting the PLS or the filtered PLS with the third base is in an amount sufficient to adjust the pH to a value from about 4.0 to about 4.6.

Aspect 322. The method of Aspect 316, wherein the contacting the PLS or the filtered PLS with the third base is in an amount sufficient to adjust the pH to a value from about 4.1 to about 5.0.

Aspect 323. The method of Aspect 316, wherein the contacting the PLS or the filtered PLS with the third base is in an amount sufficient to adjust the pH to a value from about 4.1 to about 4.9.

Aspect 324. The method of Aspect 316, wherein the contacting the PLS or the filtered PLS with the third base is in an amount sufficient to adjust the pH to a value from about 4.1 to about 4.8.

Aspect 325. The method of Aspect 316, wherein the contacting the PLS or the filtered PLS with the third base is in an amount sufficient to adjust the pH to a value from about 4.1 to about 4.7.

Aspect 326. The method of Aspect 316, wherein the contacting the PLS or the filtered PLS with the third base is in an amount sufficient to adjust the pH to a value from about 4.1 to about 4.6.

Aspect 327. The method of Aspect 316, wherein the contacting the PLS or the filtered PLS with the third base is in an amount sufficient to adjust the pH to a value from about 4.2 to about 5.0.

Aspect 328. The method of Aspect 316, wherein the contacting the PLS or the filtered PLS with the third base is in an amount sufficient to adjust the pH to a value from about 4.2 to about 4.9.

Aspect 329. The method of Aspect 316, wherein the contacting the PLS or the filtered PLS with the third base is in an amount sufficient to adjust the pH to a value from about 4.2 to about 4.8.

Aspect 330. The method of Aspect 316, wherein the contacting the PLS or the filtered PLS with the third base is in an amount sufficient to adjust the pH to a value from about 4.2 to about 4.7.

Aspect 331. The method of Aspect 316, wherein the contacting the PLS or the filtered PLS with the third base is in an amount sufficient to adjust the pH to a value from about 4.2 to about 4.6.

Aspect 332. The method of Aspect 316, wherein the contacting the PLS or the filtered PLS with the third base is in an amount sufficient to adjust the pH to a value from about 4.3 to about 5.0.

Aspect 333. The method of Aspect 316, wherein the contacting the PLS or the filtered PLS with the third base is in an amount sufficient to adjust the pH to a value from about 4.3 to about 4.9.

Aspect 334. The method of Aspect 316, wherein the contacting the PLS or the filtered PLS with the third base is in an amount sufficient to adjust the pH to a value from about 4.3 to about 4.8.

Aspect 335. The method of Aspect 316, wherein the contacting the PLS or the filtered PLS with the third base is in an amount sufficient to adjust the pH to a value from about 4.3 to about 4.7.

Aspect 336. The method of Aspect 316, wherein the contacting the PLS or the filtered PLS with the third base is in an amount sufficient to adjust the pH to a value from about 4.3 to about 4.6.

Aspect 337. The method of Aspect 316, wherein the contacting the PLS or the filtered PLS with the third base is in an amount sufficient to adjust the pH to a value from about 4.4 to about 5.0.

Aspect 338. The method of Aspect 316, wherein the contacting the PLS or the filtered PLS with the third base is in an amount sufficient to adjust the pH to a value from about 4.4 to about 4.9.

Aspect 339. The method of Aspect 316, wherein the contacting the PLS or the filtered PLS with the third base is in an amount sufficient to adjust the pH to a value from about 4.4 to about 4.8.

Aspect 340. The method of Aspect 316, wherein the contacting the PLS or the filtered PLS with the third base is in an amount sufficient to adjust the pH to a value from about 4.4 to about 4.7.

Aspect 341. The method of Aspect 316, wherein the contacting the PLS or the filtered PLS with the third base is in an amount sufficient to adjust the pH to a value from about 4.4 to about 4.6.

Aspect 342. The method of Aspect 316, wherein the contacting the PLS or the filtered PLS with the third base is in an amount sufficient to adjust the pH to a value from about 4.5 to about 5.0.

Aspect 343. The method of Aspect 316, wherein the contacting the PLS or the filtered PLS with the third base is in an amount sufficient to adjust the pH to a value from about 4.5 to about 4.9.

Aspect 344. The method of Aspect 316, wherein the contacting the PLS or the filtered PLS with the third base is in an amount sufficient to adjust the pH to a value from about 4.5 to about 4.8.

Aspect 345. The method of Aspect 316, wherein the contacting the PLS or the filtered PLS with the third base is in an amount sufficient to adjust the pH to a value from about 4.5 to about 4.7.

Aspect 346. The method of Aspect 316, wherein the contacting the PLS or the filtered PLS with the third base is in an amount sufficient to adjust the pH to a value from about 4.5 to about 4.6.

Aspect 347. The method of any one of Aspect 301-Aspect 346, wherein the PLS, the filtered PLS, or the neutralized PLS comprise iron at a concentration less than or equal to about 25 mg/L.

Aspect 348. The method of any one of Aspect 301-Aspect 347, wherein the PLS, the filtered PLS, or the neutralized PLS comprise thorium and uranium in an aggregate concentration of less than about 1 mg/L.

Aspect 349. A PLS, a filtered PLS, or a neutralized PLS prepared by the method of any one of Aspect 301-Aspect 348.

Aspect 350. A PLS composition comprising lanthanum, cerium, praseodymium, neodymium, promethium, samarium, europium, gadolinium, terbium, dysprosium, holmium, erbium, thulium, ytterbium, lutetium, scandium, and yttrium; wherein each of the foregoing is independently present at a concentration and sum of each concentration is a total rare earth element concentration; and wherein the total rare earth concentration is about 5 mg/L to about 500 mg/L.

Aspect 351. The PLS of Aspect 350, wherein the total rare earth concentration is about 50 mg/L to about 500 mg/L.

Aspect 352. The PLS of Aspect 350, wherein the total rare earth concentration is about 100 mg/L to about 500 mg/L.

Aspect 353. The PLS of Aspect 350, wherein the total rare earth concentration comprises scandium at a concentration of from about 0.01 mg/L to about 0.5 mg/L; yttrium at a concentration of from about 1.0 mg/L to about 200 mg/L; lanthanum at a concentration of from about 0.01 mg/L to about 5 mg/L; cerium at a concentration of from about 0.5 mg/L to about 70 mg/L; praseodymium at a concentration of from about 0.1 mg/L to about 15 mg/L; neodymium at a concentration of from about 0.5 mg/L to about 80 mg/L; samarium at a concentration of from about 0.2 mg/L to about 30 mg/L; europium at a concentration of from about 0.05 mg/L to about 10 mg/L; gadolinium at a concentration of from about 0.2 mg/L to about 50 mg/L; terbium at a concentration of from about 0.05 mg/L to about 10 mg/L; dysprosium at a concentration of from about 0.2 mg/L to about 50 mg/L; holmium at a concentration of from about 0.05 mg/L to about 10 mg/L; erbium at a concentration of from about 0.1 mg/L to about 30 mg/L; thullium at a concentration of from about 0.01 mg/L to about 3 mg/L; ytterbium at a concentration of from about 0.05 mg/L to about 10 mg/L; and lutetium at a concentration of from about 0.01 mg/L to about 1 mg/L.

Aspect 354. The PLS of Aspect 350, wherein the total rare earth concentration comprises scandium at a concentration of from about 0.05 mg/L to about 0.15 mg/L; yttrium at a concentration of from about 20 mg/L to about 45 mg/L; lanthanum at a concentration of from about 0.3 mg/L to about 0.75 mg/L; cerium at a concentration of from about 5 mg/L to about 15 mg/L; praseodymium at a concentration of from about 1 mg/L to about 3.5 mg/L; neodymium at a concentration of from about 5 mg/L to about 20 mg/L; samarium at a concentration of from about 2 mg/L to about 7 mg/L; europium at a concentration of from about 0.5 mg/L to about 2 mg/L; gadolinium at a concentration of from about 5 mg/L to about 15 mg/L; terbium at a concentration of from about 0.5 mg/L to about 2 mg/L; dysprosium at a concentration of from about 4 mg/L to about 15 mg/L; holmium at a concentration of from about 0.5 mg/L to about 3 mg/L; erbium at a concentration of from about 2.5 mg/L to about 6 mg/L; thullium at a concentration of from about 0.2 mg/L to about 0.7 mg/L; ytterbium at a concentration of from about 0.7 mg/L to about 2.5 mg/L; and lutetium at a concentration of from about 0.05 mg/L to about 0.3 mg/L.

Aspect 355. The PLS composition of any one of Aspect 350-Aspect 354, wherein iron is present at a concentration less than or equal to about 25 mg/L.

Aspect 356. The PLS composition of any one of Aspect 350-Aspect 355, wherein thorium and uranium are present in an aggregate concentration of less than about 1 mg/L.

Aspect 357. The PLS composition of any one of Aspect 350-Aspect 356, wherein cobalt is present in an amount less than about 20 mg/L.

Aspect 358. A method for producing a PLS, the method comprising the following steps: (a) contacting a raw material containing rare earth elements with a first base to form waste solids and an aqueous phase and discarding the waste solids; (b) contacting the aqueous phase with a second base to form an REE-enriched preconcentrate and an effluent and discharging the effluent; (c) contacting the REE-enriched preconcentrate with an acid to form an acidic preconcentrate; (d) filtering the acidic preconcentrate to form an acidic filtrate; and (e) contacting the acidic filtrate with a third base and filtering to form a PLS; wherein the PLS is enriched in rare earth elements and essentially free of solids.

Aspect 359. The method of Aspect 358, wherein the raw material is raw acid mine drainage (AMD), an AMD precipitate (AMDp), or an enriched AMD precipitate (eAMDp).

Aspect 360. The method of Aspect 358 or Aspect 359, wherein contacting the raw material with the first base changes the pH of the aqueous phase to from about 4.0 to about 4.5.

Aspect 361. The method of any one of Aspect 358-Aspect 360, wherein the first base comprises NaOH, KOH, ammonia, ammonium hydroxide, calcium pellets, quicklime, lime slurry, or a combination thereof.

Aspect 362. The method of any one of Aspect 358-Aspect 361, wherein contacting the aqueous phase with the second base changes the pH of the aqueous phase to from about 8.0 to about 8.5.

Aspect 363. The method of any one of Aspect 358-Aspect 362, wherein the second base comprises NaOH, KOH, ammonia or an ammonium compound, calcium pellets, quicklime, lime slurry, or a combination thereof.

Aspect 364. The method of any one of Aspect 358-Aspect 363, wherein the contacting the REE-enriched preconcentrate with the acid changes the pH of the REE-enriched preconcentrate to from about 0.7 to about 3.0.

Aspect 365. The method of any one of Aspect 358-Aspect 364, wherein the acid comprises hydrochloric acid, nitric acid, sulfuric acid, or a combination thereof.

Aspect 366. The method of any one of Aspect 358-Aspect 365, wherein step (c) further comprises contacting the REE-enriched preconcentrate and the acid with a reducing agent.

Aspect 367. The method of any one of Aspect 358-Aspect 366, wherein contacting the acidic filtrate with the third base changes the pH of the acidic filtrate to from about 2.8 to about 3.0.

Aspect 368. The method of any one of Aspect 358-Aspect 367, wherein the third base comprises MgO, NaOH, KOH, ammonia or ammonium hydroxide, calcium pellets, quicklime, lime slurry, or a combination thereof.

Aspect 369. The method of any one of Aspect 358-Aspect 368, wherein step (e) further comprises oxidizing the acidic filtrate.

Aspect 370. The method of Aspect 369, wherein the acidic filtrate is oxidized mechanically, electrochemically, with an oxidizing agent, or a combination thereof.

Aspect 371. The method of Aspect 370, wherein the oxidizing agent is hydrogen peroxide.

Aspect 372. The method of Aspect 371, wherein the hydrogen peroxide is added in an mol amount that is equal to:

$$Df \times (Fe + (2 \times Mn)),$$

wherein Df is a number having a value of about 1.2 to about 1.5; wherein Fe represents the mol amount of iron present; and Mn represents the mol amount of manganese present.

Aspect 373. The method of any one of Aspect 358-Aspect 372, further comprising a step for recovering scandium between steps (a) and (b), the step for recovering scandium comprising contacting the aqueous phase with a fourth base, thereby forming a scandium-enriched solid concentrate, and removing the scandium-enriched solid concentrate from the aqueous phase.

Aspect 374. The method of Aspect 373, wherein contacting the aqueous phase with a fourth base changes the pH of the aqueous phase to from about 4.9 to about 5.1.

Aspect 375. The method of Aspect 373, wherein the fourth base comprises NaOH, KOH, ammonia or an ammonium compound, calcium pellets, quicklime, lime slurry, or a combination thereof.

Aspect 376. The method of any one of Aspect 358-Aspect 375, further comprising adding a flocculating agent, a coagulating agent, or both in any of steps (a), (b), or (c).

Aspect 377. The method of any one of Aspect 358-Aspect 376, wherein following step (e), the method further comprises subjecting the PLS to solvent extraction to produce a refined rare earth resource comprising at least 50% rare earth elements.

Aspect 378. The method of any one of Aspect 358-Aspect 377, wherein the PLS comprises lanthanum, cerium, praseodymium, neodymium, promethium, samarium, europium, gadolinium, terbium, dysprosium, holmium, erbium, thulium, ytterbium, lutetium, scandium, and yttrium; wherein sum of each concentration of is a total rare earth element concentration; and wherein the total rare earth concentration is about 5 mg/L to about 50 mg/L.

Aspect 379. The method of Aspect 378, wherein scandium is present at a concentration of from about 0.05 mg/L to about 1 mg/L; yttrium is present at a concentration of from about 0.5 mg/L to about 10 mg/L; lanthanum is present at a concentration of from about 0.05 mg/L to about 5 mg/L; cerium is present at a concentration of from about 0.5 mg/L to about 7.5 mg/L; praseodymium is present at a concentration of from about 0.05 mg/L to about 2.5 mg/L; neodymium is present at a concentration of from about 0.5 mg/L to about 10 mg/L; samarium is present at a concentration of from about 0.1 mg/L to about 2.5 mg/L; europium present at a concentration of from about 0.05 mg/L to about 1.5 mg/L; gadolinium is present at a concentration of from about 0.1 mg/L to about 5 mg/L; terbium is present at a concentration of from about 0.05 mg/L to about 1.5 mg/L; dysprosium present at a concentration of from about 0.1 mg/L to about 5 mg/L; holmium is present at a concentration of from about 0.05 mg/L to about 2 mg/L; erbium is present at a concentration of from about 0.1 mg/L to about 5 mg/L; thullium is present at a concentration of from about 0.05 mg/L to about 2 mg/L; ytterbium is present at a concentration of from about 0.05 mg/L to about 5 mg/L; and lutetium is present at a concentration of from about 0.01 mg/L to about 1 mg/L.

Aspect 380. The method of Aspect 378 or Aspect 379, wherein iron is present at a concentration less than or equal to about 25 mg/L.

Aspect 381. The method of of any one of Aspect 378-Aspect 380, wherein thorium and uranium are present in an aggregate concentration of less than about 1 mg/L.

Aspect 382. The method of of any one of Aspect 378-Aspect 381, wherein cobalt is present in an amount less than about 20 mg/L.

Aspect 383. The method of of any one of Aspect 378-Aspect 382, wherein the PLS has a pH of from about 2.8 to about 3.0.

Aspect 384. A PLS composition enriched in rare earth elements and essentially free of solids made by the method of Aspect 358.

Aspect 385. The PLS composition of Aspect 384, wherein the PLS comprises lanthanum, cerium, praseodymium, neodymium, promethium, samarium, europium, gadolinium, terbium, dysprosium, holmium, erbium, thulium, ytterbium, lutetium, scandium, and yttrium; wherein sum of each concentration of is a total rare earth element concentration; and wherein the total rare earth concentration is about 5 mg/L to about 50 mg/L.

Aspect 386. The PLS composition of Aspect 385, wherein scandium is present at a concentration of from about 0.05 mg/L to about 1 mg/L; yttrium is present at a concentration of from about 0.5 mg/L to about 10 mg/L; lanthanum is present at a concentration of from about 0.05 mg/L to about 5 mg/L; cerium is present at a concentration of from about 0.5 mg/L to about 7.5 mg/L; praseodymium is present at a concentration of from about 0.05 mg/L to about 2.5 mg/L; neodymium is present at a concentration of from about 0.5 mg/L to about 10 mg/L; samarium is present at a concentration of from about 0.1 mg/L to about 2.5 mg/L; europium present at a concentration of from about 0.05 mg/L to about 1.5 mg/L; gadolinium is present at a concentration of from about 0.1 mg/L to about 5 mg/L; terbium is present at a concentration of from about 0.05 mg/L to about 1.5 mg/L; dysprosium present at a concentration of from about 0.1 mg/L to about 5 mg/L; holmium is present at a concentration of from about 0.05 mg/L to about 2 mg/L; erbium is present at a concentration of from about 0.1 mg/L to about 5 mg/L; thullium is present at a concentration of from about 0.05 mg/L to about 2 mg/L; ytterbium is present at a concentration of from about 0.05 mg/L to about 5 mg/L; and lutetium is present at a concentration of from about 0.01 mg/L to about 1 mg/L.

Aspect 387. The PLS composition of any one of Aspect 384-Aspect 386, wherein iron is present at a concentration less than or equal to about 25 mg/L.

Aspect 388. The PLS composition of any one of Aspect 384-Aspect 387, wherein thorium and uranium are present in an aggregate concentration of less than about 1 mg/L.

Aspect 389. The PLS composition of any one of Aspect 384-Aspect 388, wherein cobalt is present in an amount less than about 20 mg/L.

Aspect 390. The PLS composition of any one of Aspect 384-Aspect 389, wherein the PLS has a pH of from about 2.8 to about 3.0.

Aspect 391. A PLS enriched in rare earth elements and essentially free of solids, produced by the method comprising the following steps: (a) contacting a raw material containing rare earth elements with a first base to form waste solids and an aqueous phase and discarding the waste solids; (b) contacting the aqueous phase with a second base to form an REE-enriched preconcentrate and an effluent and discharging the effluent; (c) contacting the REE-enriched preconcentrate with an acid to form an acidic preconcentrate; (d) filtering the acidic preconcentrate to form an acidic filtrate; and (e) contacting the acidic filtrate with a third base and filtering to form a PLS.

Aspect 392. A method of preparing REE/CM oxides, the method comprising: providing a PLS as disclosed herein; extracting one or more REE/CM from the PLS via one or more solvent extraction steps, thereby preparing REE/CM oxides.

Aspect 393. The method of Aspect 392, further comprising the step of reducing the REE/CM oxide to a reduced metal; wherein the step of reducing comprises an electrowinning process, such as an electrolytic process; a metallothermic reduction process; or combinations thereof.

Aspect 394. The REE/CM oxide produced by Aspect 392.

Aspect 395. The reduced REE/CM produced by Aspect 393.

Aspect 396. A method for preparing a hydraulic pre-concentrate enriched in rare earth elements and critical minerals, the method comprising: (a) contacting a raw material with a first base in an amount sufficient to adjust the pH to a value from about 4.0 to about 6.0, thereby forming a mixture comprising a first aqueous phase and a first solid concentrate; (b) separating the first aqueous phase from the first solid concentrate; (c) contacting the first aqueous phase with a second base in an amount sufficient to adjust the pH to a value from about 7.0 to about 9.0, thereby forming a mixture comprising a second aqueous phase and the hydraulic pre-concentrate; (d) removing the second aqueous phase and collecting the hydraulic pre-concentrate; wherein the raw material comprises rare earth elements; and wherein the hydraulic pre-concentrate is enriched in rare earth elements.

Aspect 397. The method of Aspect 396, wherein the raw material comprises acid mine drainage associated with a coal mine, a hard rock mine, or combinations thereof.

Aspect 398. The method of Aspect 397, wherein the acid mine drainage associated with a coal mine, a hard rock mine, or combinations thereof is located at or proximal to the coal mine, the hard rock mine, or combinations thereof.

Aspect 399. The method of Aspect 397, wherein the acid mine drainage associated with a coal mine, a hard rock mine, or combinations thereof is transported to a location removed from the coal mine, the hard rock mine, or combinations thereof.

Aspect 400. The method of any of Aspect 397-Aspect 399, wherein the acid mine drainage is associated with a coal mine.

Aspect 401. The method of Aspect 396-Aspect 400, wherein the raw material comprises raw acid mine drainage (AMD), an AMD precipitate (AMDp), an enriched AMD precipitate (eAMDp), or combinations thereof.

Aspect 402. The method of Aspect 401, wherein the raw material comprises raw acid mine drainage (AMD).

Aspect 403. The method of Aspect 396-Aspect 402, wherein the raw material has a pH less than about 4.0.

Aspect 404. The method of Aspect 396-Aspect 403, wherein the first base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 405. The method of Aspect 404, wherein the first base comprises calcium hydroxide.

Aspect 406. The method of Aspect 396-Aspect 405, wherein the contacting the raw material with the first base is in an amount sufficient to adjust the pH to a value from about 4.0 to about 4.5.

Aspect 407. The method of Aspect 396-Aspect 406, further comprising oxidation; wherein oxidation is mechanical oxidation, electrochemical oxidation, chemical oxidation, or combinations thereof.

Aspect 408. The method of Aspect 407, wherein oxidation comprises adding to the raw material and the first base an oxidizing agent.

Aspect 409. The method of Aspect 408, wherein the oxidizing agent comprises a peroxide, ozone, a permanganate, or combinations thereof.

Aspect 410. The method of Aspect 409, wherein the oxidizing agent comprises hydrogen peroxide.

Aspect 411. The method of Aspect 410, wherein the hydrogen peroxide is added in an mol amount that is equal to:

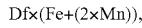

$$Df \times (Fe + (2 \times Mn)),$$

wherein Df is a number having a value of about 1.2 to about 1.5; wherein Fe represents the mol amount of iron present; and Mn represents the mol amount of manganese present.

Aspect 412. The method of Aspect 396-Aspect 411, wherein the second base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 413. The method of Aspect 412, wherein the second base comprises calcium hydroxide.

Aspect 414. The method of Aspect 396-Aspect 413, wherein the contacting the first aqueous phase with the second base is in an amount sufficient to adjust the pH to a value from about 8.0 to about 8.5.

Aspect 415. The method of Aspect 396Aspect 414, wherein the removing the aqueous effluent and collecting the hydraulic pre-concentrate comprises using a clarifier, a settlement basin, a flexible planar geotextile fabric of woven or nonwoven construction, or combinations thereof.

Aspect 416. The method of Aspect 396-Aspect 415, further comprising: (e) transferring the hydraulic pre-concentrate to a geosynthetic geobag; and (f) conditioning the hydraulic pre-concentrate in a first conditioning tank for a period of time sufficient and a temperature suitable for the solids concentration in the geosynthetic geobag to increase from about 1.1-fold to about 15-fold compared to the solids concentration of the hydraulic pre-concentrate;

thereby forming in the geosynthetic geobag a first conditioned hydraulic pre-concentrate.

Aspect 417. The method of Aspect 416, wherein the geosynthetic geobag comprises woven materials, non-woven materials, or combinations thereof.

Aspect 418. The method of Aspect 396-Aspect 417, further comprising: (e) transferring the hydraulic pre-concentrate to a first conditioning tank; and (f) conditioning the hydraulic pre-concentrate in the first conditioning tank for a period of time sufficient and a temperature suitable for the solids concentration in the lower sloped portion to increase from about 1.1-fold to about 15-fold compared to the solids concentration of the hydraulic pre-concentrate;

thereby forming in the lower portion of a conditioning tank a first conditioned hydraulic pre-concentrate.

Aspect 419. The method of Aspect 418, wherein the conditioning tank comprises a plurality of two or more conditioning tanks.

Aspect 420. The method of Aspect 418, wherein the conditioning tank comprises a first conditioning tank and a second conditioning tank.

Aspect 421. The method of Aspect 418, wherein the period of time sufficient and the temperature suitable for the solids concentration in the lower sloped portion to reach a first conditioned pre-hydraulic solids concentration; wherein the first conditioned pre-hydraulic solids concentration is increased from about 1.2-fold to about 10-fold compared to the solids concentration of the hydraulic pre-concentrate; wherein the period of time is from about 10 min to about 72 hours; and wherein the temperature is from about 5° C. to about 50° C.

Aspect 422. The method of Aspect 418, further comprising collecting the first conditioned hydraulic pre-concentrate.

Aspect 423. The method of Aspect 422, wherein the collecting further comprises: (g) transferring the first condition hydraulic pre-concentrate to a second conditioning tank; and (h) condition the first conditioned hydraulic pre-concentrate in the second conditioning tank for a period of time sufficient and at a temperature suitable for the solids concentration in the lower sloped portion to increase from about 1.1-fold to about 5-fold compared to the solids concentration of the first conditioned hydraulic pre-concentrate; thereby forming in the lower portion of the second conditioning tank a second conditioned hydraulic pre-concentrate.

Aspect 424. The method of Aspect 423, wherein the period of time sufficient and the temperature suitable for the solids concentration in the lower sloped portion to increase from about 1.2-fold to about 5-fold compared to the solids concentration of the hydraulic pre-concentrate is a period of time from about 30 min to about 72 hours at a temperature from about 5° C. to about 50° C.

Aspect 425. A method for preparing a pregnant leach solution, the method comprising: transferring the first conditioned hydraulic pre-concentrate of Aspect 418 or the second conditioned hydraulic pre-concentrate of Aspect 423 to a mixing tank; and adding a first acid to the mixing tank in an amount sufficient to adjust the pH from about 2.0 to about 4.0, thereby forming the pregnant leach solution; wherein the first acid is mixed with the first conditioned hydraulic pre-concentrate or the second conditioned hydraulic pre-concentrate as the first acid is added.

Aspect 426. The method of Aspect 425, wherein the first acid is a mineral acid.

Aspect 427. The method of Aspect 426, wherein the mineral acid comprises a mineral acid selected from nitric acid, hydrochloric acid, phosphoric acid, sulfuric acid, sulfurous acid, and combinations thereof.

Aspect 428. The method of Aspect 427, wherein the mineral acid is comprised of sulfuric acid.

Aspect 429. The method of Aspect 425, further comprising adding a flocculating agent, coagulating agent, or combinations thereof.

Aspect 430. The method of Aspect 425, wherein the pregnant leach solution is transferred to a filtration apparatus; and wherein the filtrate comprising a filtered pregnant leach solution is collected.

Aspect 431. The method of Aspect 425, further comprising neutralizing the pregnant leach solution or the filtered pregnant leach solution by contacting the pregnant leach solution or the filtered pregnant leach solution with a third base in an amount sufficient to raise the pH of the pregnant leach solution to a pH of from about 4.5 to 5.0, thereby forming a neutralized pregnant leach solution.

Aspect 432. The method of Aspect 431, wherein the third base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 433. The method of Aspect 432, wherein the third base comprises ammonium hydroxide.

Aspect 434. The method of Aspect 431, wherein the neutralized pregnant leach solution comprises iron at a concentration less than or equal to about 25 mg/L.

Aspect 435. The method of Aspect 431, wherein the neutralized pregnant leach solution comprises thorium and uranium in an aggregate concentration of less than about 1 mg/L.

Aspect 436. A hydraulic pre-concentrate composition made by the method of Aspect 396.

Aspect 437. A conditioned hydraulic pre-concentrate composition made by the method of Aspect 423.

Aspect 438. A pregnant leach solution composition made by the method of Aspect 425.

Aspect 439. A method for preparing a pregnant leach solution, the method comprising: transferring a hydraulic pre-concentrate to a mixing tank; and adding a first acid to the mixing tank in an amount sufficient to adjust the pH from about 2.0 to about 4.0, thereby forming the pregnant leach solution; wherein the hydraulic pre-concentrate is enriched in rare earth elements compared to the rare earth elements concentration present in an acid mine discharge; and wherein the first acid is mixed with the hydraulic pre-concentrate as the first acid is added.

Aspect 440. The method of Aspect 439, wherein the acid is a mineral acid.

Aspect 441. The method of Aspect 440, wherein the mineral acid comprises an acid selected from nitric acid, hydrochloric acid, phosphoric acid, sulfuric acid, sulfurous acid, and combinations thereof.

Aspect 442. The method of Aspect 441, wherein the mineral acid comprises sulfuric acid.

Aspect 443. The method of Aspect 439, further comprising adding a flocculating agent, coagulating agent, or combinations thereof.

Aspect 444. The method of Aspect 439, wherein the pregnant leach solution is transferred to a filtration apparatus; and wherein the filtrate comprising a filtered pregnant leach solution is collected.

Aspect 445. The method of Aspect 439, further comprising neutralizing the pregnant leach solution or the filtered pregnant leach solution by contacting the pregnant leach solution or the filtered pregnant leach solution with a third base in an amount sufficient to raise the pH of the pregnant leach solution to a pH of from about 4.5 to 5.0, thereby forming a neutralized pregnant leach solution.

Aspect 446. The method of Aspect 445, wherein the third base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

Aspect 447. The method of Aspect 446, wherein the third base comprises ammonium hydroxide.

Aspect 448. The method of Aspect 445, wherein the neutralized pregnant leach solution comprises iron at a concentration less than or equal to about 25 mg/L.

Aspect 449. The method of Aspect 445, wherein the neutralized pregnant leach solution comprises thorium and uranium in an aggregate concentration of less than about 1 mg/L.

Aspect 450. A pregnant leach solution composition made by the method of Aspect 439.

Aspect 451. A method for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises a hydraulic pre-concentrate, a pregnant leach solution, or combination thereof.

Aspect 452. The method of Aspect 451, wherein the rare earth element oxide feedstock material is obtained from an acid mine drainage.

Aspect 453. The method of Aspect 452, wherein the acid mine drainage is associated with a coal mine, a hard rock mine, or combinations thereof.

Aspect 454. The method of Aspect 451, wherein the hydraulic pre-concentrate has solids concentration from about 0.05% solids to about 5% solids.

Aspect 455. The method of Aspect 451, wherein the pregnant leach solution comprises lanthanum, cerium, praseodymium, neodymium, promethium, samarium, europium, gadolinium, terbium, dysprosium, holmium, erbium, thulium, ytterbium, lutetium, scandium, and yttrium; wherein each of the foregoing is independently present at a concentration and sum of each concentration is a total rare earth element concentration; and wherein the total rare earth concentration is about 5 mg/L to about 500 mg/L.

Aspect 456. The method of Aspect 451, wherein the rare earth element oxide feedstock material comprises thorium and uranium in an aggregate concentration of less than about 1 mg/L.

Aspect 457. The method of Aspect 451, wherein the hydraulic pre-concentrate has a pH of from about 7.0 to about 9.0.

Aspect 458. The method of Aspect 451, wherein the pregnant leach solution has a pH of from about 2.0 to about 4.0.

Aspect 459. The method of Aspect 451, wherein the pregnant leach solution has a pH of from about 4.0 to about 4.5.

Aspect 460. The method of Aspect 451, wherein the rare earth element oxide is a rare earth element carboxylate.

Aspect 461. The method of Aspect 460, wherein the rare earth element oxide is a rare earth element oxalate.

Aspect 462. The method of Aspect 451, further comprising the step of reducing the rare earth element oxide to a reduced rare earth element; wherein the reducing is carried out using an electrolytic process, an electrowinning process, or a metallothermic reduction process.

Aspect 463. A rare earth element oxide composition made by the method of Aspect 451.

Aspect 464. A reduced rare earth element made by the method of Aspect 462.

Aspect 465. A method for making a rare earth element oxide, the method comprising the steps of: providing a rare earth element oxide feedstock material; subjecting the rare earth element oxide feedstock material to one or more solvent extraction steps; and isolating the rare earth element oxide from the one or more solvent extraction steps; wherein the rare earth element oxide feedstock material comprises the hydraulic pre-concentrate of Aspect 396, the pregnant leach solution 28 or 39, or combination thereof.

Aspect 466. The method of Aspect 465, wherein the rare earth element oxide feedstock material is obtained from an acid mine drainage.

Aspect 467. The method of Aspect 466, wherein the acid mine drainage is associated with a coal mine, a hard rock mine, or combinations thereof.

Aspect 468. The method of Aspect 465, wherein the hydraulic pre-concentrate has solids concentration from about 0.05% solids to about 5% solids.

Aspect 469. The method of Aspect 465, wherein the pregnant leach solution comprises lanthanum, cerium, praseodymium, neodymium, promethium, samarium, europium, gadolinium, terbium, dysprosium, holmium, erbium, thulium, ytterbium, lutetium, scandium, and yttrium; wherein each of the foregoing is independently present at a concentration and sum of each concentration is a total rare earth element concentration; and wherein the total rare earth concentration is about 5 mg/L to about 500 mg/L.

Aspect 470. The method of Aspect 465, wherein the rare earth element oxide feedstock material comprises thorium and uranium in an aggregate concentration of less than about 1 mg/L.

Aspect 471. The method of Aspect 465, wherein the hydraulic pre-concentrate has a pH of from about 7.0 to about 9.0.

Aspect 472. The method of Aspect 465, wherein the pregnant leach solution has a pH of from about 2.0 to about 4.0.

Aspect 473. The method of Aspect 465, wherein the pregnant leach solution has a pH of from about 4.0 to about 4.5.

Aspect 474. The method of Aspect 465, wherein the rare earth element oxide is a rare earth element carboxylate.

Aspect 475. The method of Aspect 474, wherein the rare earth element oxide is a rare earth element oxalate.

Aspect 476. The method of Aspect 465, further comprising the step of reducing the rare earth element oxide to a reduced rare earth element oxide; wherein the reducing is carried out using an electrolytic process, an electrowinning process, or a metallothermic reduction process.

Aspect 477. A rare earth element oxide composition made by the method of Aspect 465.

Aspect 478. A reduced rare earth element made by the method of Aspect 476.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Analytical Methods

ICP-MS was conducted using a Nexlon 2000-P instrument from Perkin Elmer equipped with an external Autodiluter S400V from Elemental Scientific. Syngistic 2.4 software was used to collect and analyze data according to the EPA 200.8 Rev. 5.4 method (1994).

ICP-OES was conducted on an ICP-OES 720 instrument from Agilent Technologies using Expert II software according to method EPA 200.7 Rev. 4.4 (1994).

A Gallery Discrete Analyzer System (CPQ-00096605 from Thermo Fisher Scientific) was used for some measurements including pH. Data was collected and analyzed using Gallery software 6.0.1 according to method SM 4500-E 2011.

Thermogravimetric was conducted using a TGA 801 instrument from LECO with software package cornerstone version 2.8.8. The method used to determine moisture levels was developed inhouse with sample being brought from room temperature to 105° C. and held to constant weight.

Acid digestion was a manual technique using a 1:1 ratio of nitric acid to sample. Additional data analysis for all techniques was conducted using Microsoft Excel.

Example 2: Laboratory-Scale Experiments and Process Considerations

Laboratory experiments were performed prior to scaling up the disclosed process. Preliminary results produced solid feedstock with REE/CM averaging 2.88% in the laboratory (see Table 4) to 0.2% in an initial, continuous field extraction trial. Of that amount, 0.14% were MREO, including the five REEs that are also CM (0.07%) and the critical mineral cobalt (0.06%).

TABLE 4

Enrichment of Raw AMD Samples.

| Site | REEs in Raw AMD (µg/L) | MREO Grade (%) | Enrichment Factor |
|---|---|---|---|
| AQ 51 | 738 | 1.30 | 17,615 |
| AQ 2 | 352 | 2.08 | 59,091 |
| AQ 50 | 2119 | 2.20 | 10,382 |
| AQ 8 | 2353 | 3.16 | 13,430 |
| AQ 65 | 1300 | 5.65 | 43,439 |
| Average | 1372 | 2.88 | 28,791 |

Figure 2B:
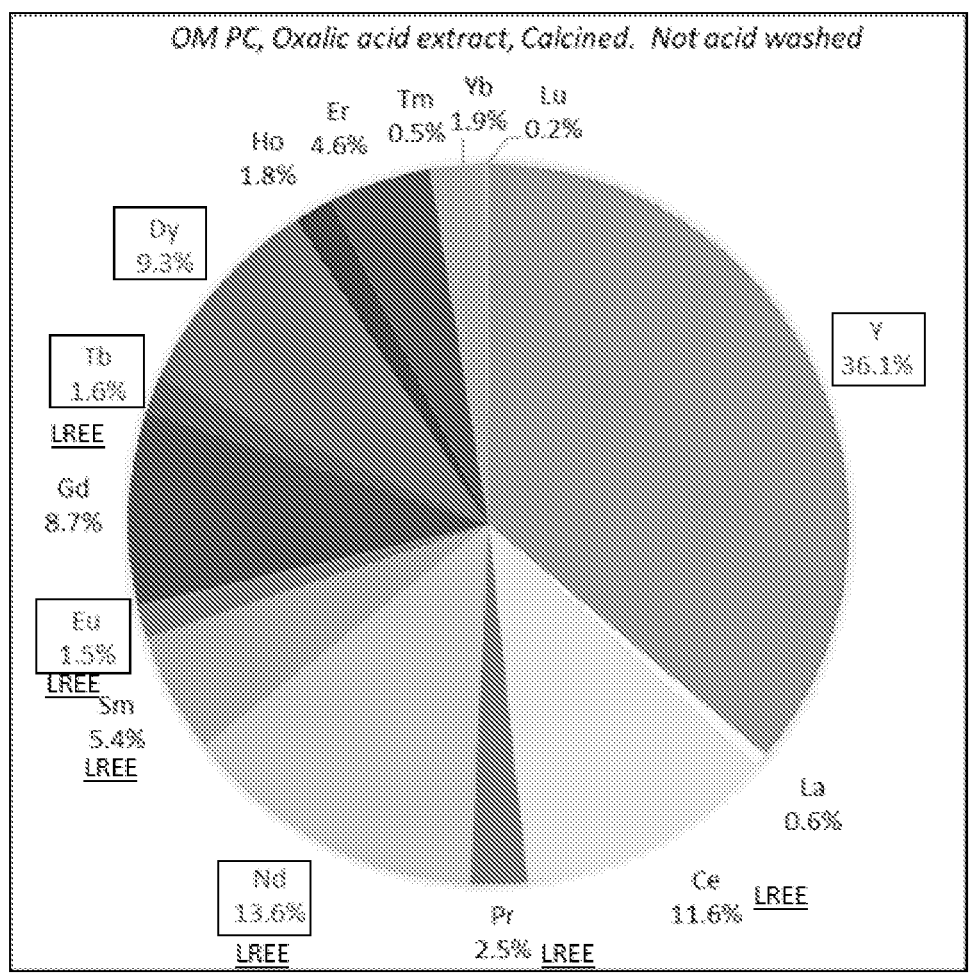

A field trial of a mobile version of the plant disclosed herein (see FIG. 1) was deployed at a conventional AMD treatment plant referred to herein as the Omega Site. Preconcentrate from that plant (MREO=0.2%), when processed via ALSX, yielded a final MREO grade of 54.4% without acid washing (FIG. 2). In some experiments, acid washing increased MREO from 40% to either 62 or 80% by reducing the residual fraction by roughly one half. It is significant that the LREO and HREO were 35.3 and 64.7% respectively while adding CM to the HREO yields 64.7%.

The disclosed plant and process featured a staged precipitation/AMD treatment unit that concentrates REEs away from major gangue elements while simultaneously producing clean water for discharge. Significant gains in efficiency and cost were made by integrating AMD treatment with REE/CM recovery. Standard compliance-based AMD treatment raises the pH of the AMD from the inflow value (typically 2.5 to 3.5) to the final value needed for discharge (7 to 8) in a single stage. This single-step precipitation can significantly concentrate REEs; however, it also captures several problematic gangue metals into the sludge byproduct. Previous work focusing on REE extraction from sludge showed that these gangue metals contribute to high transportation costs, high acid consumption, and challenging separation.

Figure 3:
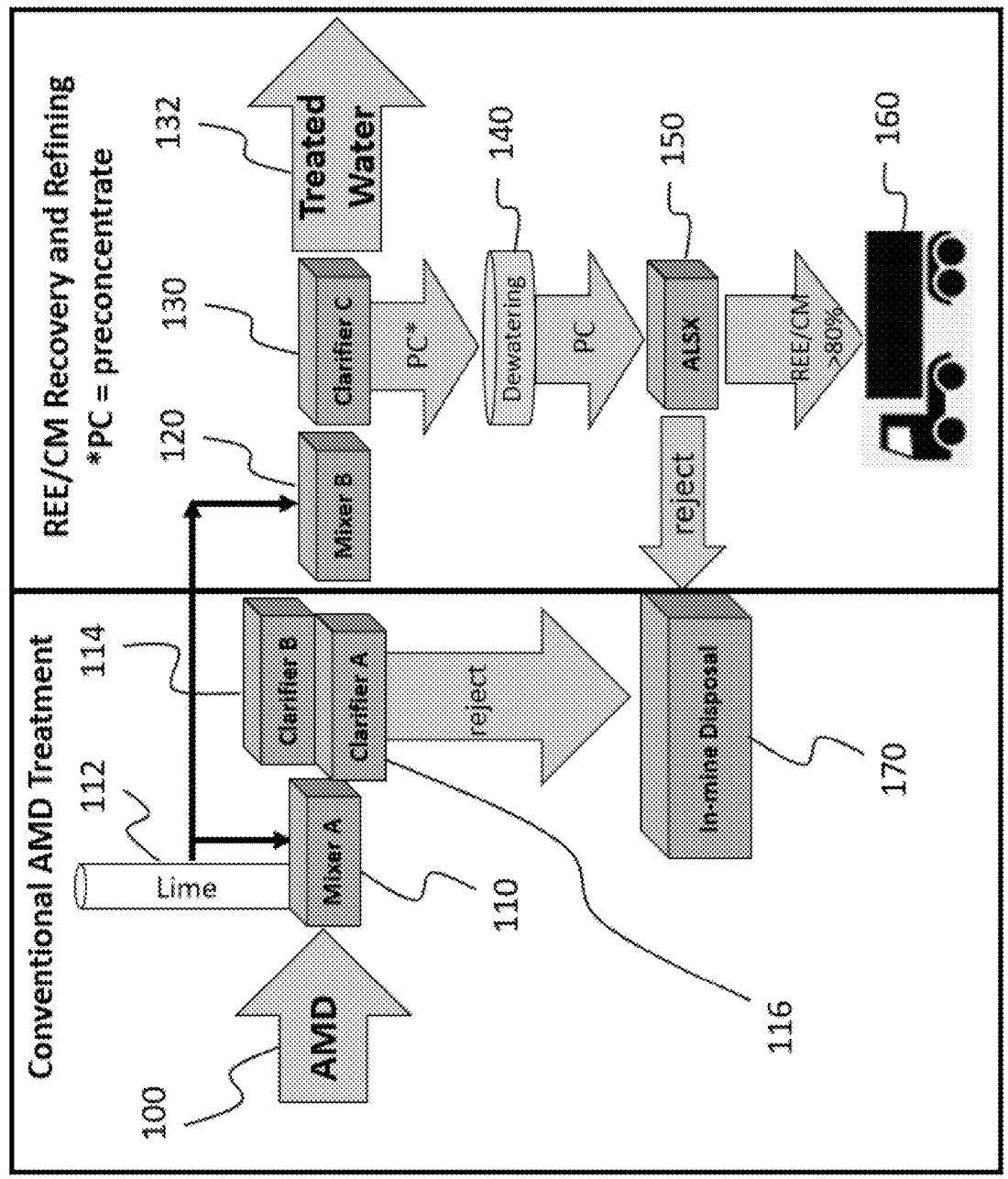
FIG. 3 shows a schematic flow diagram of a process disclosed herein. Conventional AMD treatment appears on the left (darker gray background) with Rare Earth Element/Critical Mineral (REE/CM) recovery and concentration on the right (light gray background).

In one aspect, a disclosed process focused on raw AMD in the early stages of standard treatment and used staged precipitation to isolate the REEs from the other gangue elements. A simplified process schematic for performing this staged precipitation is shown in FIG. 3. In this depiction, staged precipitation was achieved by using two reagent mixing units and three clarifiers. Two parallel clarifiers (A and B) received AMD adjusted to the first pH setpoint provided by mixer A. This provides the bulk of AMD treatment capacity. The underflow from clarifiers A and B largely consisted of iron and aluminum oxy-hydroxides and was disposed similarly to conventional AMD treatment byproducts, i.e., dewatering cells or GEOTUBE®. Mixer B increased the pH of the clarifier A and B overflow to precipitate the REE/CM for removal in clarifier C. At this point in the circuit, the solid product was largely devoid of deleterious gangue metals and contained few acid consuming constituents. The underflow solids from clarifier C was a REE/CM preconcentrate that was dewatered and delivered to the ALSX plant for final concentration. Since the pH is raised to circumneutral values in the final stage, the third clarifier overflow can be safely discharged to the environment while meeting NPDES limits.

Testing showed that the disclosed process can effectively concentrate REE/CMs from raw AMD, with overall enrichment factors ranging from 13,000× to 15,000×. More importantly, the process has proved to be extremely robust, as testing on different water feedstocks representing a variety of geochemical settings consistently produced similar results with respect to final REE purity. Other testing evaluated in the influence of raw water characteristics, alkaline material, pH endpoint, redox potential, and the use of flocculant, and the number of process stages. When optimized, these procedures consistently achieved REE/CM recovery >96% and generated products with REE/CM grade consistently between 0.1% to 5% wt %.

Specific testing of a host site focused on a single AMD source in continuous run mode, as described in the Examples that follow. The upstream concentrator was be evaluated on its ability to manage variations in flow and AMD concentration while satisfying three parameters: NPDES permit compliance, operating costs and ability to supply the ALSX plant with feedstock of adequate grade (about 0.1% to 5% MREO). The ALSX plant was evaluated based on operating cost and product grade approaching or exceeding 35% to 95%. The added infrastructure included an additional clarifier in series with the two clarifiers normally required of an AMD plant of this capacity. Also, independent lime dosing and additional materials handling can be utilized as needed to isolate the REE preconcentrate. Since the beginning and ending pH points for this process are similar to those of conventional AMD treatment, the process added only modestly to base consumption. This outcome was particularly favorable given the high consumable costs for many REE concentration strategies.

Table 5 illustrates the data analysis based on laboratory testing to identify pH set points for the AMD/REE preconcentrator, based on laboratory batch testing. Recovery to precipitate indicates the extent to which the major gangue elements are rejected at the early stages of the process while REEs are recovered to the final precipitate to a very high degree (97%). With a grade of 48,015 mg REE/kg or 4.8%.

TABLE 5

Laboratory Extraction Testing at 3 pH Set Points.

| Element | Precipitate Concentration | | | | Recovery of Precipitate (%) | | |
|---|---|---|---|---|---|---|---|
| | pH 4.0 | pH 5.0 | pH 8.0 | Total | pH 4.0 | pH 5.0 | pH 8.0 |
| Fe | 373,600 | 2,436 | 7,253 | 383,289 | 97 | 1 | 2 |
| Al | 37,677 | 235,055 | 35,704 | 308,435 | 12 | 76 | 12 |
| S | 52,100 | 72,459 | 7,107 | 131,666 | 4 | 55 | 5 |
| Si | 4,623 | 13,504 | 98,068 | 116,195 | 4 | 12 | 84 |
| Zn | 50 | 478 | 110,268 | 110,796 | 0 | 0 | 100 |
| Mn | 9,788 | 4,181 | 63,521 | 77,491 | 13 | 5 | 82 |
| Mg | 397 | 616 | 32,540 | 33,552 | 1 | 2 | 97 |
| Ca | 1,296 | 2,387 | 9,930 | 13,613 | 10 | 18 | 73 |
| Co | 48 | 35 | 8,025 | 8,108 | 1 | 0 | 99 |
| Ni | 108 | 109 | 5,710 | 5,927 | 2 | 2 | 96 |
| Cd | 20 | 0 | 138 | 158 | 12 | 0 | 87 |
| Cl | 0 | 11 | 95 | 106 | 0 | 11 | 89 |
| Total | 479,706 | 331,271 | 378,358 | 1,189,336 | 40 | 28 | 32 |
| Sc | 18 | 59 | 18 | 95 | 19 | 62 | 19 |
| Y | 27 | 325 | 13,307 | 13,659 | 0 | 2 | 97 |
| La | 7 | 15 | 3,597 | 3,618 | 0 | 0 | 99 |
| Ce | 136 | 127 | 8,950 | 9,212 | 1 | 1 | 97 |
| Pr | 8 | 17 | 1,786 | 1,811 | 0 | 1 | 99 |
| Nd | 52 | 97 | 9,019 | 9,168 | 1 | 1 | 98 |
| Sm | 15 | 45 | 2,386 | 2,446 | 1 | 2 | 98 |
| Eu | 3 | 13 | 586 | 602 | 1 | 2 | 97 |
| Gd | 14 | 67 | 3,473 | 3,554 | 0 | 2 | 98 |
| Tb | 2 | 13 | 450 | 465 | 0 | 3 | 97 |
| Dy | 10 | 86 | 2,286 | 2,382 | 0 | 4 | 96 |
| Ho | 2 | 16 | 415 | 422 | 0 | 4 | 96 |
| Er | 5 | 48 | 1,008 | 1,061 | 0 | 5 | 95 |
| Tm | 1 | 8 | 116 | 124 | 1 | 6 | 93 |
| Yb | 5 | 49 | 541 | 594 | 1 | 8 | 91 |
| Lu | 1 | 7 | 80 | 88 | 1 | 8 | 91 |
| TREE | 305 | 991 | 48,015 | 49,311 | 1 | 2 | 97 |
| Th | 158.7 | 6.2 | 0.9 | 165.9 | 95.7 | 3.8 | 0.6 |
| U | 1.8 | 22.3 | 96.1 | 120.2 | 1.5 | 18.6 | 80.0 |
| TAc* | 160.5 | 28.6 | 97.1 | 286.1 | 97.2 | 22.3 | 80.5 |

*Total actinides.

The incremental lime dosage rates and costs for the Upstream Concentrator and resulting resource, grade and recovery were estimated at each pH set point (Table 6). Based on two samples from an initial testing site, this type of analysis can be used to quickly identify the most efficient pH set points based on operating cost, grade, and recovery. This type of testing protocol and knowledge gained while processing upstream concentrate samples through the disclosed ALSX plant minimized scaling risk as the AMD/REE is designed, installed, and operated.

TABLE 6

Process Analysis: Two Runs at the Omega AMD Plant using Two pH Set Points.

| Parameter | Run 1 Raw AMD | pH Set Point 4.0 | pH Set Point AMD | Run 2 Raw AMD | pH Set Point 4.0 | pH Set Point 8.0 |
|---|---|---|---|---|---|---|
| Acidity | 302 | 116 | 30 | 461 | 53 | 46 |
| Q (gpm) | 500 | 500 | 500 | 500 | 500 | 500 |
| Acid Load (lb/day) | 1813 | 698 | 178 | 2765 | 316 | 275 |
| TMM (mg/L) | 74 | 45 | 16 | 115 | 42 | 39 |
| TREE (μg/L) | 841 | 824 | 23 | 1319 | 1006 | 64 |
| Acid Load (tpd) | 1813 | 698 | 178 | 2764 | 316 | 275 |
| Lime Dosing Rate (lb/day) | 1495 | 576 | 147 | 2279 | 261 | 227 |

TABLE 6-continued

Process Analysis: Two Runs at the Omega AMD Plant using Two pH Set Points.

| Parameter | Run 1 Raw AMD | pH Set Point 4.0 | | Run 2 Raw AMD | pH Set Point 4.0 | 8.0 |
|---|---|---|---|---|---|---|
| Lime Cost ($/day) | $149.48 | $57.58 | $14.67 | $227.5 | $26.06 | $22.68 |
| % Total Lime Cost | 67% | 26% | 7% | 82% | 9% | 8% |
| TREE Grade (mg/kg) | 102.8 | 102.8 | 5681.8 | | 991 | 48,015 |
| TREE Recovery | | 5.21% | 91.63% | | 30.92% | 65.41% |

Figure 4B:
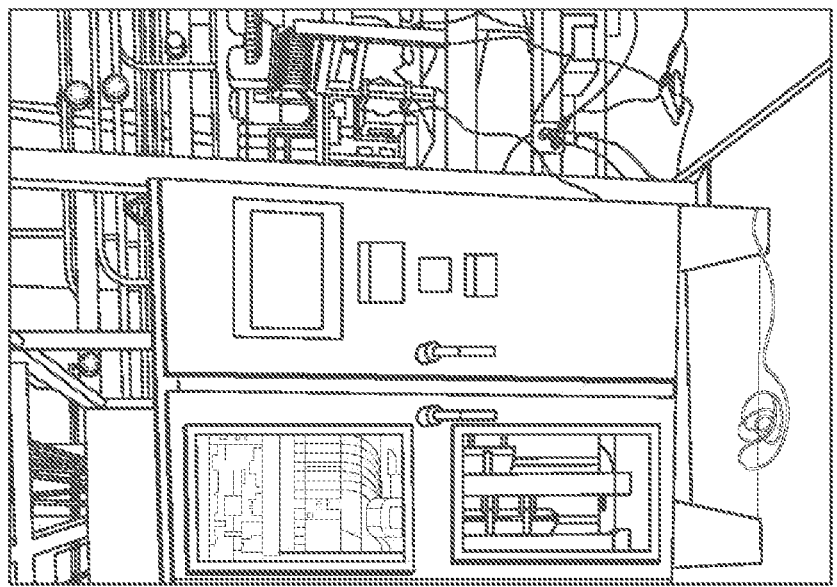
FIGS. 4A-4B each show exemplary aspects of a Rare Earth Extraction Facility (REEF).
Figure 4A:
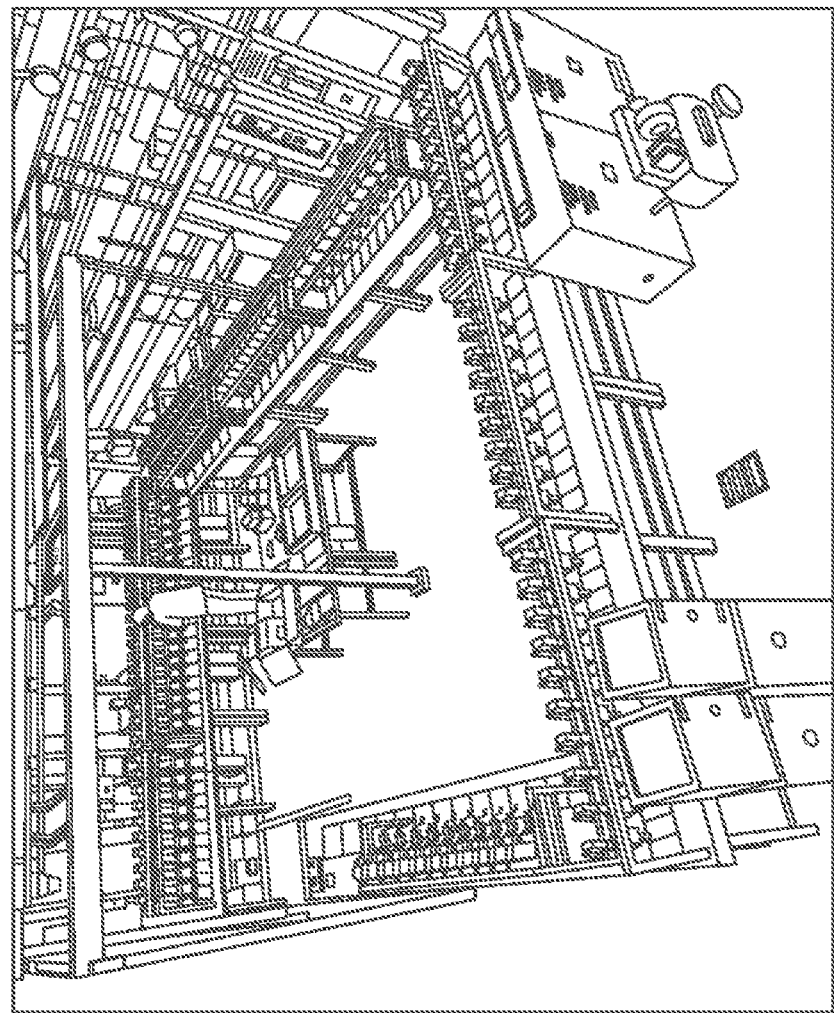

The disclosed processes involves an ALSX process that can further enrich the REE preconcentrates to commercially attractive purity levels. A bench-scale solvent extraction system to extract REEs from AMD precipitates and concentrate them into a final REO product was designed. The REEF on the WVU campus contained an acid leaching circuit, mixer-settler units, and downstream precipitation vessels. The system had integrated state-of-the-art sensors and controls provided by Rockwell Automation (FIG. 4).

Figure 5:
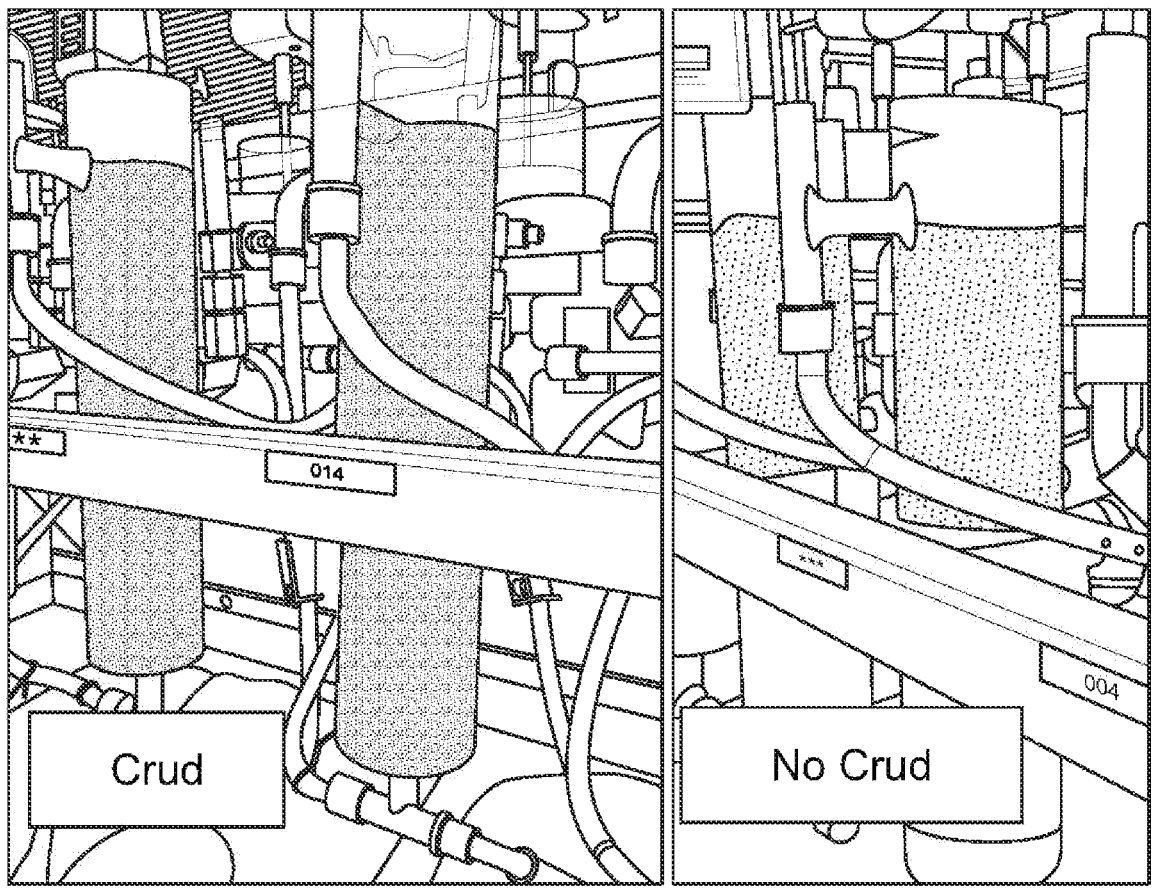
FIG. 5 shows Acid Leaching/Solvent Extraction (ALSX) units before (left) and after (right) development and implementation of measures developed to control crud formation.

Bench-scale testing has allowed problems to be addressed prior to full site scale-up. Given the distribution and concentration of metals in typical AMD-based leachates, crud formation has proven to be a major nuisance in ALSX operation. Gangue element concentration was carefully monitored during testing and leaching conditions were adjusted as necessary. FIG. 5 shows SX operation with and without crud formation.

Data collected from this test facility demonstrated the technical feasibility of concentrating REEs from AMD-based feedstocks. Prior testing campaigns investigated the influence of several operational variables, including leaching pH, extractant concentration, organic to aqueous ratios, stripping acid type and concentration, precipitation conditions, and system feed flow rates. From this testing, optimal operating conditions have been identified and the process has been validated using three sources of run-of-mine AMD treatment solids. Sources include the Omega, DLM and Royal Scott AMD treatment plants operated by WVDEP. Resulting MREO concentrations ranged from 62 to 80%.

The PC from the upstream concentrator can be transported to an adjacent pilot-scale ALSX plant for final concentration to the high-grade MREO product. This approach includes several key changes from existing ALSX facilities. First, these efforts represent an increase in project scale. The existing plant had a maximum production rate of 3 g/hr and the pilot-scale plant yielded about 15.5 g MREO/hr. Second, the solid feedstock to the ALSX system is modified with the pilot scale ALSX being fed by a preconcentrated feedstock from which most of the gangue metals have been removed. This modification improved overall ALSX performance; prior laboratory-scale testing on preconcentrates from the staged precipitation process have shown that a 54% MREO product can be generated from a single stage of solvent extraction (FIG. 2). The existing bench-scale REEF on the WVU campus has been used to run off-line trials to optimize settings for the A34 (one site selected as a source) feedstock. In addition, the REEF facility has been used for additional elemental-based separations such as those optimized to recover cobalt and scandium.

Figure 6:
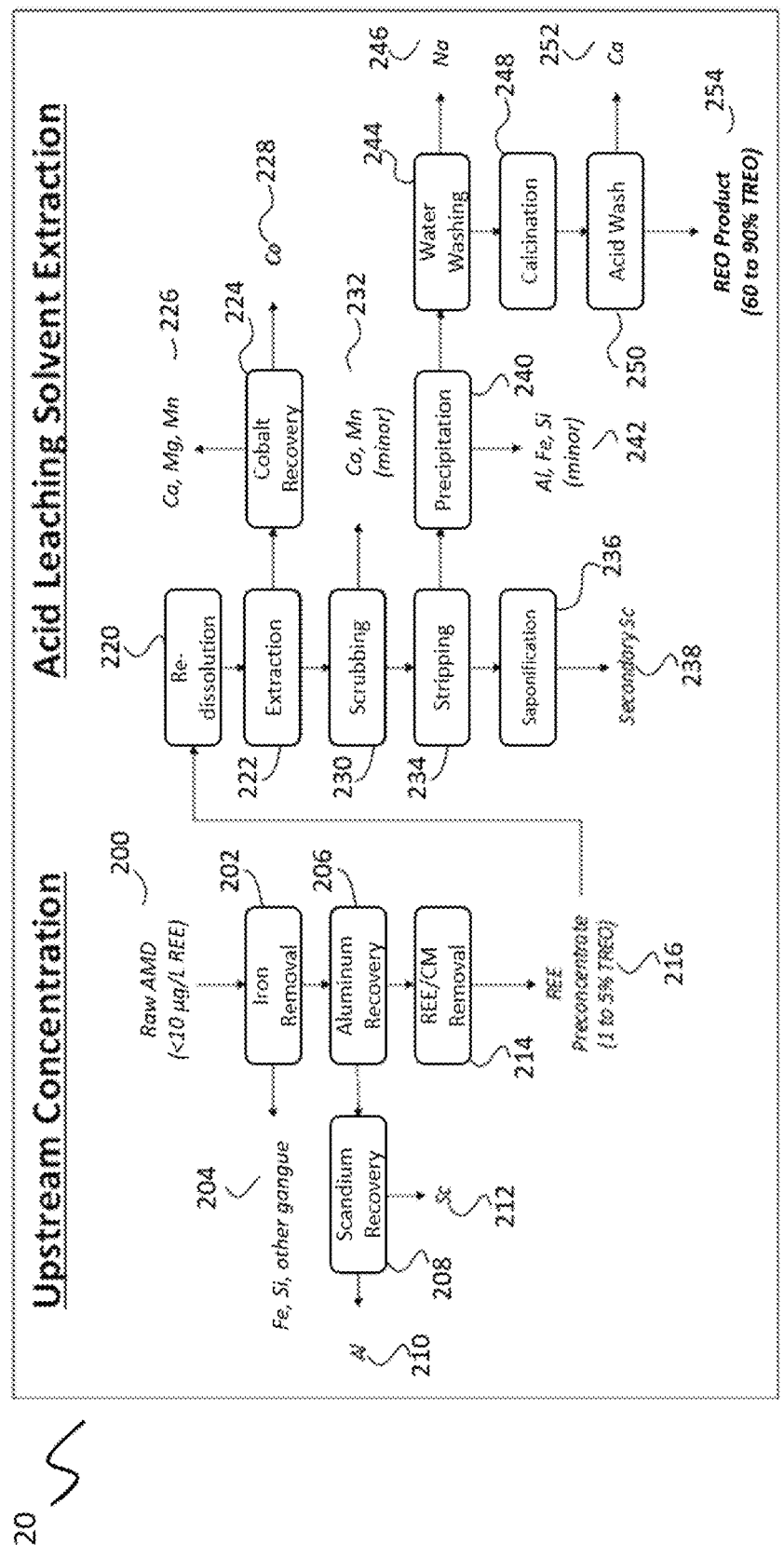
FIG. 6 is a flow diagram showing individual stages according to one aspect of the integrated upstream concentration and Acid Leaching/Solvent Extraction (ALSX) process as disclosed herein.

The disclosed AMD/REE process facility can be based on two critical process technologies: 1) upstream concentration and 2) ALSX. A block flow diagram showing the individual steps associated with each process is shown in FIG. 6. None of the components of the disclosed process have ever been integrated to extract REEs from AMD-based feedstocks in a commercial setting.

The upstream concentration development can be designed and operated as a scaled-down version of the AMD treatment facility deployable at a host site. The scaled unit was used to evaluate and optimize operating parameters. The pilot-scale ALSX unit was designed to be approximately $1/20^{th}$ the size of a full-scale unit.

The technical criteria defining project success are shown in Table 7. These values represent targets necessary for a commercial installation. To be competitive with other commercial REE resources (not including scandium or other CMs), overall production costs must be on the order of $50 to $75/kg of REE produced. The target performance requirements defined in this table represent a combination that is expected to achieve this cost target.

TABLE 7

Performance Targets.

| Performance Attribute | Commercial Target Performance Requirement |
|---|---|
| REE recovery in leaching stage | >80% |
| REE recovery in SX extraction stage | >90% |
| REE loss in scrubbing stage | <10% |
| REE recovery in SX stripping stage | >85% |
| REE preconcentrate trade | >0.5% |
| Grade of final MREO product | >90% |
| Actinide component of intermediate rare earth products | <1% of TREE content |
| Reagent consumption in acid leaching | <100 kg/t of feed |
| Solvent loss in solvent extraction | <200 ppm |
| Raffinate recycle | >25% |

Example 3: Upstream Mobile Concentration Unit

Figure 10:
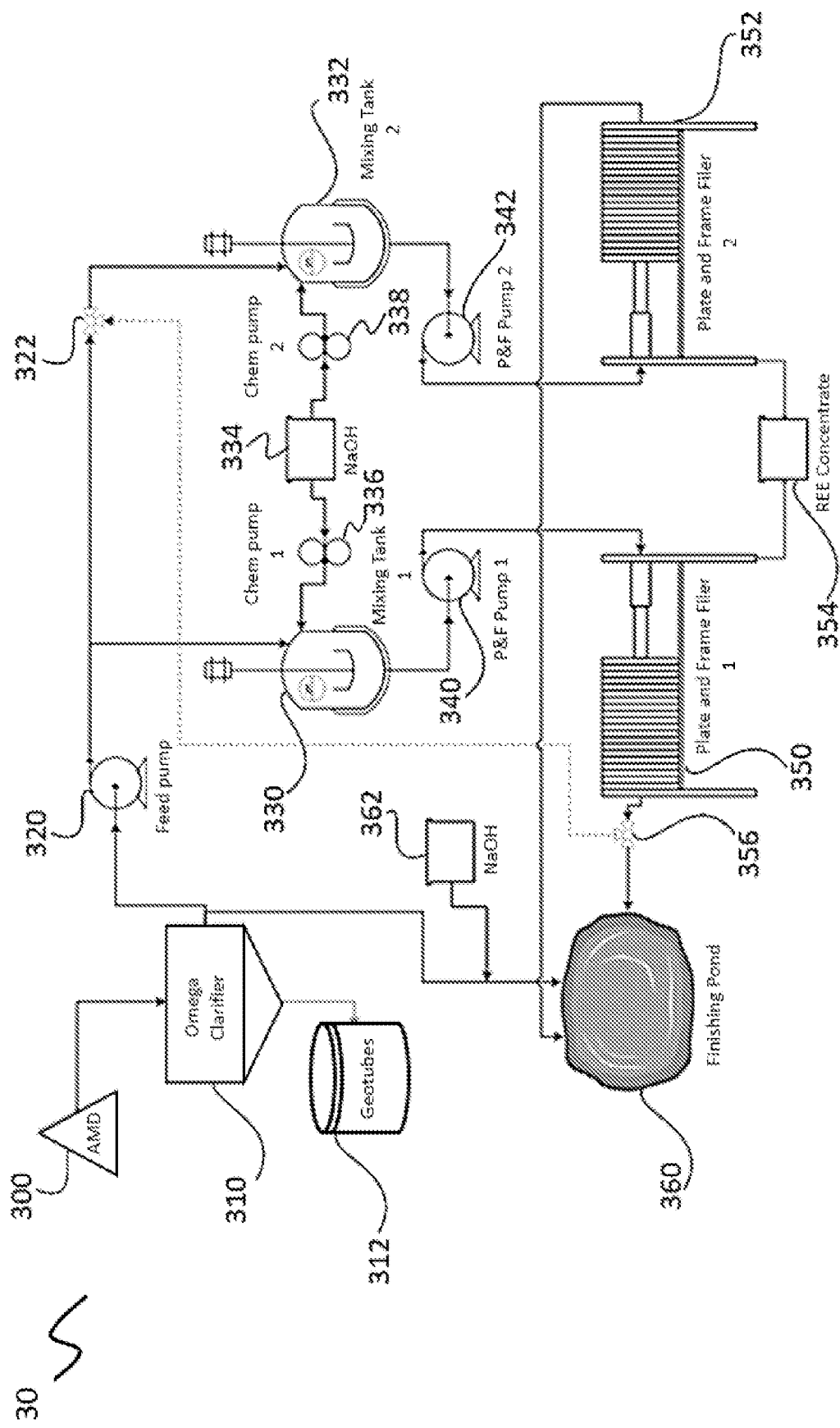
FIG. 10 is a flow diagram of an operating principle of a representative mobile plant as disclosed herein for implementing the disclosed methods and processes. The Omega Clarifier as labeled in the figure is an element of a specific conventional Acid Mine Drainage (AMD) treatment plant in West Virginia.

A flow diagram of the constructed upstream mobile concentration plant is shown in FIG. 10. Two circuits can be run in series or in parallel according to the disclosed design. In some experiments, a three-stage precipitation scheme was employed by using an on-site treatment clarifier as well as two circuits in the mobile plant; this configuration is shown using a dotted line in the flow diagram. In other experiments, the two mobile circuits were run in parallel to maximize production of precipitate using a two-stage precipitation procedure. After installation, shakedown testing was conducted to train the pH controllers to maintain a constant level in the two tanks.

A mobile plant as shown in FIG. 10 was plumbed into the system at the Omega AMD treatment plant, allowing for a split of clarified water to be pulled from the system's clarifier before discharge to settling or finishing ponds. Supplemental chemical treatment was also installed so that the Omega clarifier could operate at lower pH levels while still maintaining compliance with the NPDES outlet at the end of the finishing pond.

Elemental analysis of the products of the upstream concentration unit are shown in Table 8.

TABLE 8

Results from Operating Upstream Concentration Unit.

| | Analyte | |
|---|---|---|
| | Omega Mobile Plant Aqueous Feed | Mobile Plant Precipitated Product |
| pH | 4.35 | 8 |
| Major Ions | mg/L | mg/kg |
| Al | 27.95 | 190,382.11 |
| Ca | 354.09 | 21,825.29 |
| Co | 0.15 | 515.65 |
| Fe | 2.51 | 16,990.35 |
| Mg | 28.19 | 3107.08 |
| Mn | 0.90 | 2630.15 |
| Si | 18.17 | 79,936.27 |
| $SO_4$ | 1135.21 | 1374.75 |
| TMM | 1567.15 | 316,761.63 |
| Rare Earth Elements | µg/L | mg/kg |
| Sc | 9.48 | 66.37 |
| Y | 46.15 | 318.64 |
| La | 8.26 | 61.04 |
| Ce | 27.41 | 206.32 |
| Pr | 4.33 | 31.84 |
| Nd | 21.66 | 154.70 |
| Sm | 6.27 | 45.87 |
| Eu | 1.62 | 12.21 |
| Gd | 9.65 | 71.68 |
| Tb | 1.72 | 12.83 |
| Dy | 10.54 | 77.10 |
| Ho | 2.04 | 14.89 |
| Er | 5.57 | 40.83 |
| Tm | 0.73 | 5.59 |
| Yb | 4.25 | 31.73 |
| Lu | 0.63 | 4.83 |
| TREE | 160.32 | 1156.45 |
| Grade | 0.000016% | 0.12% |
| Actinides | µg/L | mg/kg |
| Th | 0.14 | 1.69 |
| U | 2.33 | 12.16 |

Example 4: ALSX Bench-Scale Plant Operation

Process Overview

An ALSX plant was constructed to recover REEs from AMD precipitates. The plant design was based on extensive acid leaching and solvent extraction laboratory-scale studies. An initial system closely resembled the proposed design and shakedown testing was performed on each module of the plant to identify any construction or design oversights ranging from minor leaks to improper component specification. Following testing, modifications to the overall process were instituted to overcome any observed obstacles.

After shakedown testing and plant modification, the ALSX plant was placed into operation by implementing a decoupled, semi-batch process. The bench-scale system includes three operating units: an acid leaching and filtration module, a solvent extraction module, and a precipitation module. Initially, small batches (~60 L) of AMDp were converted to PLS using the acid leaching portion of the plant. As the acid leaching technique was refined, larger batches were produced that could supply feedstock to the solvent extraction (SX) module for week-long runs. The SX process was scheduled to operate in eight hour shifts for five days per week until the PLS was exhausted.

Upon completion of the SX plant run, the stripped aqueous product was processed using the precipitation module to convert the REE cations to oxalates. Next, the REE oxalate solids were calcined to transform the oxalates to oxides. After calcination, multiple washing stages were required to separate the REEs from gangue elements; therefore, increasing the grade of the final product. As a result of these procedures, a 62% mixed rare earth oxide material was acquired from the ALSX plant.

Feedstock Acquisition and Material Handling

AMDp was collected from the proposed feedstock sites for processing in the ALSX bench-scale plant. Ten 55-gallon drums of AMDp were collected from each of the three AMD sites evaluated for this research. A small excavator was used to remove the AMDp from on-site storage ponds. Plastic drum liners were used to isolate the AMDp from the inside of the steel drums. Upon delivery to the facility, the drums were stored in a controlled environment until the material was required for leaching tests. Drums were placed on pallets at the time of loading. Once at the ALSX facility, a pallet jack was employed to maneuver the drums into the storage area. When required for leaching, the drums were maneuvered using an overhead crane and tilting drum-lifting mechanism. This configuration was utilized to hoist the drums to the acid leaching module where the AMDp was removed from the lined drum and placed into five-gallon buckets. Each of the buckets was individually weighed to record the mass of AMDp before it was used in the acid leaching process.

Acid Leaching Module

Figure 11:
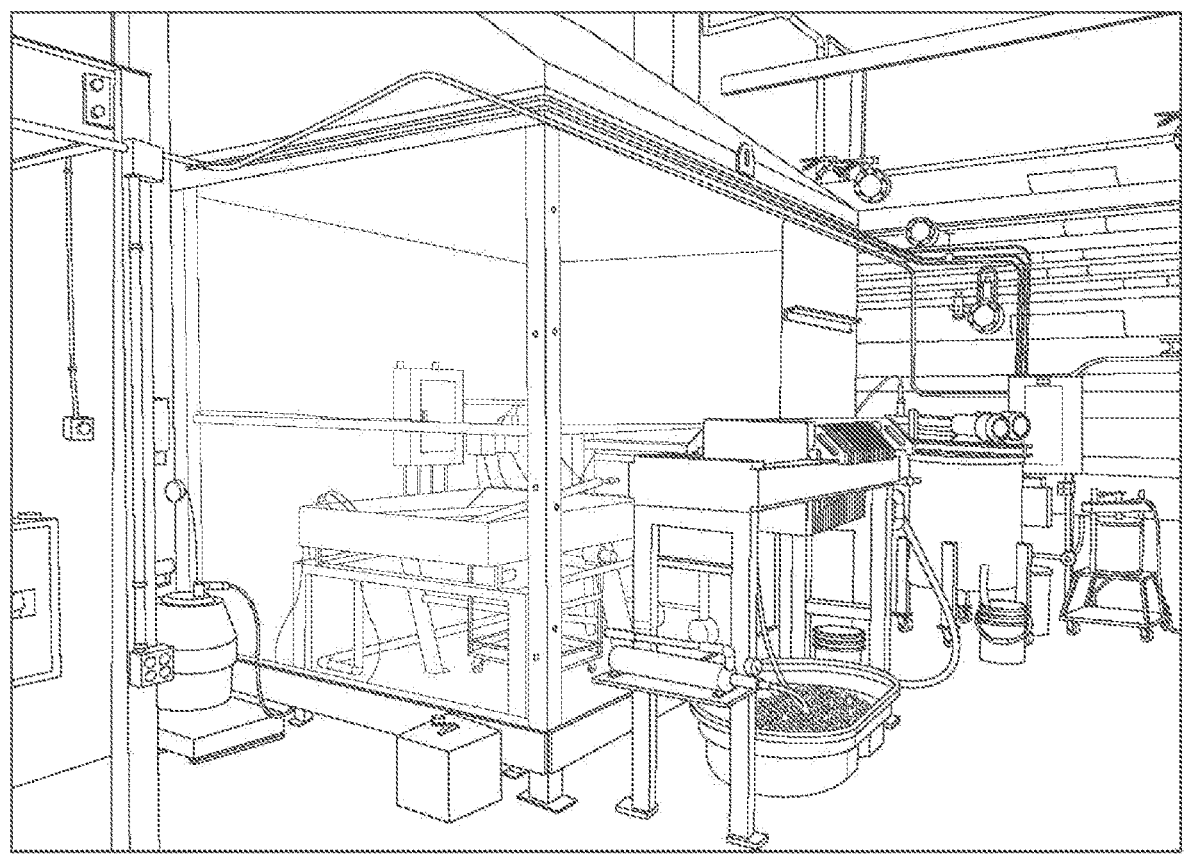
FIG. 11 shows an exemplary acid leaching module of a bench-scale plant as disclosed herein.

The acid leaching module is located adjacent to the solvent extraction system. FIG. 11 shows the as-built acid leaching operating area. The leaching vessels were operated under a full sized fume hood to prevent operator exposure to acidic fumes. The major components of the module include the fume hood, two 75-gallon agitated leaching mixing vessels, a 420 mm filter press with a 2.0 cubic-foot capacity, air diaphragm pumps, and an acid dosing system. Directly outside the fume hood, a scale holds a carboy of 68% nitric acid. The scale is used to monitor the amounts of chemicals and feedstock consumed in the leaching process.

Acid Leaching Shakedown Testing

During the shakedown testing of the ALSX system, several operational difficulties were encountered when using the ALSX system as it was initially designed. As a result, modifications to the acid leaching flow diagram were required to address these issues. The major operational challenges encountered and the flow diagram modifications implemented to overcome the unforeseen complications are presented below.

Gel Formation of PLS

Figure 12:
FIG. 12 shows representative Pregnant Leach Solution (PLS) gel formation on a pan filter at pH 3.0. In one aspect, the method disclosed herein does not exhibit gel formation.

During initial shakedown testing, several batches of PLS would form into a gelatinous mixture when the pH was raised above the leaching pH set-point. This issue was observed in feedstock from all three AMD sites. FIG. 12 shows a representative sample of the gelatinous PLS after pH adjustment. The formation of this gel inhibited pumping of the PLS. Additionally, the gel prevented filtering of the PLS; and therefore, the separation of the solid and aqueous components of the leaching slurry was impractical.

In order to alleviate this issue, several lab-scale experiments were conducted to address the issue of gel formation. During testing, it was discovered that the PLS did not form a gel when an additional filtration step was added to the procedure.

This extra filtration step was introduced directly after the PLS was lowered to the leaching pH value of 0.7. When tested on the acid leaching module, the additional filtration step prevented the congealing of the PLS at pH values less than 4.0. As a result, this additional filtration step was implemented into the operating procedure.

Filtration

Even in the absence of PLS gel formation, the vacuum pan filter was unable to filter the PLS as it did not have a sufficient filtering area for the amount of solid material remaining after acid leaching. This condition was not addressed in the design phase because the small-scale testing apparatus used did not allow for a proper evaluation of the filtration. For example, leaching tests were conducted using vacuum filtration with a Buchner funnel and filter paper. This operating condition did not produce a significant amount of precipitate to evaluate the bed depth and therefore the necessary filtration area required to perform an efficient solid-liquid separation.

To mitigate this issue, a bench-scale plate and frame filter press were employed to efficiently filter the PLS. Multiple batches of PLS were created using the three different feedstocks. Testing indicated that the filter press was capable of filtering the PLS solutions from all of the feedstocks at multiple pH values. Results from this experiment indicated a 2 cubic-foot filter press was of sufficient capacity to properly filter PLS from a 75-gallon agitated leach tank and create a clarified PLS. FIG. 13 shows a 150 mm lab-scale press used during testing and a 420 mm filter press that later replaced the pan filter.

Full-scale testing with the 2 ft$^3$ filter press was successful with all three feedstocks as a direct result of the increased filtration area. Originally, the pan filter had a usable filtration area of 25 ft$^2$. The new filtration unit increased the filtration area by a factor of almost 1.75 to 43 ft$^2$.

A Sandpiper S07 air diaphragm pump with a maximum capacity of 23 gpm was used to feed the filter press. The pump was supplied with PVDF internal components to resist the corrosion when pumping acidic liquids. The filter cake obtained from the filter press achieved moisture values of approximately 60%, which was substantially better than previous filter cakes acquired using vacuum filtration. FIG. 14 shows the PLS filtrate and the residual solids that remained after operation of the filter press.

Acid Leaching Procedure and Results

Figure 15:
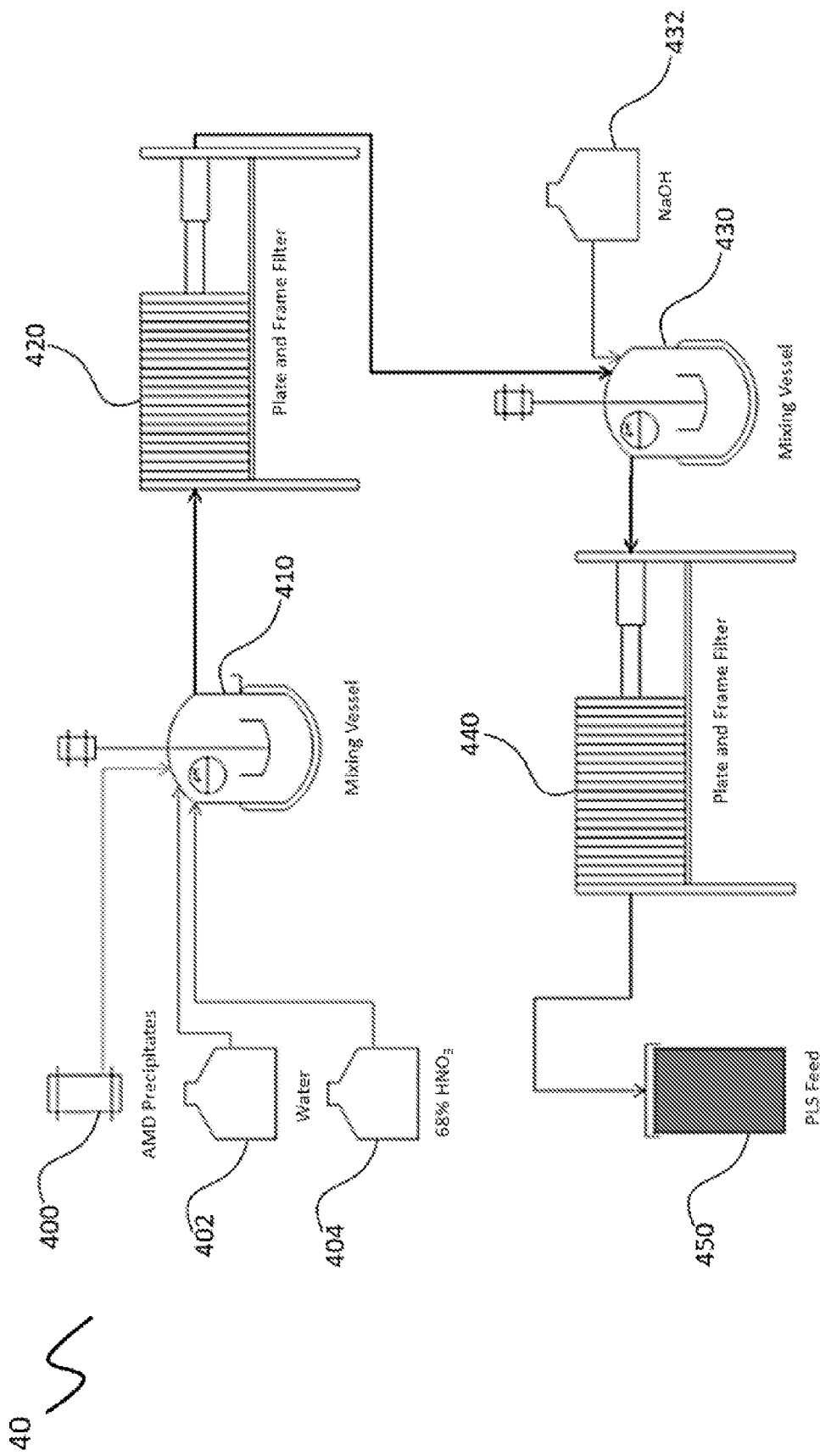
FIG. 15 is a flow diagram showing the acid leaching process used to generate the Pregnant Leach Solution (PLS) as disclosed herein.

After modifying the acid leaching process and equipment, an updated process flow diagram was created as shown in FIG. 15. The PLS created for the baseline Royal Scot solvent extraction test was made in two batches. First, AMDp was added to the agitated leaching vessel, bucket-wise, so the mass of the AMDp could be recorded. Additionally, an AMDp sample was collected from each bucket and combined to form an overall representative AMDp sample. The sample was then analyzed using thermogravimetric analysis for moisture, ICP-MS for REEs, and ICP-OES for major ion determinations. Second, water was added to the leaching vessel at 0.75 L per kg of as-received AMDp. This value was determined empirically during shakedown testing to facilitate mixing, pumping, and filtration of the PLS. Initial trials showed that using only AMDp and acid resulted in a thick slurry that was un-pumpable and therefore unable to undergo the filtering process. Third, under rapid agitation, 68% nitric acid was pumped into the leaching chamber until the desired leaching pH set-point of 0.7. The pH was monitored using a hand-held pH meter that was calibrated before the start of each batch. This process took several hours for the vessel to achieve pH equilibrium. Finally, the low pH PLS was filtered using the 420 mm filter press.

After filtration, the clean PLS was pumped into a leaching vessel. Next, the pH of the PLS was adjusted upward with 50% sodium hydroxide, to a pH value of 3.0, to remove gangue metals. Once again, this process was preformed step-wise over several hours until equilibrium was realized at the desired pH set-point. Finally, the PLS was again filtered to remove any solids that precipitated during the upward pH adjustment. The filtrate from this process was sampled then transferred to the SX module as feed for the liquid-liquid extraction.

Table 9 shows the reagents and conditions implemented to create the Royal Scot PLS. Combined, the two batches created a total of 282 liters of PLS for the subsequent SX process. The total acid consumption of the leaching procedure was 1.24 g acid/g feed. While the acid consumption of this batch process is high, other processes could be employed to reduce this metric. For example, countercurrent leaching could be employed to obtain a more efficient use of the leaching acid.

TABLE 9

Royal Scot Acid Leaching Parameters Used to Create PLS.

| Parameter | Batch 1 | Batch 2 | Total |
|---|---|---|---|
| AMDp Wet Mass (kg) | 103.51 | 103.96 | 207.47 |
| AMDp Dry Mass (kg) | 12.45 | 12.54 | 24.96 |
| Water Volume (L) | 75.60 | 75.60 | 151.20 |
| Initial pH | 8.57 | 8.37 | 16.94 |
| Acid Type | 68% HNO$_3$ | 68% HNO$_3$ | 68% HNO$_3$ |
| Acid Added (kg) | 24.07 | 21.32 | 45.39 |
| Leach pH | 0.59 | 0.75 | 0.67 |
| Caustic Type | 50% NaOH | 50% NaOH | 50% NaOH |
| Caustic Added (kg) | 8.71 | 8.44 | 17.15 |
| Final pH | 2.90 | 3.10 | 3.00 |
| Final PLS Volume (L) | 149.31 | 132.30 | 281.61 |
| Filter Cake Wet Mass (kg) | 33.75 | 36.02 | 69.76 |
| Filter Cake Dry Mass (kg) | 10.38 | 10.06 | 20.44 |
| Acid Consumption (g acid/g ore) | 1.31 | 1.16 | 1.24 |

Analytical testing was performed on the feed, concentrate, and tailings of the comprehensive leaching process. These samples were analyzed using ICP-MS and ICP-OES methods to determine the REE concentrations and major ion concentrations, respectively. Tables 10A and 10B show the results of the analytical tests as well as the mass balance for both leaching batches.

TABLE 10A

Royal Scot Acid Leaching Assay and Mass Balance (Batch 1).

| | Analyte | | | | |
|---|---|---|---|---|---|
| Major Ions | Sludge Assay mg/kg | Sludge Mass g | PLS Feed mg/L | PLS Mass g | Recovery % |
| Al | 83,066.8 | 1034.4 | 2785.7 | 415.9 | 40% |
| Ca | 13,986.9 | 174.2 | 734.7 | 109.7 | 63% |
| Co | 697.2 | 8.7 | 21.1 | 3.2 | 36% |
| Fe | 124,032.3 | 1544.5 | 4.0 | 0.6 | 0% |
| Mg | 57,207.9 | 712.4 | 2342.1 | 349.7 | 49% |
| Mn | 19,445.6 | 242.1 | 707.8 | 105.7 | 44% |
| Si | 29,654.3 | 369.3 | 62.1 | 9.3 | 3% |
| SO$_4$ | 8942.0 | 111.3 | 940.0 | 140.4 | 100% |
| Cl | 39.8 | 0.5 | 4.7 | 0.7 | 100% |
| TMM | 337,072.8 | 4197.3 | 7602.1 | 1135.1 | 27% |
| | Analyte | | | | |
| Rare Earth Elements | Sludge Assay mg/kg | Sludge Mass mg | PLS Feed µg/L | PLS Mass mg | Recovery % |
| Sc | 13.1 | 163.6 | 143.3 | 21.4 | 13% |
| Y | 343.1 | 4272.2 | 14,746.1 | 2201.7 | 52% |

TABLE 10A-continued

Royal Scot Acid Leaching Assay and Mass Balance (Batch 1).

| | | | | | |
|---|---|---|---|---|---|
| La | 67.9 | 845.8 | 3100.6 | 462.9 | 55% |
| Ce | 205.6 | 2560.0 | 8849.8 | 1321.4 | 52% |
| Pr | 34.7 | 432.3 | 1490.2 | 222.5 | 51% |
| Nd | 170.2 | 2119.5 | 7429.1 | 1109.2 | 52% |
| Sm | 58.2 | 725.0 | 2427.4 | 362.4 | 50% |
| Eu | 15.2 | 189.4 | 617.6 | 92.2 | 49% |
| Gd | 86.8 | 1081.0 | 3623.2 | 541.0 | 50% |
| Tb | 13.8 | 171.7 | 555.4 | 82.9 | 48% |
| Dy | 75.0 | 933.8 | 3019.1 | 450.8 | 48% |
| Ho | 13.4 | 167.0 | 535.0 | 79.9 | 48% |
| Er | 35.2 | 438.3 | 1388.7 | 207.3 | 47% |
| Tm | 4.4 | 54.5 | 175.0 | 26.1 | 48% |
| Yb | 23.7 | 294.8 | 949.6 | 141.8 | 48% |
| Lu | 3.5 | 43.6 | 140.0 | 20.9 | 48% |
| TREE | 1163.8 | 14,492.4 | 49,190.0 | 7344.6 | 51% |
| HREE | 612.0 | 7620.5 | 25,275.4 | 3773.9 | 50% |
| LREE | 551.9 | 6872.0 | 23,914.6 | 3570.7 | 52% |

Analyte

| Major Ions | Filter Cake Assay mg/kg | Filter Cake Mass g | Mass Balance g |
|---|---|---|---|
| Al | 21,406.7 | 222.1 | 396.3 |
| Ca | 2004.2 | 20.8 | 43.7 |
| Co | 87.3 | 0.9 | 4.6 |
| Fe | 152,369.3 | 1581.2 | — |
| Mg | 6645.2 | 69.0 | 293.7 |
| Mn | 5963.3 | 61.9 | 74.6 |
| Si | 25,952.8 | 269.3 | 90.7 |
| SO4 | 1136.0 | 11.8 | — |
| Cl | 76.4 | 0.8 | — |
| TMM | 215,641.2 | 2237.8 | 903.6 |

Analyte

| Rare Earth Elements | Filter Cake Assay mg/kg | Filter Cake Mass mg | Mass Balance mg |
|---|---|---|---|
| Sc | 11.5 | 119.4 | 22.8 |
| Y | 39.3 | 408.3 | 1662.2 |
| La | 8.2 | 85.4 | 297.4 |
| Ce | 26.5 | 274.6 | 964.0 |
| Pr | 4.4 | 45.9 | 163.9 |
| Nd | 21.4 | 221.6 | 788.7 |
| Sm | 7.1 | 74.1 | 288.5 |
| Eu | 1.9 | 19.3 | 77.9 |
| Gd | 10.2 | 105.9 | 434.1 |
| Tb | 1.7 | 17.5 | 71.3 |
| Dy | 8.8 | 91.2 | 391.8 |
| Ho | 1.6 | 17.0 | 70.1 |
| Er | 4.1 | 42.7 | 188.3 |
| Tm | 0.6 | 6.0 | 22.4 |
| Yb | 3.0 | 30.9 | 122.1 |
| Lu | 0.5 | 4.8 | 17.9 |
| TREE | 150.8 | 1564.5 | 5583.4 |
| HREE | 81.3 | 843.6 | 3003.0 |
| LREE | 69.5 | 720.8 | 2580.5 |

TABLE 10B

Royal Scot Acid Leaching Assay and Mass Balance (Batch 2).

Analyte

| Major Ions | Sludge Assay mg/kg | Sludge Mass g | PLS Feed mg/L | PLS Mass g | Recovery % |
|---|---|---|---|---|---|
| Al | 83,066.8 | 1034.4 | 2848.4 | 425.3 | 41% |
| Ca | 13,986.9 | 174.2 | 777.6 | 116.1 | 67% |
| Co | 697.2 | 8.7 | 24.8 | 3.7 | 43% |
| Fe | 124,032.3 | 1544.5 | 2.6 | 0.4 | 0% |
| Mg | 57,207.9 | 712.4 | 2387.2 | 356.5 | 50% |
| Mn | 19,445.6 | 242.1 | 862.0 | 128.7 | 53% |
| Si | 29,654.3 | 369.3 | 48.2 | 7.2 | 2% |
| SO4 | 8942.0 | 111.3 | 875.0 | 130.6 | 100% |
| Cl | 39.8 | 0.5 | 4.5 | 0.7 | 100% |
| TMM | 337,072.8 | 4197.3 | 7830.6 | 1169.2 | 28% |

Analyte

| Rare Earth Elements | Sludge Assay mg/kg | Sludge Mass mg | PLS Feed ug/L | PLS Mass mg | Recovery % |
|---|---|---|---|---|---|
| Sc | 13.1 | 163.6 | 212.3 | 31.7 | 19% |
| Y | 343.1 | 4272.2 | 15,472.8 | 2310.2 | 54% |
| La | 67.9 | 845.8 | 3293.4 | 491.7 | 58% |
| Ce | 205.6 | 2560.0 | 9138.1 | 1364.4 | 53% |
| Pr | 34.7 | 432.3 | 1555.4 | 232.2 | 54% |
| Nd | 170.2 | 2119.5 | 7766.7 | 1159.7 | 55% |
| Sm | 58.2 | 725.0 | 2490.8 | 371.8 | 51% |
| Eu | 15.2 | 189.4 | 639.0 | 95.4 | 50% |
| Gd | 86.8 | 1081.0 | 3671.2 | 548.1 | 51% |
| Tb | 13.8 | 171.7 | 572.7 | 85.5 | 50% |
| Dy | 75.0 | 933.8 | 2964.6 | 442.6 | 47% |
| Ho | 13.4 | 167.0 | 540.8 | 80.8 | 48% |
| Er | 35.2 | 438.3 | 1384.5 | 206.7 | 47% |
| Tm | 4.4 | 54.5 | 173.2 | 25.9 | 47% |
| Yb | 23.7 | 294.8 | 948.2 | 141.6 | 48% |
| Lu | 3.5 | 43.6 | 134.8 | 20.1 | 46% |
| TREE | 1163.8 | 14,492.4 | 50,957.8 | 7608.5 | 52% |
| HREE | 612.0 | 7620.5 | 26,074.8 | 3893.2 | 51% |
| LREE | 551.9 | 6872.0 | 24,882.9 | 3715.3 | 54% |

Analyte

| Major Ions | Filter Cake Assay mg/kg | Filter Cake Mass g | Mass Balance g |
|---|---|---|---|
| Al | 21,145.3 | 219.4 | 389.6 |
| Ca | 1833.8 | 19.0 | 39.0 |
| Co | 124.3 | 1.3 | 3.7 |
| Fe | 110,933.2 | 1151.2 | 392.9 |
| Mg | 5895.5 | 61.2 | 294.7 |
| Mn | 7201.1 | 74.7 | 38.7 |
| Si | 24,190.7 | 251.0 | 111.0 |
| SO4 | 1369.6 | 14.2 | — |
| Cl | 91.9 | 1.0 | — |
| TMM | 172,785.3 | 1793.0 | 1269.7 |

Analyte

| Rare Earth Elements | Filter Cake Assay mg/kg | Filter Cake Mass mg | Mass Balance mg |
|---|---|---|---|
| Sc | 11.6 | 120.8 | 11.1 |
| Y | 42.1 | 437.0 | 1525.0 |
| La | 8.6 | 89.5 | 264.5 |
| Ce | 28.0 | 290.5 | 905.1 |
| Pr | 4.7 | 48.7 | 151.4 |
| Nd | 23.9 | 248.0 | 711.8 |
| Sm | 7.9 | 82.1 | 271.1 |
| Eu | 2.0 | 20.7 | 73.3 |
| Gd | 11.0 | 114.1 | 418.8 |
| Tb | 1.8 | 19.1 | 67.2 |
| Dy | 9.8 | 101.4 | 389.7 |
| Ho | 1.8 | 18.6 | 67.7 |
| Er | 4.7 | 48.6 | 182.9 |
| Tm | 0.6 | 6.3 | 22.4 |
| Yb | 3.3 | 34.4 | 118.8 |
| Lu | 0.5 | 5.2 | 18.3 |
| TREE | 162.4 | 1684.9 | 5199.0 |
| HREE | 87.2 | 905.4 | 2821.9 |
| LREE | 75.1 | 779.6 | 2377.1 |

The analytical results revealed several significant outcomes resulting from the leaching process. Both leaching batches yielded PLS with generally similar concentrations of elements. Overall, approximately 51% of the REEs were recovered into the PLS solution, while only 27% of the other major ions were recovered, indicating a significant rejection of gangue material. More noteworthy, the pH adjustment procedure resulted in the rejection of almost all of the Fe from the PLS. This is significant as Fe can interfere with the subsequent SX process. Other gangue material was also rejected from the PLS including Al (40%), Ca (65%), Mg (50%), Mn (49%), and Si (3%).

Additionally, in regard to the REEs, the individual recoveries generally decrease as the atomic number of the REE increases. Once exception to this observation is Sc, which possesses a much lower average recovery of 16%. The low recovery is not readily explained by standard thermodynamic considerations (e.g. Eh-pH diagrams) which indicate that Sc should remain in solution at pH values less than 6. Additionally, Sc is also readily leached from other feedstocks using mineral acids. As a result, the current interpretation of these results is that other constituents within the PLS were causing interference with the Sc, resulting in either precipitation at the pH value of less than 3.0 or preventing the Sc from transferring to an aqueous phase with the acid digestion.

The overall mass balance of the acid leaching process indicated a large variation between the balance and initial elemental masses of approximately 27% for the major ions and 37% for the rare earths. This discrepancy is quite large and indicative of analytical errors resulting from the sampling process or deficiencies existed in the measurement and recording procedures. Furthermore, these types of mass balance errors have been consistent throughout his research when using a saturated AMDp feedstock. Previous research using thermogravimetric analysis to explore the residual moisture in AMDp material after desiccation has indicated that some residual moisture may be left in the solid after traditional dehydration methods. Given the high moisture contents of the feedstock, even a small change in moisture values could have a significant impact on the overall mass balance of the system.

Solvent Extraction Module

Figure 16:
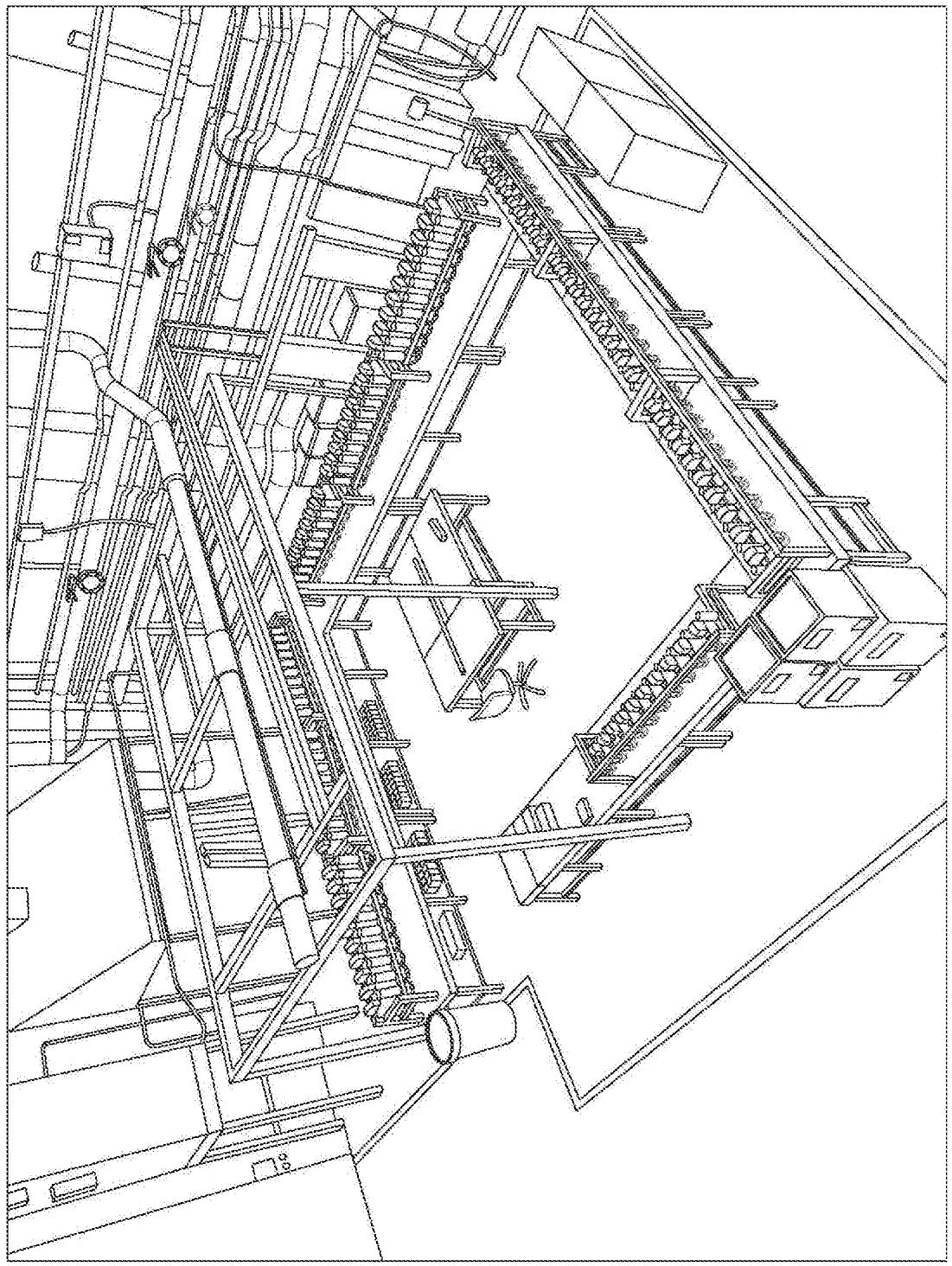
FIG. 16 shows an exemplary Solvent Extraction (SX) module useful in the processes disclosed herein.

A bench-scale solvent extraction system with 100 individual mixer-settlers was acquired for this research. FIG. 16 shows the layout of the bench-scale system. The constructed system was identical to the as-designed specifications developed in the planning phase of this research. The overall SX plant consisted of ten individual stainless steel frames, with ten mixer-settlers attached to each frame, along with the requisite pumps and chemical storage tanks needed for operation.

Multiple shakedown tests were performed on this system to empirically obtain a minimum set of operational parameters. Initially, a hydrostatic test was completed to identify any leaks in the system. Additionally, each unit's operation was evaluated during shakedown testing using multiple parameters to establish the key operating set-points required to perform the necessary process. This was accomplished by using PLS from each feedstock to test the extraction, scrubbing, stripping, and saponification circuits in a batch-wise fashion until analytical testing showed the circuit was preforming in a satisfactory manner. After the most promising parameters were identified, each feedstock was then processed using the SX bench-scale plant in a continuous fashion to develop a baseline result from which parametric testing could identify the effect of changing individual SX parameters on the overall performance of the plant.

Solvent Extraction Shakedown Testing

Throughout shakedown testing, several issues were noted that inhibited the operation of the bench-scale system. As each issue was discovered, changes were implemented to the as-designed system to alleviate the deficiencies. Each operational challenge that was observed during this testing regime is described below.

Third-Phase Crud Formation

Figure 17:
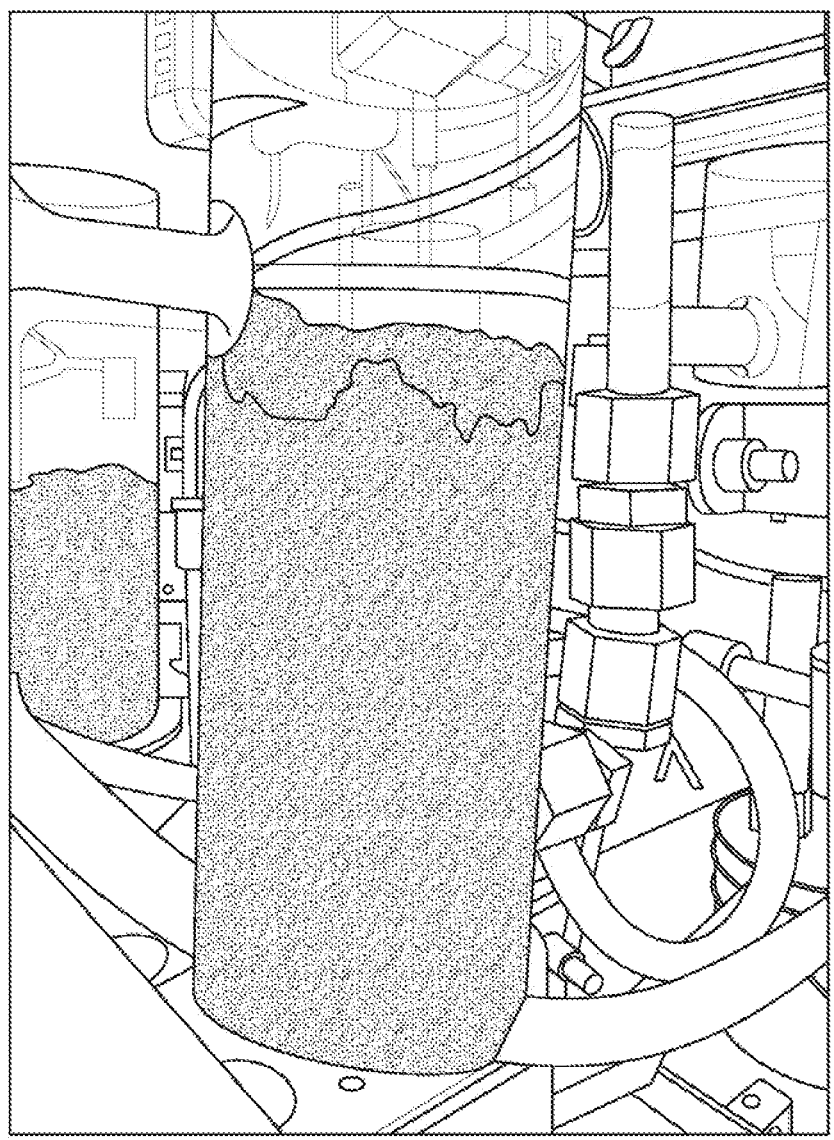
FIG. 17 shows crud formation in an extraction settler during DLM (a site used as a source of Acid Mine Drainage (AMD) treatment solids) shakedown testing.

During initial shakedown tests, two of the feedstocks (DLM and Omega) caused considerable third-phase formation as seen in FIG. 17. This third phase, also called crud, is a stable emulsion that causes significant problems in the SX circuit. The crud encountered during this testing began forming at the organic-aqueous interface and eventually occupied most of the volume in the mixer-settler.

Before a continuous SX process flow diagram is finalized, a thorough investigation of third phase formation is necessary. Issues encountered during the initial testing runs included difficulties in obtaining mass balances, organic loss to aqueous streams, and complete blockages of tubing connecting the mixer-settlers. Unfortunately, the generation of large amounts of crud renders parametric testing with these feedstocks difficult, if not impossible, to complete.

Multiple exploratory tests were conducted in an attempt to prevent the formation of crud in the mixing chamber. These tests included dilution of the PLS, use of the modifier tributyl phosphate, varying extractant concentrations, and changing the extractant organic: aqueous (O:A) ratio. It was found that crud was caused by the gradual oxidation of ferrous ion to the ferric form during solvent extraction. It was also found that addition of the oxidization agent hydrogen peroxide on a roughly 1:1 molar basis with ferrous ion concentration in PLS allowed precipitation of all iron as ferric hydroxide during PLS preparation. This eliminated crud formation during solvent extraction.

When the PLS of the three feedstocks was compared, as shown in Table 11, it was evident that the Fe and Ca content in the Royal Scot PLS was considerably lower than in the other two feedstocks. The current hypothesis is that Fe or Ca will reach a limiting organic concentration (LOC) where the metal ions will start to precipitate and create a nucleus that allows for crud formation. As a result, the Royal Scott PLS was used to demonstrate this technology while DLM and Omega feedstocks were subjected to further leaching tests to remove the excess gangue metals.

TABLE 11

Comparison of PLS from Three Feedstocks.

| Feedstock | DLM | Omega | Royal Scot |
|---|---|---|---|
| End pH | 3.05 | 2.04 | 3.01 |
| Major Ions (mg/L) | | | |
| Al | 9480.84 | 3133.43 | 2982.86 |
| Ca | 1401.59 | 1372.56 | 761.02 |
| Co | 102.98 | 18.60 | 22.43 |
| Fe | 1936.00 | 71.43 | 3.18 |
| Mg | 6845.59 | 455.24 | 2426.65 |
| Mn | 3595.23 | 105.58 | 777.82 |
| Na | 47.55 | 12,699.48 | 11,493.42 |
| Si | 1274.31 | 59.31 | 53.64 |
| SO$_4$ | 497.79 | 25.39 | 881.37 |
| Cl | 17.92 | 5.65 | 4.67 |
| TMM | 25,199.80 | 17,946.67 | 19,407.05 |
| Rare Earth Elements (µg/L) | | | |
| Sc | 2118.11 | 962.45 | <0.037 |
| Y | 83,061.09 | 7151.53 | 12,504.72 |

TABLE 11-continued

Comparison of PLS from Three Feedstocks.

| Feedstock | DLM | Omega | Royal Scot |
|---|---|---|---|
| La | 23,908.46 | 1477.79 | 2646.17 |
| Ce | 64,313.63 | 4906.65 | 7519.84 |
| Pr | 8198.92 | 782.96 | 1248.48 |
| Nd | 34,781.11 | 3688.07 | 6330.98 |
| Sm | 8890.67 | 1133.53 | 2087.38 |
| Eu | 2325.90 | 302.10 | 529.65 |
| Gd | 13,509.25 | 1820.15 | 3011.83 |
| Tb | 2239.51 | 339.07 | 450.90 |
| Dy | 13,712.70 | 2016.94 | 2493.89 |
| Ho | 2713.13 | 381.42 | 444.83 |
| Er | 7453.57 | 1063.41 | 1162.19 |
| Tm | 965.45 | 144.99 | 136.08 |
| Yb | 5506.71 | 824.88 | 801.98 |
| Lu | 793.23 | 125.05 | 104.29 |
| Th | 163.78 | 11.28 | <0.007 |
| U | 815.79 | 257.11 | 198.47 |
| TREE | 274,491.42 | 27,120.98 | 41,473.23 |
| HREE | 132,072.74 | 14,829.88 | 21,110.72 |
| LREE | 142,418.68 | 12,291.10 | 20,362.51 |
| CREE | 136,120.30 | 13,497.71 | 22,310.15 |

Maintaining Mixing Organic: Aqueous (O:A) Ratio

Another operational difficulty encountered in the operation of the SX plant involved maintaining a consistent O:A ratio in the mixing chamber. This issue was not observed in the SX unit operations that had an advance ratio of 1:1. Conversely, unit operations that required high or low O:A ratios often presented challenges in regard to maintaining a consistent mixing O:A ratio. Two potential causes were identified.

First, overtime, the Tygon tubing used to recycle the aqueous phase in the settler back to the mixer can become hardened and prevent operation of the roller-clamp that restricts flow in the recycle line. The second issue is inherent to the roller clamp design. Often the roller-clamps could not provide the fine adjustment required to properly maintain the preferred mixing O:A range of 1.5:1 to 1:1.5 as recommended by the SX plant manufacturer. To alleviate this issue, in-line valves were installed into the recycle lines of the SX processes that require advance ratios greater than the recommended mixing range.

Organic Loss During Saponification

During initial shakedown testing, four unit operations were utilized (extraction, scrubbing, stripping, and saponification). During these tests, a large fraction of the organic phase was reporting to the saponification raffinate and not recycling back to the organic tank. Further research indicated that an additional stage was needed to separate the organic and aqueous phases. As a result, the Megon Rare Earth Circuit was referenced and an additional circuit (acid wash) was implemented directly after the saponification stage. This additional stage greatly improved the recovery of organic to the organic recycle tank.

While the addition of the acid wash circuit improved the recovery of the organic to a level that was acceptable for the operation of the bench-scale plant, further modification may be necessary as the scale of the plant increases. Organic loss constitutes a significant cost for industrial-scale SX operations. As a result, the addition of a coalescence device or other chemical modifier should be evaluated as the technological readiness level (TRL) of this process increases.

SX Procedure and Results

In order to develop a baseline test prior to parametric testing, a batch of PLS was processed in the SX system with an initial set of operating parameters. Table 12 shows the parameters used in establishing this baseline test. The extractant, Elixore 205, is a highly-refined aliphatic diluent, similar to kerosene, with a high flash point, low viscosity, and ultra-low aromatic content. This diluent was chosen for three reasons. First, standard kerosene was used in some initial shakedown testing; however, a strong odor was emitted by the kerosene that permeated the enclosed area. Second, the use of a diluent specifically designed for use in solvent extraction was necessary to minimize further scale-up issues as the TRL of the project increased. Third, previous phase separation tests showed a slight advantage in phase separation times with Elixore 205 versus other total diluents.

TABLE 12

Solvent Extraction Circuit Parameters for Baseline Testing.

| Parameter | Value |
|---|---|
| Extraction | |
| Organic | Elixore 205 |
| Extractant | di-(2-ethylhexyl)phosphoric acid |
| Extractant concentration (M) | 0.5 |
| Modifier | tri-n-butyl phosphate |
| Modifier concentration (v/v) | 20% |
| Advance organic:aqueous | 1:1 |
| Mixer speed (rpm) | 856 |
| Organic pump (mL/min) | 75 |
| Aqueous pump (mL/min) | 75 |
| Scrubbing | |
| Reagent | $H_2O$ |
| Concentration (v/v) | 100% |
| Organic:aqueous ratio | 1:1 |
| Mixer speed (rpm) | 856 |
| Scrub pump (mL/min) | 75 |
| Stripping | |
| Reagent | HCl |
| Concentration (M) | 6 |
| Organic:aqueous ratio | 10:1 |
| Mixer speed (rpm) | 856 |
| Strip pump (mL/min) | 7.5 |
| Saponification | |
| Reagent | $NH_4OH$ |
| Concentration | 2 |
| Organic:aqueous ratio | 5:1 |
| Mixer speed (rpm) | 856 |
| Sap pump (mL/min) | 15 |
| Acid Wash | |
| Reagent | $HNO_3$ |
| Concentration (M) | 0.75 |
| Organic:aqueous ratio | 1:1 |
| Mixer speed (rpm) | 856 |
| Acid wash pump (mL/min) | 75 |

Next, di-(2-ethylhexyl)phosphoric acid (D2EHPA) was chosen as the primary extractant based on the wide industrial acceptance. Initial shakedown testing indicated third-phase crud formation occurred in the extraction, scrubbing, and stripping circuits. In order to address this issue, tributyl phosphate (TBP) was added as a modifier.

The extraction and scrubbing advance O:A ratios were both set at 1:1 to provide equal transfer of the REEs and gangue metals to the organic phase and scrubbing raffinate, respectively. For the stripping circuit, an O:A ratio of 10:1 was utilized to concentrate the REEs into the stripped raffinate, while minimizing the volume of the raffinate. This was advantageous for the next process, as smaller volumes required less material handling. Finally, the saponification and acid wash O:A ratios were of 5:1 and 1:1, respectively, based on previous shakedown testing results. Mixer speeds were 856 rpm for every mixer in the SX plant. Lastly, every SX process was conducted using five mixer-settlers, with the exception of the acid-wash stage where only three mixer-settlers were utilized. This quantity is in excess of the number of stages identified in exploratory testing; however, using additional stages reduces the effects of other system inefficiencies that may occur during testing. During parametric testing unit-by-unit sampling will later identify the critical number of stages required.

The plant was operated over a period of eight days with a total operating time of 58 hours. This equates to roughly 7.2 operating hours per day or 90% operational availability. During this time, 281 liters of the PLS feedstock was processed through the system and concentrated into 28.3 liters of stripped raffinate. Additionally, the organic phase was constantly recycled back to the extraction stage. This demonstrated the ability of the process to run continuously, while showing that no metal ions remained attached to the extractant; therefore, reducing the extraction rate in the first circuit. An aqueous sample was obtained at the end of each operating day to evaluate the performance of the system.

Figure 18:
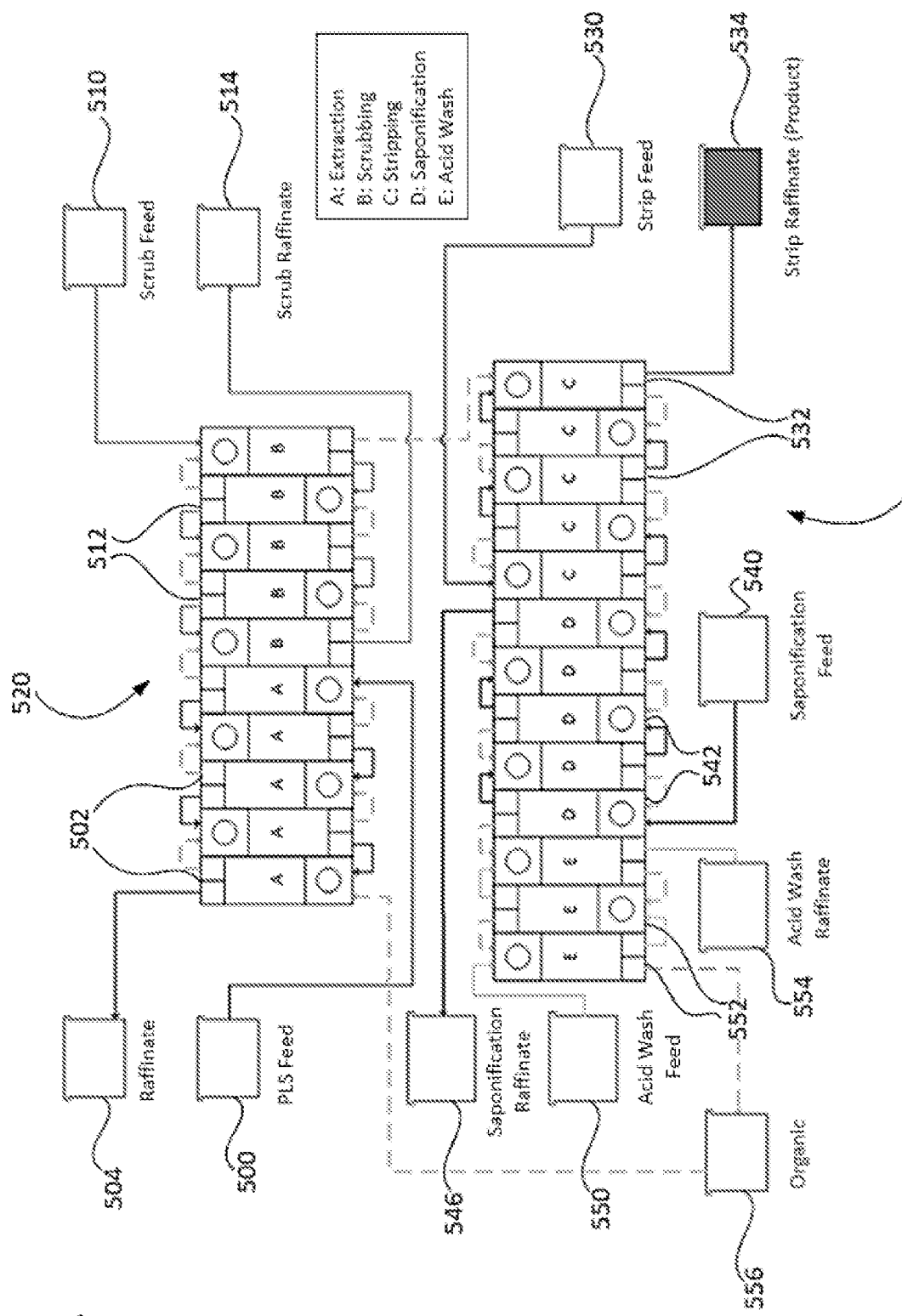
FIG. 18 is a representative flow diagram for a solvent extraction module disclosed herein.

FIG. 18 shows the process flow diagram of the ALSX system at the time of testing. As previously discussed, the aqueous and organic phases were circulated in a counter-current fashion. Additionally, the organic phase advanced through each phase and was recycled for reuse at the end of the processing stream, after the saponification and acid wash stages.

In the extraction stage, the PLS and organic phases mix and settle, transferring REEs into the organic phase. Next, scrubbing removes unwanted elements from the organic while leaving the REEs in the organic phase using water or a mild acid. In the stripping stage, 6M HCl was used to remove the REEs from the organic phase. In this stage a high advance ratio was used to concentrate the REEs into the aqueous strip raffinate. Furthermore, the strip raffinate contained the valuable product from this operation that was used in the next plant module to recover the REEs. The last two stages, saponification and acid wash were used to regenerate the extractant, cleaning the cation exchange sites on each D2EHPA molecule.

Tables 13A and 13B below show the results of the daily analytical testing preformed on the PLS raffinate. While there was not a major change in the concentrations of the gangue material over the length of the test, it did take several days for the system to achieve steady state in regard to consistent extraction of the REEs. During the first three days, several of the LREEs were not fully extracted. This could be a function of the pH within the mixing cell not reaching equilibrium. Conversely, the HREEs approached steady-state extraction at day 2.

TABLE 13A

Extraction Stage Raffinate, Major Metals.
(Site: Royal Scot, units mg/L)

| | Day | | | |
|---|---|---|---|---|
| | 1 | 2 | 3 | 4 |
| Al | 2646.6 | 3377.2 | 3258.0 | 3264.2 |
| Ca | 858.5 | 847.2 | 783.5 | 850.9 |
| Co | 25.6 | 25.8 | 25.2 | 25.8 |
| Fe | 8.7 | 4.5 | 2.6 | 3.6 |
| Mg | 2639.8 | 2748.0 | 2707.7 | 2767.7 |
| Mn | 854.0 | 876.1 | 847.1 | 880.3 |
| Na | 12,474.2 | 11,879.7 | 11,011.9 | 11,321.0 |
| Si | 63.7 | 63.6 | 61.2 | 62.4 |
| Total Major Metals | 19,571.0 | 19,822.1 | 18,697.2 | 19,176.0 |

| | Day | | | |
|---|---|---|---|---|
| | 5 | 6 | 7 | 8 |
| Al | 3408.3 | 3381.4 | 3313.2 | 3272.0 |
| Ca | 753.0 | 737.6 | 674.1 | 657.1 |
| Co | 25.9 | 25.8 | 25.5 | 26.1 |
| Fe | 1.2 | 1.0 | 0.9 | 0.8 |
| Mg | 2790.3 | 2773.8 | 2732.8 | 2792.9 |
| Mn | 883.8 | 877.0 | 855.0 | 859.0 |
| Na | 13,388.0 | 12,206.8 | 11,957.5 | 11,684.6 |
| Si | 62.5 | 62.2 | 61.6 | 63.2 |
| Total Major Metals | 21,313.0 | 20,065.5 | 19,620.6 | 19,355.6 |

TABLE 13B

Extraction Stage Raffinate, REEs.
(Site: royal Scot, units mg/L)

| | Day | | | | | | | |
|---|---|---|---|---|---|---|---|---|
| | 1 | 2 | 3 | 4 | 5 | 6 | 7 | 8 |
| Sc | <0.037 | <0.037 | <0.037 | <0.037 | 0.3 | 0.6 | 0.5 | <0.037 |
| Y | 1435.3 | 529.4 | 221.3 | 66.3 | 77.6 | 21.4 | 41.7 | 43.5 |
| La | 3950.7 | 1135.6 | 38.8 | 17.0 | 63.6 | 32.1 | 31.5 | 24.5 |
| Ce | 7594.7 | 836.6 | 61.2 | 33.8 | 87.0 | 26.5 | 57.2 | 42.1 |
| Pr | 939.8 | 82.6 | 9.0 | 4.4 | 11.9 | 3.1 | 7.4 | 4.7 |
| Nd | 3884.6 | 323.5 | 46.3 | 20.6 | 54.6 | 13.3 | 33.9 | 20.4 |
| Sm | 290.9 | 55.7 | 14.5 | 5.9 | 12.7 | 2.0 | 5.5 | 2.4 |
| Eu | 53.3 | 15.4 | 4.0 | 1.7 | 3.2 | 0.6 | 1.2 | 0.5 |
| Gd | 318.4 | 89.9 | 23.6 | 9.5 | 16.9 | 2.8 | 5.6 | 2.6 |
| Tb | 40.6 | 16.2 | 4.8 | 1.9 | 2.5 | 0.5 | 0.9 | 0.5 |
| Dy | 242.2 | 101.2 | 34.6 | 12.2 | 15.1 | 3.3 | 6.1 | 5.1 |
| Ho | 47.7 | 20.0 | 7.5 | 2.4 | 2.8 | 0.7 | 1.4 | 1.3 |
| Er | 136.4 | 51.9 | 24.0 | 7.1 | 8.1 | 2.2 | 4.3 | 5.1 |

TABLE 13B-continued

Extraction Stage Raffinate, REEs.
(Site: royal Scot, units mg/L)

| | Day | | | | | | | |
|---|---|---|---|---|---|---|---|---|
| | 1 | 2 | 3 | 4 | 5 | 6 | 7 | 8 |
| Tm | 16.7 | 5.0 | 3.0 | 1.0 | 1.0 | 0.4 | 0.6 | 0.9 |
| Yb | 89.1 | 19.6 | 14.1 | 5.3 | 3.3 | 1.2 | 2.2 | 5.6 |
| Lu | 11.1 | 2.2 | 1.7 | 0.8 | 0.4 | 0.2 | 0.4 | 0.8 |
| Total REEs | 19,051.7 | 3284.7 | 508.6 | 189.8 | 360.6 | 110.4 | 199.9 | 160.0 |

Additionally, the daily analytical testing results for the scrubbing raffinate are shown in Tables 14A and 14B below. This data indicated that there was some variation in the removal of chloride and sodium ions from the extractant using water as a scrubbing medium. Additionally, the scrubbing stage did not reach a steady-state condition until after day 4.

TABLE 14A

Scrubbing Stage Raffinate, Major Metals.
(Site: Royal Scot, units mg/L)

| | Day | | | | | | |
|---|---|---|---|---|---|---|---|
| | 1 | 2 | 3 | 4 | 5 | 6 | 7 |
| Al | 9.4 | 1.1 | 17.2 | 4.0 | 29.1 | 0.8 | 0.6 |
| Ca | 19.2 | 0.4 | 43.3 | 14.0 | 53.7 | 5.8 | 4.6 |
| Co | 0.0 | 0.0 | 0.1 | 0.0 | 0.3 | 0.0 | 0.0 |
| Fe | 0.6 | 0.0 | 0.3 | 0.1 | 0.1 | 0.1 | <0.022 |
| Mg | 7.5 | 0.1 | 16.0 | 6.7 | 37.2 | 7.5 | 8.1 |
| Mn | 6.3 | 0.0 | 13.4 | 13.7 | 61.4 | 7.3 | 5.5 |
| Na | 19.8 | 0.4 | 58.9 | 17.3 | 137.9 | 25.7 | 27.2 |
| Si | 3.0 | 0.5 | 3.0 | 2.3 | 2.8 | 2.3 | 2.3 |
| Total Major Metals | 65.9 | 2.4 | 152.3 | 58.0 | 322.3 | 49.5 | 48.3 |

TABLE 14B

Scrubbing Stage Raffinate, REEs.
(Site: Royal Scot, units mg/L)

| | Day | | | | | | |
|---|---|---|---|---|---|---|---|
| | 1 | 2 | 3 | 4 | 5 | 6 | 7 |
| Sc | <0.037 | <0.037 | <0.037 | <0.037 | <0.037 | <0.037 | <0.037 |
| Y | 344.3 | 246.2 | 62.4 | 92.2 | 96.5 | 165.3 | 9.4 |
| La | 776.6 | 37.7 | 470.5 | 19.9 | 30.6 | 36.4 | 21.1 |
| Ce | 1098.4 | 104.1 | 429.7 | 47.9 | 50.9 | 107.0 | 62.2 |
| Pr | 125.7 | 17.5 | 49.1 | 7.7 | 7.5 | 17.9 | 10.2 |
| Nd | 501.5 | 91.2 | 203.1 | 39.0 | 37.1 | 91.3 | 51.9 |
| Sm | 42.8 | 30.3 | 23.6 | 13.0 | 11.4 | 30.4 | 15.0 |
| Eu | 9.6 | 8.0 | 4.7 | 3.4 | 3.4 | 7.9 | 3.5 |
| Gd | 58.0 | 47.3 | 24.6 | 19.7 | 19.8 | 44.6 | 18.2 |
| Tb | 10.6 | 8.4 | 2.5 | 3.1 | 3.5 | 6.8 | 1.8 |
| Dy | 66.2 | 50.1 | 13.0 | 18.1 | 21.5 | 37.3 | 6.1 |
| Ho | 12.5 | 9.2 | 2.3 | 3.3 | 3.9 | 6.6 | 0.7 |
| Er | 34.1 | 23.6 | 6.2 | 9.0 | 9.2 | 14.6 | 0.8 |
| Tm | 3.8 | 2.4 | 0.7 | 1.1 | 0.8 | 1.2 | 0.0 |

TABLE 14B-continued

Scrubbing Stage Raffinate, REEs.
(Site: Royal Scot, units mg/L)

| | Day | | | | | | |
|---|---|---|---|---|---|---|---|
| | 1 | 2 | 3 | 4 | 5 | 6 | 7 |
| Yb | 19.9 | 8.3 | 2.9 | 5.0 | 1.8 | 3.1 | 0.3 |
| Lu | 1.9 | 0.8 | 0.2 | 0.7 | 0.2 | 0.4 | 0.1 |
| Total REEs | 3105.9 | 685.0 | 1295.7 | 283.1 | 297.9 | 570.7 | 201.3 |

Precipitation Module

Figure 19:
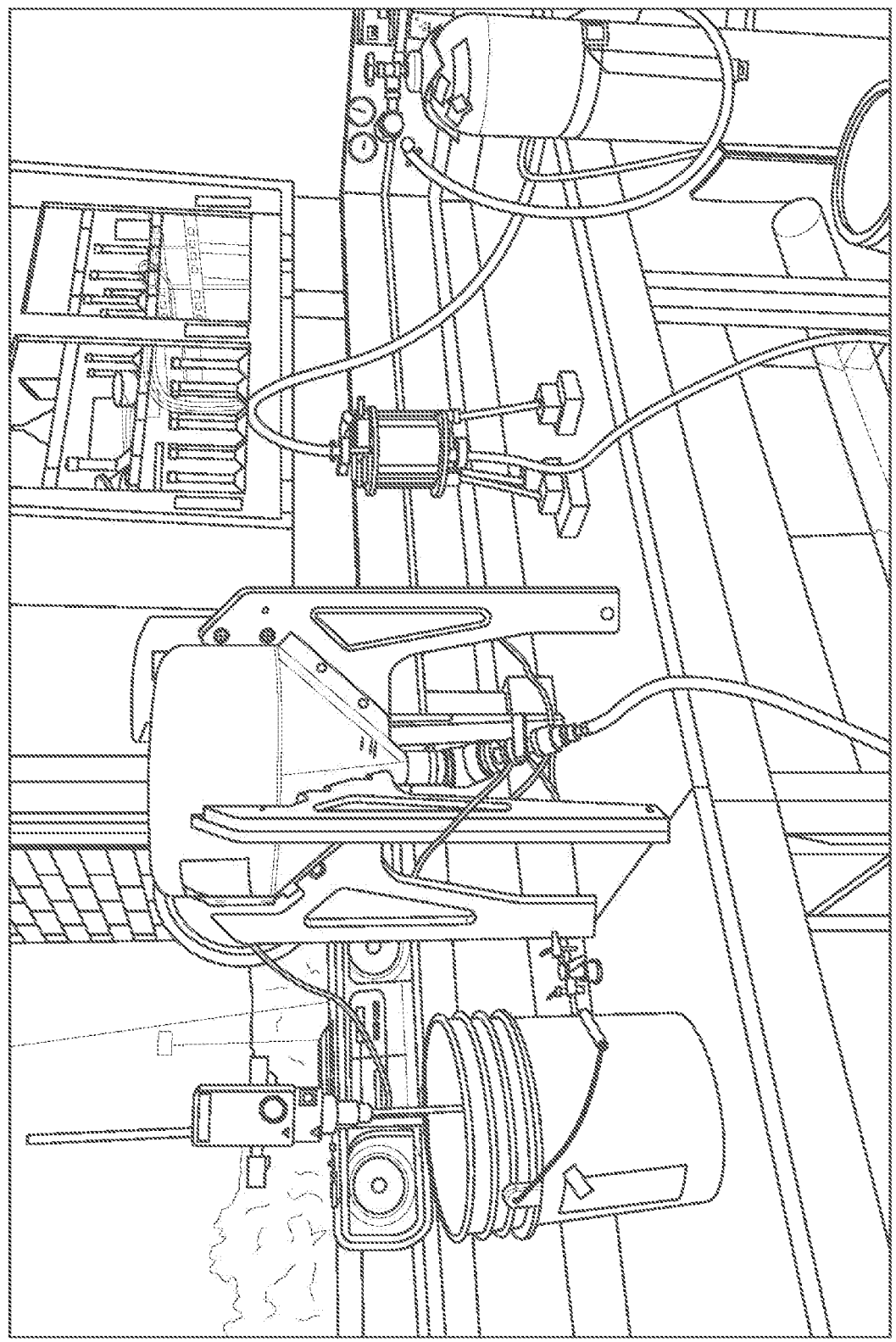
FIG. 19 shows an exemplary precipitation module useful in the processes disclosed herein that can be used to recover Rare Earth Elements (REEs) from stripped raffinate.

The precipitation module used to recover the REEs from the stripped raffinate is shown in FIG. 19; it is of a much smaller scale than the other ALSX plant equipment. The precipitation module consisted of an overhead mixer used to agitate the stripped raffinate as reagents are added to the solution. After precipitation, the striped raffinate is placed in a ten-gallon conical bottom tank allowing the solids to settle at the bottom overnight. The use of the conical bottom tank minimized the volume of liquid that needed to be filtered. The last component of the precipitation module was a small pressure filter that separated the solid and liquid components of the decanted stripped raffinate. Not shown are the drying oven and furnace used to dry and calcine the rare earth oxalates that precipitated from solution. This equipment was also used for the acid and water washing procedures described below.

Precipitation Procedure

Figure 20:
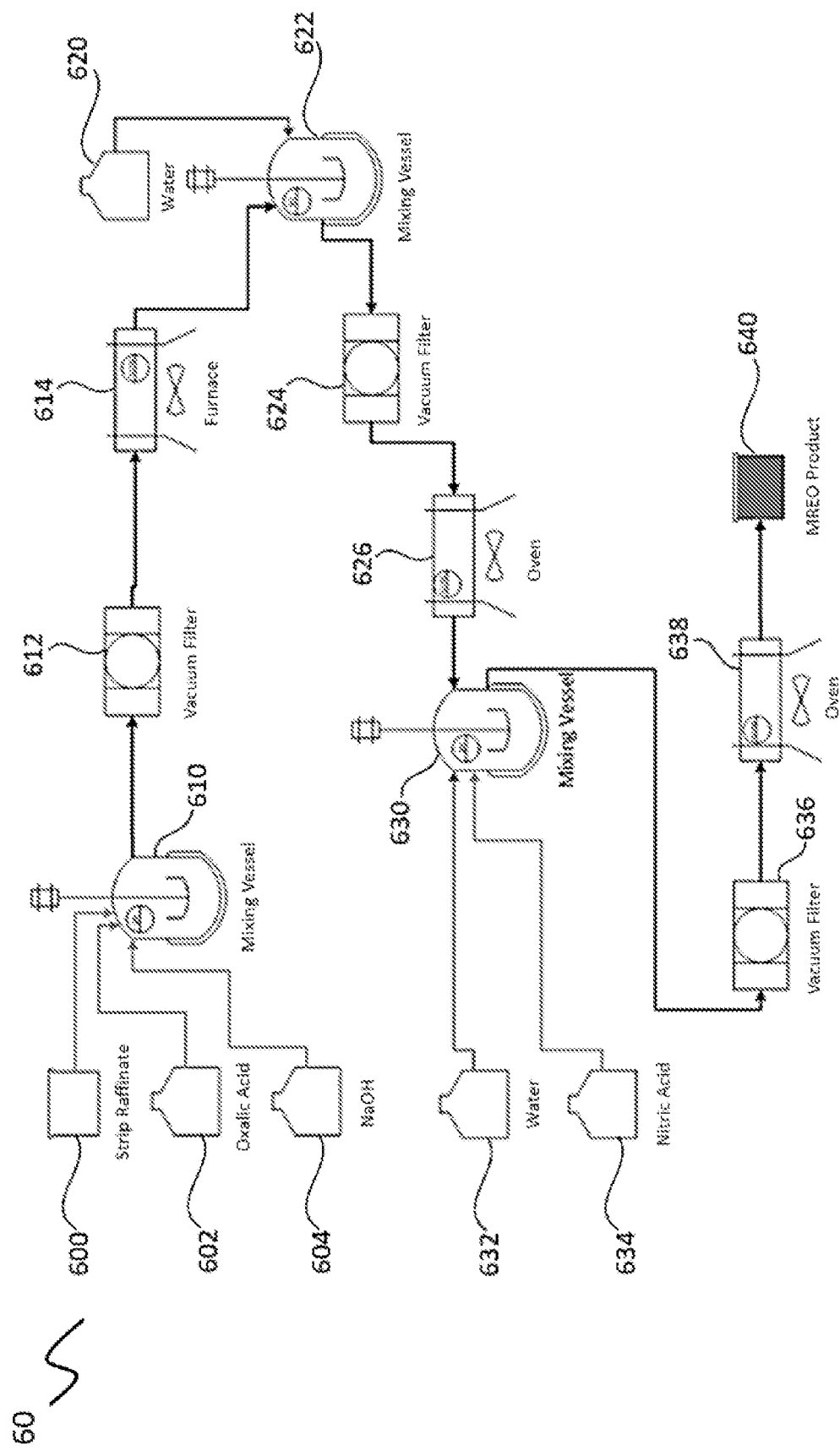
FIG. 20 shows is a diagram of a representative precipitation process useful in the methods and processes disclosed herein.

After all of the PLS was processed through the solvent extraction plant, the stripping raffinate was collected for processing in the precipitation module. FIG. 20 shows the process flow diagram that resulted in the separation of a 62% mixed rare earth oxide product. After acquiring a headsplit of the stripped raffinate, 2.5 g/L of oxalic acid was added to the stripped raffinate, representing approximately 5 times the stochiometric ratio of oxalic acid to REEs. Next, the pH of the stripped solution was raised with 50% NaOH to a value of 1.5. The pH adjustment was performed in multiple steps, ensuring the temperature of the solution did not exceed 80° Celsius.

Once the target pH was achieved, the solution was allowed to decant overnight until three quarters of the supernatant was left in the decanting vessel and the remaining quarter was separated using a pressure filter with Whatman Grade 40 ashless filter paper with a nominal particle retention of 8 μm. Next, the precipitate was dried in a Yamato DX602C oven at 105° Celsius. A sample was taken from the precipitate and assayed to determine the REE content, as shown in Table 15.

TABLE 15

Assay and Mass Balance of Initial Precipitation Steps.

| | Analyte | | | |
|---|---|---|---|---|
| | Stripped Raffinate Head-Split | Stripped Raffinate Mass | Precipitated Raffinate Filtrate | Precipitated Filtrate Mass |
| Volume (L) | 28.32 | | 42.28 | |
| Mass (g) | 31.15 | | 47.35 | |
| Major Ions | mg/L | g | mg/L | g |
| Al | 2626.16 | 74.37 | 1654.35 | 69.94 |
| Ca | 897.55 | 25.42 | 17.41 | 0.74 |
| Co | 0.04 | 0.00 | 0.01 | 0.00 |
| Fe | 80.54 | 2.28 | 68.98 | 2.92 |
| Mg | 5.61 | 0.16 | 5.44 | 0.23 |
| Mn | 87.25 | 2.47 | 57.63 | 2.44 |
| Si | 7.75 | 0.22 | 5.89 | 0.25 |
| $SO_4$ | 8.76 | 0.25 | 0.33 | 0.01 |
| TMM | 3713.65 | 105.16 | 1810.04 | 76.52 |
| Rare Earth Elements | μg/L | g | μg/L | g |
| Sc | 0.02 | 0.00 | 0.44 | 0.00 |
| Y | 136,881.10 | 3.88 | 626.05 | 0.03 |
| La | 21,449.10 | 0.61 | 43.67 | 0.00 |
| Ce | 67,127.02 | 1.90 | 94.28 | 0.00 |
| Pr | 11,125.33 | 0.32 | 11.66 | 0.00 |
| Nd | 55,454.65 | 1.57 | 45.22 | 0.00 |
| Sm | 18,654.50 | 0.53 | 10.98 | 0.00 |
| Eu | 4953.41 | 0.14 | 2.76 | 0.00 |
| Gd | 28,813.05 | 0.82 | 18.64 | 0.00 |
| Tb | 4538.49 | 0.13 | 4.58 | 0.00 |
| Dy | 25,609.26 | 0.73 | 43.73 | 0.00 |
| Ho | 4840.89 | 0.14 | 15.10 | 0.00 |
| Er | 12,794.07 | 0.36 | 71.47 | 0.00 |
| Tm | 1677.06 | 0.05 | 14.55 | 0.00 |
| Yb | 9270.63 | 0.26 | 104.95 | 0.00 |
| Lu | 1307.32 | 0.04 | 19.53 | 0.00 |
| TREE | 404,495.90 | 11.46 | 1127.60 | 0.05 |
| Actinides | μg/L | g | μg/L | g |
| Th | 9.52 | 0.00 | 5.52 | 0.00 |
| U | 170.48 | 0.00 | 143.54 | 0.01 |

| | Analyte | | |
|---|---|---|---|
| | Precipitated Oxalate Product | Precipitated Oxalate Mass | Mass Balance |
| Volume (L) | | | |
| Mass (g) | 190.27 | | |
| Major Ions | mg/kg | g | g |
| Al | 1122.60 | 0.21 | 4.21 |
| Ca | 138,002.05 | 26.26 | (1.58) |
| Co | — | — | 0.00 |
| Fe | — | — | (0.64) |
| Mg | 31.26 | 0.01 | (0.08 |
| Mn | 1388.97 | 0.26 | (0.23 |
| Si | 211.41 | 0.04 | (0.07) |
| $SO_4$ | 450.09 | 0.09 | 0.15 |
| TMM | 141,206.38 | 26.87 | 1.77 |

TABLE 15-continued

Assay and Mass Balance of Initial Precipitation Steps.

| Rare Earth Elements | mg/kg | g | g |
|---|---|---|---|
| Sc | — | — | — |
| Y | 20,068.41 | 3.82 | 0.03 |
| La | 3121.71 | 0.59 | 0.01 |
| Ce | 9686.69 | 1.84 | 0.05 |
| Pr | 1620.39 | 0.31 | 0.01 |
| Nd | 8284.33 | 1.58 | (0.01) |
| Sm | 2658.68 | 0.51 | 0.02 |
| Eu | 711.38 | 0.14 | 0.00 |
| Gd | 4013.41 | 0.76 | 0.05 |
| Tb | 621.93 | 0.12 | 0.01 |
| Dy | 3533.09 | 0.67 | 0.05 |
| Ho | 648.16 | 0.12 | 0.01 |
| Er | 1746.58 | 0.33 | 0.03 |
| Tm | 219.42 | 0.04 | 0.01 |
| Yb | 1249.35 | 0.24 | 0.02 |
| Lu | 170.32 | 0.03 | 0.00 |
| TREE | 58,353.83 | 11.10 | 0.30 |
| Actinides | mg/kg | g | g |
| Th | 0.72 | 0.00 | (0.00) |
| U | 0.75 | 0.00 | (0.00) |

The oxalic acid precipitation process resulted in 190 g of precipitate containing 11.1 g of REEs. The represents a TREE recovery of 97%. The majority of the measured major analytes were rejected during the precipitation with the exception of Ca, which entirely co-precipitated with the REEs.

The REE oxalate precipitate was then calcined in a Lindberg muffle furnace at a temperature of 750° Celsius for a duration of four hours. A sample of this material indicated the calcination procedure resulted in almost doubling of the concentration of the REO product from 5.8% to 11% as shown in Table 16. Additionally, 22% of the dried product consisted of Ca. In order to further concentrate the REO product a series water and acid washing steps were implements.

TABLE 16

Assay of Precipitation Cleaning Process.

| | Analyte | | | |
|---|---|---|---|---|
| | Calcined Product Assay | Calcined Product Mass | Washed Product Assay | Washed Product Mass |
| Mass (g) | 94.36 | | 68.5 | |
| Major Ions | mg/lg | g | mg/kg | g |
| Al | 2720 | 0.26 | 2957 | 0.20 |
| Ca | 222,201 | 20.97 | 277,119 | 18.98 |
| Co | 1 | 0.00 | 2 | 0.00 |
| Fe | 116 | 0.01 | 74 | 0.01 |
| Mg | 232 | 0.02 | 74 | 0.01 |
| Mn | 2433 | 0.23 | 2734 | 0.19 |
| Si | 735 | 0.07 | 269 | 0.02 |
| $SO_4$ | 188 | 0.02 | 4 | 0.00 |
| TMM | 7521 | 0.71 | 4 | 0.00 |
| Rare Earth Elements | mg/kg | g | mg/kg | g |
| Sc | — | — | — | — |
| Y | 37,128 | 3.50 | 41,428 | 2.84 |
| La | 5712 | 0.54 | 6652 | 0.46 |
| Ce | 17,251 | 1.63 | 18,798 | 1.29 |

TABLE 16-continued

Assay of Precipitation Cleaning Process.

| | | | | |
|---|---|---|---|---|
| Pr | 2916 | 0.28 | 3442 | 0.24 |
| Nd | 15,021 | 1.42 | 17,749 | 1.22 |
| Sm | 5041 | 0.48 | 5805 | 0.40 |
| Eu | 1293 | 0.12 | 1562 | 0.11 |
| Gd | 7416 | 0.70 | 9094 | 0.62 |
| Tb | 1149 | 0.11 | 1429 | 0.10 |
| Dy | 6546 | 0.62 | 8035 | 0.55 |
| Ho | 1218 | 0.11 | 1559 | 0.11 |
| Er | 3254 | 0.31 | 4064 | 0.28 |
| Tm | 412 | 0.04 | 539 | 0.04 |
| Yb | 2301 | 0.22 | 2890 | 0.20 |
| Lu | 317 | 0.03 | 410 | 0.03 |
| TREE | 106,975 | 10.09 | 123,455 | 8.46 |
| Grade | 11% | | 12% | |

| Actinides | mg/kg | g | mg/kg | g |
|---|---|---|---|---|
| Th | 8 | 0.00 | 8 | 0.00 |
| U | 6 | 0.00 | 6 | 0.00 |

| | Analyte | | |
|---|---|---|---|
| | Acid Wash Product Assay | Acid Wash Product Mass | Acid Wash Oxide Basis |
| Mass (g) | 13.8 | | |

| Major Ions | mg/kg | g | mg/kg |
|---|---|---|---|
| Al | 12,216 | 0.17 | 19,456 |
| Ca | 76,540 | 1.06 | 91,848 |
| Co | 3 | 0.00 | 3 |
| Fe | 748 | 0.01 | 961 |
| Mg | 85 | 0.00 | 113 |
| Mn | 13,947 | 0.19 | 15,975 |
| Si | 673 | 0.01 | 865 |
| $SO_4$ | 183 | 0.00 | 183 |
| TMM | 20 | 0.00 | 20 |

| Rare Earth Elements | mg/kg | g | mg/kg |
|---|---|---|---|
| Sc | — | — | — |
| Y | 173,858 | 2.40 | 198,805 |
| La | 24,773 | 0.34 | 29,053 |
| Ce | 95,650 | 1.32 | 117,494 |
| Pr | 14,606 | 0.20 | 17,646 |
| Nd | 74,811 | 1.03 | 87,259 |
| Sm | 25,532 | 0.35 | 29,607 |
| Eu | 6595 | 0.09 | 7637 |
| Gd | 36,883 | 0.51 | 42,512 |
| Tb | 6019 | 0.08 | 7079 |
| Dy | 33,201 | 0.46 | 38,104 |
| Ho | 6099 | 0.08 | 6986 |
| Er | 16,236 | 0.22 | 18,566 |
| Tm | 2153 | 0.03 | 2458 |
| Yb | 11,867 | 0.16 | 13,512 |
| Lu | 1652 | 0.02 | 1879 |
| TREE | 529,933 | 7.31 | 618,598 |
| Grade | 53% | | 62% |

| Actinides | mg/kg | g | mg/kg |
|---|---|---|---|
| Th | 53 | 0.00 | 57 |
| U | 40 | 0.00 | 44 |

The washing procedure consisted of multiple washing cycles. After decanting and filtering, the REO product was agitated in 1 L of deionized water for thirty minutes. This procedure was repeated until the conductivity of the supernatant was below 50 μS/cm. In all, ten washing cycles were completed. Following washing, analysis of a sample of the REO product indicated that only small portions of the gangue material Ca (2 g) and Cl (0.7 g) were removed. As a result, a more intense washing procedure was implemented, where the pH of the wash water was lowered to a pH of 3.5 to remove the remaining Ca.

Next, the REO product was subjected to an acid wash. This was conducted by placing the REO product in 1 L of deionized water and the pH was lowered using 3M nitric acid until a pH value of 3.5 was obtained. During this procedure, a notable effervesces occurred as the pH lowered. After washing and drying of the residual solid material, a noticeable loss of mass was observed as the sample was reduced from 68. g to 13.8 g. ICP-MS analysis confirmed the majority of the Ca was removed.

Figure 21:
FIG. 21 shows a photographic image of a representative Mixed Rare Earth Oxide (MREO) product with 62% grade produced by an example process as disclosed herein.

FIG. 21 shows the resulting rare earth oxide product produced the ALSX plant. The material consisted of a fine powder that was slightly gray in color.

Example 5: Economic Analysis

The nominal AMD feed rate of the disclosed plant is 500 gpm with a maximum capacity of 1,000 gpm. Ideal REE production is projected to be 1,000 kg MREO/year or 110 g MREO/hr. The plant treats all of the approximately 456 tons of acid load in the AMD stream per year with an estimated lime consumption cost of $65,000/year. At a contained value of $237/kg MREO, the annual yield can generate annual revenue of about $237,000, which is more than enough to cover the cost of AMD treatment. The plant is configured so that its AMD treatment train can operate independently and without performance degradation regardless of whether the REE recovery process is operating on a given day. In one aspect, the disclosed processes allow the plant's operator to maintain its Clean Water Act compliance obligations independently of REE recovery.

In addition to treating AMD and generating a preconcentrate, the disclosed plant includes a continuous acid leaching/solvent extraction train at its downstream end that can produce a MREO grade exceeding 90%. Production capacity is estimated to equal 15.5 g MREO/hour (Table 17).

TABLE 17

Estimated MREO Production for Proposed Facility.

| Upstream Concentrator | | |
|---|---|---|
| Product Grade | 1% | MREO |
| Recovery | 90% | |
| Upstream Concentrate | 803.6 | kg MREO/year |
| | 82.6 | g MREO/hour |
| ALSX | | |
| Product Grade | 90% | MREO |
| Recovery | 75% | |
| Ideal Yield | 61.9 | g MREO/hour |
| Availability | 25% | |
| Estimated Yield | 15.5 | g MREO/hour |

In some cases, the REE resource at individual AMD treatment sites and individual AMD sludge ponds may be limited. Results from a regional survey showed that the REE flux from an average AMD outfall is only 400 kg/year, while the average sludge pond contains less than 10,000 kg REE in total. In some aspects, neither of these values are large enough to justify a commercial-scale REE concentration and refining plant at a single AMD treatment site. However, in some aspects, a dispersed network of on-site handling operations can be integrated to feed a centralized ALSX system. In a feasibility study, it was shown that a 2,100 TPD ALSX facility processing raw AMD sludge has the potential to produce an IRR of 37% and a net present value of $80 million over a 20-year operating period. The total capital cost for this plant is $46 million and the operating cost is $141/kg.

Figure 7A:
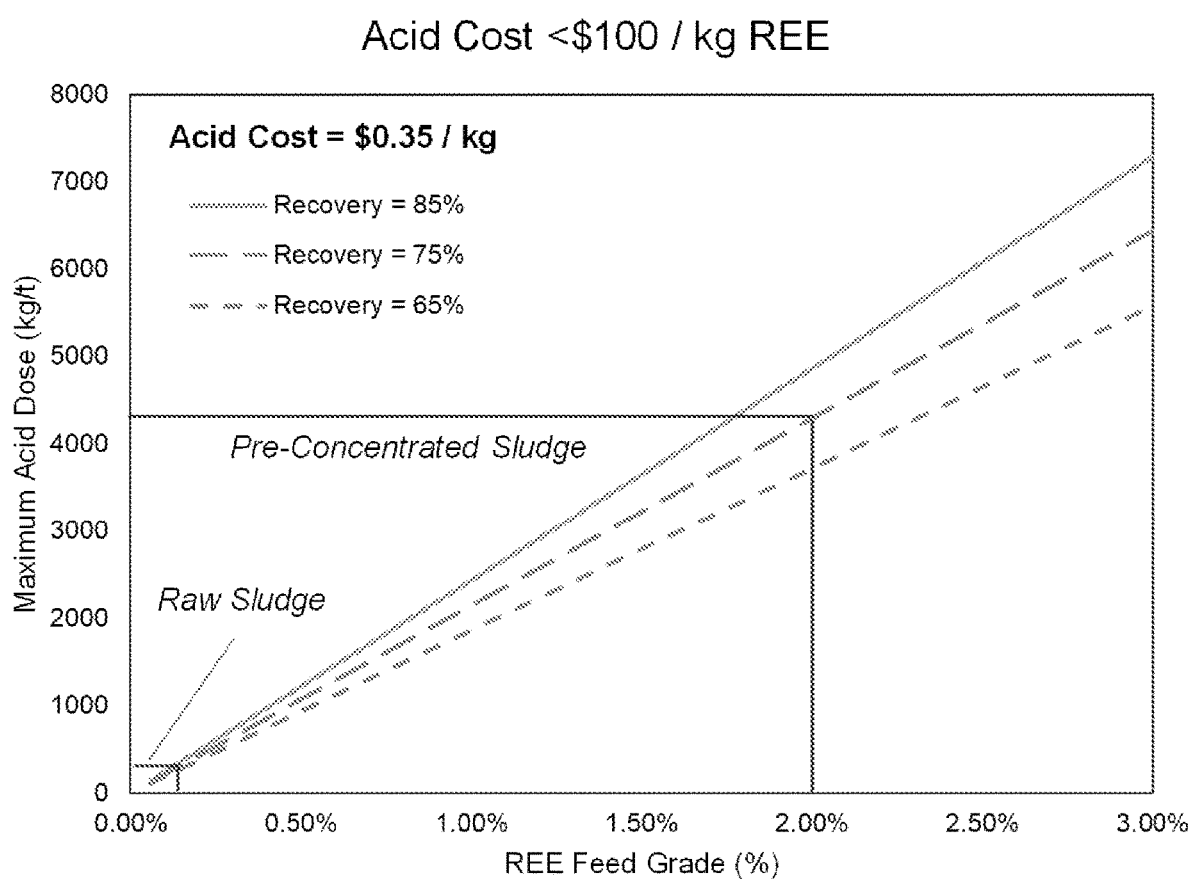
FIGS. 7A-7B show representative sensitivity analyses of disclosed processes.
Figure 7B:
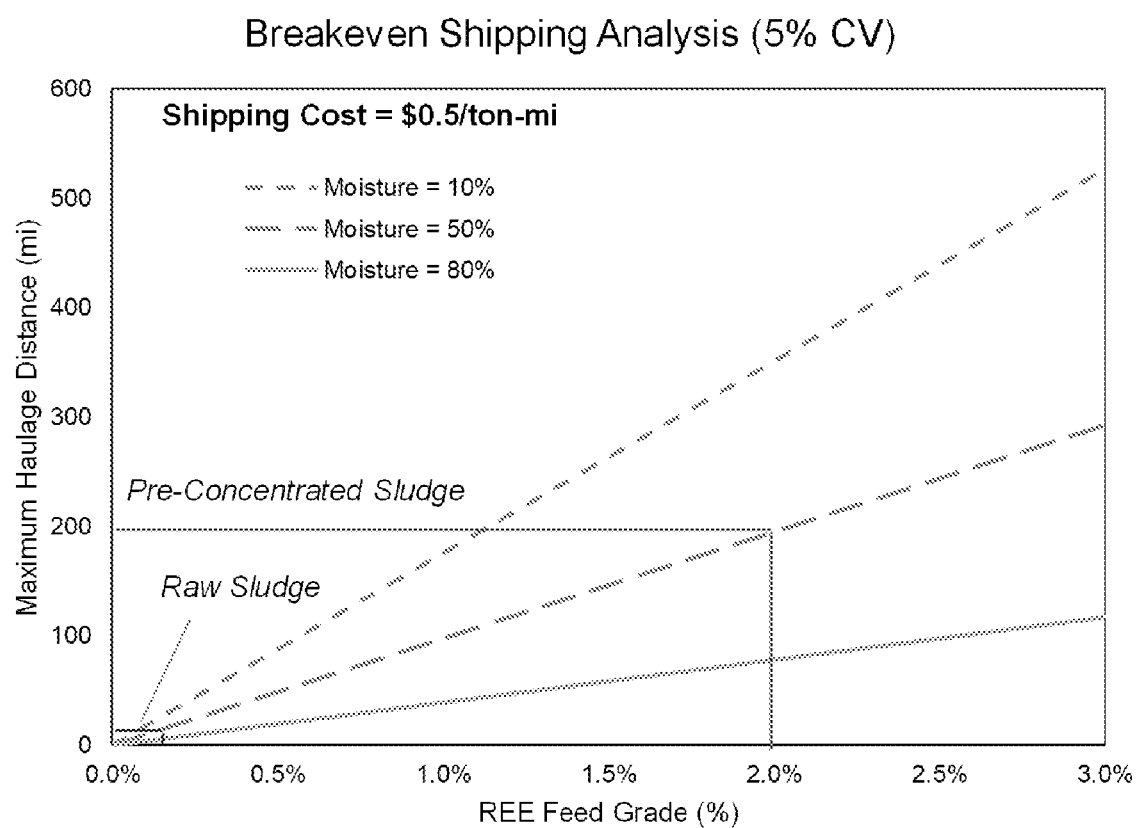

A detailed techno-economic analysis showed that these favorable results are sensitive to sludge acid consumption and sludge feed moisture. For example, FIG. 7 (top) shows the maximum possible acid dose required to keep the total acid cost below an economic threshold of $100/kg as a function of REE feed grade and leaching recovery. As shown, raw sludge (~0.6% REE, ~75% recovery) can only be processed in a cost-effective manner if the maximum acid dose is on the order of 100 to 150 kg/t. FIG. 7 (bottom) shows a similar analysis whereby the maximum haulage distance needed to keep the total shipping cost below 5% of the feedstock contained value (CV) has been determined as a function of feed grade and feed moisture. For raw sludge (0.6% REE, 50-80% moisture), the maximum haulage distance is nearly negligible—less than 10-15 miles.

Traditional compliance-based treatment of AMD tends to push both the sludge acid consumption and the sludge moisture to unfavorable values. Many AMD treatment operators tend to overdose lime addition to avoid non-compliant discharges. This practice leaves large quantities of unreacted lime in the final precipitate, and this base must be fully consumed during the acid leaching step of treatment processes at a significant cost to the REE producer. Moreover, traditional sludge drying cells are ineffective at reducing sludge moisture, and many of the sludge samples evaluated in our prior studies have values exceeding 80-90%. Both issues are problematic for commercialization as they reduce the number of viable sludge sites that meet thresholds for economic viability. Sludge samples that do not meet the economic thresholds are considered stranded resources and are not considered relevant to a regional production scenario. When taken together these results indicate that the hypothetical 2,100 tons per day (TPD) ALSX plant described herein may have difficulty identifying a sufficient quantity of raw sludge feedstock that meet these criteria. A reduction in total plant throughput will inevitably lead to a proportional reduction in economic outcomes.

However, the upstream concentration process described herein offers a comprehensive solution to these issues. Most significantly, the upstream concentrator will increase the grade of the ALSX feed by rejecting iron and aluminum during the standard water treatment process. FIG. 7 shows the drastic influence that the increased feedstock grade will have on maximum acid dose (>4,000 kg/t) and maximum haulage distance (increased to >200 miles). In addition to the simple grade increase, the upstream concentrator provides better pH control technology to mitigate the acid consumption issues associated with overdosed lime addition; moreover, the use of GEOTUBE® will assist in reducing product moisture. All these factors substantially reduce ALSX processing costs, while simultaneously increasing the quantity of feedstock meeting the economic thresholds. If widely implemented across the Appalachian region, the AMD/REE pre-concentration plants will ensure a consistent and reliable supply of feedstock for ALSX operations.

This techno-economic analysis (TEA) has used standard economic guidelines provided by NETL and incorporates the most recent process knowledge regarding the disclosed ALSX process. Since the upstream concentrator can be easily integrated into existing AMD treatment technologies, the capital and operating costs for this process are assumed to be external to the REE producing entity and are not included in the analysis; however, an additional $50/t feedstock acquisition cost is included to account for any additional reagent addition, capitalization expenses, or handling needed to deliver the pre-concentrate to the ALSX plant. The results of this analysis are shown in Table 18 for a nominal 175 TPD plant.

TABLE 18

Economic Indicators for Commercial ALSX System.

| Economic Parameter | Value |
| --- | --- |
| Plant feed rate/grade | 175 TPD at 2% REE |
| Product rate/grade | 2 TPD at 90% MREO |
| Operating period | 20 years; 10% discount rate |
| REE basket price | $147/kg |
| REE recovery | 59% |
| Plant capital expenses | $20 million |
| Plant operating expenses | $54/kg |
| Net present value | $80 million |
| Internal rate of return | 61% |
| Payback period | 1.5 operating years |

Figure 8:
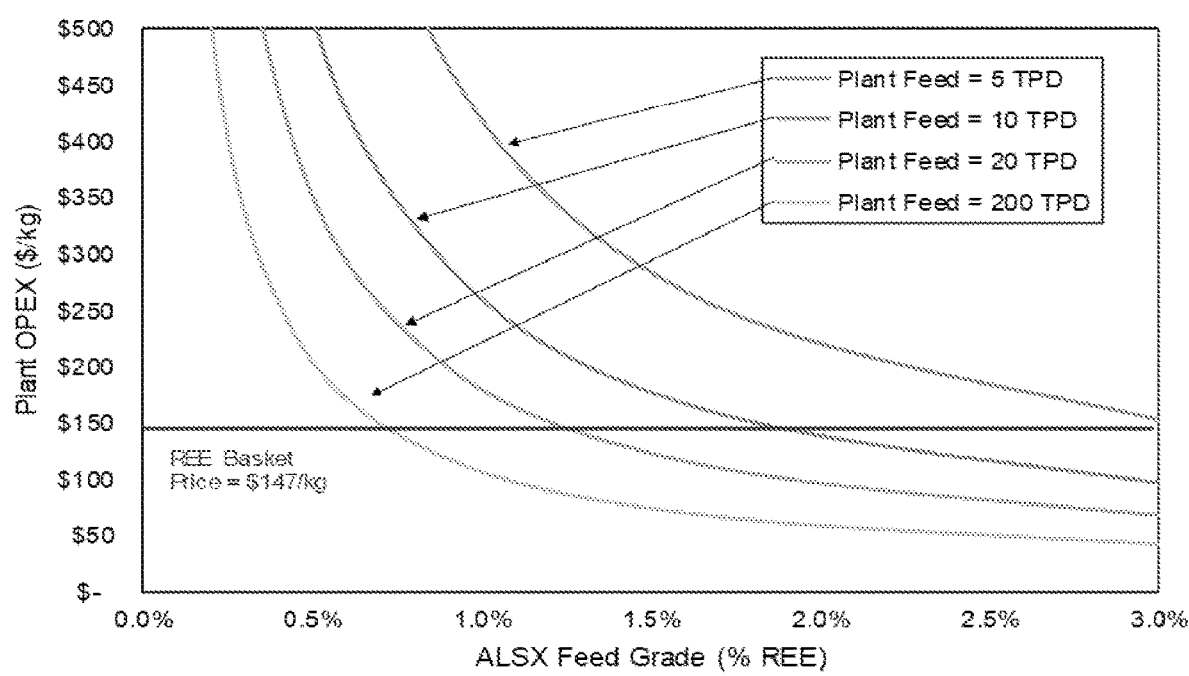
FIG. 8 shows sensitivity analyses of Acid Leaching/Solvent Extraction (ALSX) operating cost as a function of plant size and feed grade.

The results confirm the economic gains inherent to the upstream concentration prior to ALSX. Compared to the prior scenario, which treated raw sludge, the current model output shows that a similar NPV ($80 million) can be achieved at a much smaller overall plant size (175 TPD vs. 2,100 TPD). The smaller plant also entails a much lower capital cost and a lower operating cost, $20 million and $54/kg REE respectively. While both scenarios have been shown to be economically favorable, the pre-concentrated route is much more viable from a commercial perspective, owing to the smaller feedstock requirement and reduced capital cost. Both of these items reduce overall project risk and are thus more favorable for investment. In addition, FIG. 8 shows a sensitivity analysis of operating cost with respect to both feed grade and plant size. As shown, for most plant sizes, the largest incremental reduction in operating cost is achieved.

Other matters pertaining to commercialization include permitting and regulatory factors, downstream refining capacity, and REE pricing factors. Wastes from the disclosed processes can be easily integrated into the existing infrastructure without the need for new permits. This outcome is also desirable for commercialization, as it minimizes the startup time needed to initiate new projects. With regard to refining capacity, the US currently has no domestic facilities that can produce refined REE products from mixed REOs. In one aspect, disclosed herein is the generation of REO concentrates, which can be used in downstream refining studies. With regard to pricing, all of the economic results in Table 17 have been determined using a price discount of 50% relative to the standard oxide prices provided by NETL. This price discount accounts for charges from downstream refining and also indicates that the process can still be profitable despite price volatility.

Example 6: Removal of Gangue Elements

Removal of gangue elements in an AMD feedstock during preparation of a disclosed PLS using the foregoing methods is further illustrated in Table 19 below. The data therein shows that at the first pH step 712, aluminum and iron are significantly removed, and at the second pH step 718, REE and cobalt are removed from the aqueous phase, i.e., the effluent 724, and are recovered in the REE-enriched pre-concentrate.

TABLE 19

Removal of Gangue Elements.

| | | Aqueous phase AQ65 | | |
|---|---|---|---|---|
| Analyte | | Raw Water | pH 4.7 | pH 8.5 |
| Al | mg/L | 25.5 | 2.3 | 0.1 |
| Fe | mg/L | 0.701 | 0.018 | 0.053 |
| Mn | mg/L | 11.8 | 10.6 | 9.3 |
| Ni | mg/L | 0.4 | 0.4 | 0.3 |
| Si | mg/L | 9.1 | 8.1 | 6.0 |
| Zn | mg/L | 1.2 | 1.1 | 0.0 |
| Ca | mg/L | 70.2 | 119.0 | 133.1 |
| Mg | mg/L | 38.1 | 37.0 | 37.1 |
| Na | mg/L | 1.6 | 1.6 | 1.7 |
| $SO_4$ | mg/L | 494.5 | 497.9 | 483.6 |
| Cl | mg/L | 0.0 | 0.0 | 0.4 |
| total | mg/L | 653.1 | 678.1 | 671.7 |
| Sc | ug/L | 5.6 | 0.9 | 0.1 |
| Y | ug/L | 174.5 | 157.0 | 0.3 |
| La | ug/L | 40.0 | 37.8 | 0.3 |
| Ce | ug/L | 89.8 | 79.8 | 0.1 |
| Pr | ug/L | 19.0 | 17.9 | 0.0 |
| Nd | ug/L | 98.0 | 89.0 | 0.2 |
| Sm | ug/L | 27.3 | 24.4 | 0.0 |
| Eu | ug/L | 6.9 | 6.2 | 0.0 |
| Gd | ug/L | 41.0 | 36.3 | 0.0 |
| Tb | ug/L | 5.9 | 5.3 | 0.0 |
| D | ug/L | 31.9 | 27.9 | 0.0 |
| Ho | ug/L | 6.1 | 5.3 | 0.0 |
| Er | ug/L | 16.1 | 13.7 | 0.0 |
| Tm | ug/L | 2.0 | 1.7 | 0.0 |
| Yb | ug/L | 11.1 | 9.2 | 0.0 |
| Lu | ug/L | 1.6 | 1.3 | 0.0 |
| TREE | ug/L | 576.8 | 513.7 | 1.1 |
| Co | mg/L | 0.4 | 0.4 | 0.2 |
| TREE + Co | mg/L | 577.3 | 514.1 | 1.3 |

The disclosed process results in removal of gangue elements at the first pH step 712, e.g., aluminum, iron, and silicon; while concentrating REE and cobalt in the pre-concentrate after the second pH step 718.

Example 7: Preparation of Hydraulic Pre-Concentrate (HPC) from Raw Acid Mine Drainage (AMD) Water An approximately 5,000 gallon load of untreated acid mine drainage (AMD) comprising ~1.2 mg/L total rare earth elements and ~409 mg/L total major metals (Al, Fe, Si, Co, Mn, Ca, Mg, Ni, S) at pH 3.4 was transported from the A-34 site. Table 19 provides data obtained from a detailed assay of raw water, i.e., untreated AMD. A portion of the 5,000 gallon raw water, i.e., a 1,000 gallon batch of untreated AMD, was adjusted to pH 4.5 using a hydrated lime slurry utilizing the follow approach. Briefly, the raw water was placed in a 1,100-gallon tank (Clarifier #1) equipped with a Endress Hauser Liquiline CM 448 pH meter and a Sew-Euro drive paddle mixer. While mixing occurred, the Liquiline pH meter communicated with a Cole Parmer Master Flex L/S peristaltic pump to add lime slurry at a rate of 150 mL/min (26 g lime/liter of water) until the pH 4.5 was obtained. When pH 4.5 was obtained and stabilized, the mixing was stopped and the solids were allowed to settle to the tank bottom by gravity for approximately 1 hour. The supernatant, referred to as the pH 4.5 supernatant, comprised the liquid above the settled solids and was determined to have a ~82% reduction in aluminum (11.8 mg/L), a ~98% reduction in iron (0.1 mg/L), and a ~17% reduction in silica (14.6 mg/L) based on the amounts previously determined to be present in the untreated water. It was further determined that approximately 99% of the rare earth elements remained in the pH 4.5 supernatant. The solids (sludge) were removed from Clarifier #1 and were sent to a final disposal area.

TABLE 20

Levels of Various Metals in Untreated AMD.

| Elements | Units | Untreated AMD |
|---|---|---|
| Al | mg/L | 64.3 |
| Ca | mg/L | 197.0 |
| Co | mg/L | 0.8 |
| Fe | mg/L | 3.8 |
| Mg | mg/L | 93.3 |
| Mn | mg/L | 24.2 |
| Na | mg/L | 3.9 |
| Ni | mg/L | 0.9 |
| Si | mg/L | 17.6 |
| Zn | mg/L | 2.6 |
| TMM | mg/L | 408.5 |
| Sc | mg/L | 0.0 |
| Y | mg/L | 0.3 |
| La | mg/L | 0.1 |
| Ce | mg/L | 0.2 |
| Pr | mg/L | 0.0 |
| Nd | mg/L | 0.2 |
| Sm | mg/L | 0.1 |
| Eu | mg/L | 0.0 |
| Gd | mg/L | 0.1 |
| Tb | mg/L | 0.0 |
| Dy | mg/L | 0.1 |
| Ho | mg/L | 0.0 |
| Er | mg/L | 0.0 |
| Tm | mg/L | 0.0 |
| Yb | mg/L | 0.0 |
| Lu | mg/L | 0.0 |
| TREE | mg/L | 1.2 |

The pH 4.5 supernatant was further processed to remove rare earth elements from solution. Briefly, the 4.5 pH supernatant was transferred to a rectangular shaped clarifier. This unit was scaled at a 1:10 ratio and constructed to model the design from the A-34 site clarifier design. This scaled clarifier comprises a rapid mix tank (4.5"×4.5"×12.5") equipped with a Fisher Scientific jumbo stand mixer, a slow mix tank (24"×12"×11.5") equipped with Caframo stand mixer and a clarifier tank (120"×17.75"×14.5"). The slow mix tank was equipped with a Endress Hauser Liquiline CM 448 pH meter that communicated with a Cole Parmer Master Flex US peristaltic pump. The pH 4.5 supernatant was pumped into the clarifier continuously at rate of 1 gpm via a Cole Parmer Master Flex UP peristaltic pump. The peristaltic pump in communication with the Liquiline pH meter pumped lime slurry (26 g lime/L of water) into the rapid mix tank at a rate of approximately 15 mL/min to obtain and maintain a pH 8.5, i.e., forming the pH 8.5 solution. A polymer flocculent, PE 6070 polymer (Phoenix Solutions, LLC), was added to the rapid mix tank using a Cole Parmer Master Flex US peristaltic pump and was added at a rate of 1 mL/min. The polymer flocculant solution was prepared by adding 2 mL of neat PE 6070 to one liter of processed water, resulting in a 2 ppm polymer solution, that was used in an amount of 0.25 mL PE 6070 solution per liter of pH 8.5 solution. The rapid mixed water was flowed across a weir uniformly to the slow mix tank. Without wishing to be bound by a particular theory, it is believed that the larger slow mix tank reduced the water velocity to allow the pH induced particles to agglomerate. Without wishing to be bound by a particular theory, it is further believed that the internal baffle also added to the agglomeration by forcing the floc particles to dive through the slurry solution to allow additional contact with the floc particles. The agglomerated particles cross the weir uniformly to the clarifier. The solids settled in a parabolic curve to the bottom of the clarifier in 15 minutes or less after exiting the slow mix tank. The settled supernatant was decanted from the clarifier's exit port and discarded as treated water. The settled solids, i.e., the hydraulic pre-concentrate (HPC), were retained and removed via a port in the sump bottom of the clarifier along with a portion of the supernatant in order to minimize solids loss. Approximately 98% of the rare earth elements and the remainder of the total major metals were determined to be recovered to the solids. Approximately 83% of the calcium (247.9 mg/L), ~63% of the magnesium (61.8 mg/L), ~56% of the manganese (14.1 mg/L), and ~39% of the Silica (5.7 mg/L) remained in the effluent water that reports to the clarifier's discharge point.

Example 8: Processing of Hydraulic Pre-Concentrate (HPC) to Form Dewatered HPC

Forty gallons of saturated settled solids, i.e., hydraulic pre-concentrate (HPC) prepared as described above in Example 7, were transferred to a 50-gallon Tamco 60° cone bottom tank (primary cone tank) for dewatering. The HPC entered the cone tank was determined to have a solids concentration of ~0.2% solids. Following 1 hour of settling by gravity, the solids content reached ~1% solids in the settled material. Approximately 20 gallons of supernatant water was decanted through a port installed in the side of the cone tank as clean water and was discarded. Ten gallons of the 20 gallons of the settled solids were transferred to a 10-gallon (secondary cone tank) Ace Roto-Mold 60° cone bottom tank. This slurry settled for approximately 1 hour. Following the solids settling, approximately 2 gallons of supernatant water was removed as clean water through a port installed in the side of the tank. The resulting dewatered HPC, i.e., settled solids slurry retained in the cone bottom tank had a solids content of ~1.4%.

Example 9: PLS Preparation

Approximately 738 mL of the dewatered HPC comprising 1.4% solids HPC slurry, prepared as described above in Example 8, was transferred to a 1000 mL glass beaker equipped with a Caframo stand mixer and Mettler Toledo bench top pH meter. The dewatered HPC was acid leached with ACS grade (93%) sulfuric acid. Approximately 8.2 mL of sulfuric acid was added dropwise with a plastic dropper until the pH stabilized at pH 3.0. Two mL of the 2 ppm PE 6070 polymer solution (prepared as described above) was added per liter of the sulfuric acid treated dewatered HPC with mixing in order to flocculate the acid leached residual solids. The solution mixed for 5 minutes after the flocculent solution addition, then was allowed to settle for 20 minutes after mixing was stopped. The REE enriched supernatant was removed via a pump and filtered through a 1-micron pore size bag filter assembly to ensure no solids transferred to the next process step, i.e., a first filtered REE enriched supernatant. The flocculated acid leached residuals (PLS entrained tank bottoms) were then filtered through the 1-micron pore size bag filter assembly to capture additional liquid PLS, i.e., a second filtered REE enriched supernatant. The first filtered REE enriched supernatant and the second filtered REE enriched supernatant to form the enriched PLS filtrate. Analysis of the enriched PLS filtrate indicated a 93% recovery of rare earth elements from the dewatered HPC material with a TREE concentration of 83 mg/L. The full elemental composition of the enriched PLS filtrate and recovery of elements from HPC to PLS can be found in Table 21 below.

TABLE 21

Recovery—HPC to PLS.

| Elements | Units | pH 3.0 PLS | % Recovery from HPC to PLS |
|---|---|---|---|
| Al | mg/L | 1,050.5 | 78% |
| Ca | mg/L | 449.5 | 96% |
| Co | mg/L | 40.6 | 90% |
| Fe | mg/L | 0.6 | 1% |
| Mg | mg/L | 396.9 | 98% |
| Mr | mg/L | 317.9 | 73% |
| Na | mg/L | 5.0 | N/A |
| Ni | mg/L | 30.2 | 76% |
| Si | mg/L | 641.7 | 73% |
| Zn | mg/L | 177.1 | N/A |
| TMM | mg/L | 3,069.5 | 79% |
| Sc | mg/L | 0.3 | N/A |
| Y | mg/L | 23.7 | 97% |
| La | mg/L | 5.7 | 98% |
| Ce | mg/L | 10.8 | 77% |
| Pr | mg/L | 2.9 | 96% |
| Nd | mg/L | 15.4 | 97% |
| Sm | mg/L | 4.6 | 96% |
| Eu | mg/L | 1.1 | 96% |
| Gd | mg/L | 6.7 | 96% |
| Tb | mg/L | 1.0 | 97% |
| Dy | mg/L | 5.1 | 96% |
| Ho | mg/L | 1.0 | 96% |
| Er | mg/L | 2.6 | 96% |
| Tm | mg/L | 0.3 | 96% |
| Yb | mg/L | 1.7 | 95% |
| Lu | mg/L | 0.2 | 96% |
| TREE | mg/L | 83.0 | 93% |

The enriched PLS filtrate (736 mL) was transferred to a second 1000 mL glass beaker containing a Caframo mixer and a Mettler Toledo bench top pH meter. Approximately 5 mL of 20% ammonium hydroxide was added to the beaker to raise the pH to remove additional major metals. The ammonium hydroxide was added dropwise with a plastic syringe to the PLS while mixing until the pH reached pH 4.4 The resulting residual generated through neutralization was flocculated by addition, with mixing, of two mL of the 2 ppm PE 6070 polymer solution (prepared as described above) per liter to ammonium hydroxide treated enriched PLS filtrate.

Following flocculent solution addition, mixing was stopped and the solution was allowed to settle for 1 hour, then the supernatant was removed with a pump. The flocculated neutralization residuals were filtered with a bag filtration unit through a 1-micron filter media to form the neutralized enriched PLS filtrate, which was transferred to a PLS storage tank. Analysis of the neutralized enriched PLS filtrate indicated that 89% of the aluminum and 82% of the silica was removed from the enriched PLS filtrate as precipitated solid. No measurable rare earths were lost due to the neutralization. The neutralized enriched PLS filtrate can be further processed as needed. An elemental analysis of the neutralized enriched PLS filtrate can be found in Table 22 below.

TABLE 22

Levels of Metals in Neutralized PLS.

| Elements | Units | Neutralized PLS |
| --- | --- | --- |
| Al | mg/L | 115.6 |
| Ca | mg/L | 494.5 |
| Co | mg/L | 43.4 |
| Fe | mg/L | 0.1 |
| Mg | mg/L | 420.7 |
| Mn | mg/L | 324.3 |
| Na | mg/L | 0.0 |
| Ni | mg/L | 29.9 |
| Si | mg/L | 115.5 |
| Zn | mg/L | 159.3 |
| TMM | mg/L | 1,703.2 |
| Sc | mg/L | 0.0 |
| Y | mg/L | 23.4 |
| La | mg/L | 5.8 |
| Ce | mg/L | 10.1 |
| Pr | mg/L | 2.9 |
| Nd | mg/L | 16.0 |
| Sm | mg/L | 4.2 |
| Eu | mg/L | 1.0 |
| Gd | mg/L | 6.3 |
| Tb | mg/L | 0.8 |
| Dy | mg/L | 4.4 |
| Ho | mg/L | 0.8 |
| Er | mg/L | 2.2 |
| Tm | mg/L | 0.2 |
| Yb | mg/L | 1.2 |
| Lu | mg/L | 0.1 |
| TREE | mg/L | 82.6 |

Example 10: PLS Preparation—Variation of Acid

The method described above in Example 9 was followed in the studies described herein following, but with modification of the acid used and/or pH endpoint that the acid was used to adjust to. Except as noted in the following, the method of Example 9 was followed in all respects using the same dewatered HPC comprising 1.4% solids HPC slurry, prepared as described above in Example 8.

Variation 1: The dewatered HPC was acid leached with 6M HCl instead of ACS grade (93%) sulfuric acid as described in Example 9. The 6M HCl was added until the pH stabilized at pH 3.0. Following this acid leaching step, the rest of the method described in Example 9 was followed. Using HCl as the leachate, it was determined that a 93% recovery of rare earth elements from the dewatered HPC material was obtained with a TREE concentration of 87 mg/L at pH 3.0.

Variation 2: The dewatered HPC was acid leached with 68% nitric acid instead of ACS grade (93%) sulfuric acid as described in Example 9. The 68% nitric acid was added until the pH stabilized at pH 3.0. Following this acid leaching step, the rest of the method described in Example 9 was followed. Using 68% nitric acid as the leachate, it was determined that a 93% recovery of rare earth elements from the dewatered HPC material was obtained with a TREE concentration of 84 mg/L at pH 3.0.

Variation 3: The dewatered HPC was acid leached with ACS grade (93%) sulfuric acid as described in Example 9, but the sulfuric acid was added until the pH stabilized at pH 3.5 instead of pH 3.0. Under these conditions, it was determined that a 89% recovery of rare earth elements from the dewatered HPC material was obtained with a TREE concentration of 72 mg/L at pH 3.5. It should be noted that the sulfuric acid usage decreased from 11.1 g/L to 7.4 g/L by leaching to pH 3.5 instead of pH 3.0.

Example 11: PLS Preparation—Variation of Neutralization Conditions

The method described above in Example 9 was followed in the studies described herein following, but with modification of the base used and/or pH endpoint that the base was used to adjust to in the neutralization step. Except as noted in the following, the method of Example 9 was followed in all respects using a similar dewatered HPC that was prepared as described above in Example 8.

Variation 1: In a variation from Example 9, instead of using 20% ammonium hydroxide to neutralize the solution, a 50% sodium hydroxide solution was used as the neutralizing agent. Under these conditions, it was determined that ~88% of the aluminum and ~69% of the silica was precipitated from acid solution. No measurable rare earths were lost to the solid formed by neutralizing with sodium hydroxide at pH 4.4.

Variation 2: The procedure of Example 9 was followed using the same neutralizing solution, i.e., 20% ammonium hydroxide, except that the pH was adjusted to pH 4.0 instead of pH 4.4. Under these conditions, it was determined that ~53% of the aluminum and 49% of the silica were precipitated during the neutralization step. No measurable rare earths were lost to the solid formed by neutralizing at pH 4.0.

Example 12: PLS Preparation—Reproducibility

The method described above in Example 9 was followed in the studies described herein following in all respects using the same dewatered HPC comprising 1.4% solids HPC slurry, prepared as described above in Example 8. Each of the following represents an independent run of the method to determine reproducibility of the disclosed method.

In a second trial of Example 9 that matched the original conditions and process from the test above results determined that with a 1.5% solids dewatered HPC, acid leaching to pH 3 with sulfuric acid yielded a 95% rare earth element recovery with a TREE concentration of 106 mg/L. Furthermore, when the resulting PLS was neutralized with ammonium hydroxide 97% of the aluminum and 75% of the silica was precipitated out of the solution. No measurable rare earth elements were lost to the solid formed through neutralization.

In a third trial of Example 9 that matched the original conditions and process from the test above results determined that with a 1.4% solids dewatered HPC, acid leaching to pH 3 with sulfuric acid yielded an 82% rare earth recovery with a TREE concentration of 105 mg/L Furthermore, when the resulting PLS was neutralized with ammonium hydroxide 85% of the aluminum and 89% of the silica was precipitated out of the solution. No measurable rare earth elements were lost to the solid formed through neutralization.

The foregoing demonstrated the good reproducibility of REE recovery and TREE concentration.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for preparing a hydraulic pre-concentrate, the method comprising:
   (a) contacting a raw material with a first base in an amount sufficient to adjust the pH to a value from about 4.0 to about 6.0, thereby forming a mixture comprising a first aqueous phase and a first solid concentrate;
   (b) separating the first aqueous phase from the first solid concentrate, thereby forming a separated first aqueous phase;
   (c) contacting the separated first aqueous phase with a second base in an amount sufficient to adjust the pH to a value from about 7.0 to about 9.0, thereby forming a mixture comprising a second aqueous phase and a hydraulic pre-concentrate;
   (d) removing the second aqueous phase and collecting the hydraulic pre-concentrate;
   wherein the raw material comprises rare earth elements; and
   wherein the hydraulic pre-concentrate is enriched in rare earth elements and critical minerals.

2. The method of claim 1, wherein the raw material comprises acid mine drainage associated with a coal mine, a hard rock mine, or combinations thereof.

3. The method of claim 2, wherein the hydraulic pre-concentrate is prepared at or proximal to the coal mine, the hard rock mine, or combinations thereof.

4. The method of claim 1, wherein the raw material comprises raw acid mine drainage (AMD), an AMD precipitate (AMDp), an enriched AMD precipitate (eAMDp), or combinations thereof.

5. The method of claim 1, wherein the raw material has a pH less than about 4.0.

6. The method of claim 1, wherein the first base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

7. The method of claim 6, wherein the first base comprises calcium hydroxide.

8. The method of claim 1, wherein the contacting the raw material with the first base is in an amount sufficient to adjust the pH to a value from about 4.0 to about 4.5.

9. The method of claim 1, further comprising oxidation; and wherein oxidation is mechanical oxidation, electrochemical oxidation, chemical oxidation, or combinations thereof.

10. The method of claim 9, wherein oxidation comprises adding an oxidizing agent to the raw material and the first base.

11. The method of claim 10, wherein the oxidizing agent comprises a peroxide, ozone, a permanganate, or combinations thereof.

12. The method of claim 1, wherein the second base comprises a base selected from ammonium hydroxide, sodium hydroxide, potassium hydroxide, calcium hydroxide, magnesium hydroxide, ammonium carbonate, sodium carbonate, potassium carbonate, calcium carbonate, magnesium carbonate, and a combination thereof.

13. The method of claim 12, wherein the second base comprises calcium hydroxide.

14. The method of claim 1, wherein the contacting the separated first aqueous phase with the second base is in an amount sufficient to adjust the pH to a value from about 8.0 to about 8.5.

15. The method of claim 1, wherein the removing the second aqueous phase and collecting the hydraulic pre-concentrate carried out using a clarifier, a settlement basin, a flexible planar geotextile fabric of woven or nonwoven construction, or combinations thereof.

16. The method of claim 1, further comprising:
   (e) transferring the hydraulic pre-concentrate to a geosynthetic geobag; and
   (f) conditioning the hydraulic pre-concentrate in a first conditioning tank for a period of time sufficient and a temperature suitable for the solids concentration in the geosynthetic geobag to increase from about 1.1-fold to about 15-fold compared to the solids concentration of the hydraulic pre-concentrate.

17. The method of claim 1, further comprising:
   (e) transferring the hydraulic pre-concentrate to a first conditioning tank; and
   (f) conditioning the hydraulic pre-concentrate in the first conditioning tank for a period of time sufficient and a temperature suitable for the solids concentration in the lower sloped portion to increase from about 1.1-fold to about 15-fold compared to the solids concentration of the hydraulic pre-concentrate;
   thereby forming in the lower portion of a conditioning tank a first conditioned hydraulic pre-concentrate.

18. The method of claim 17, wherein the period of time sufficient and the temperature suitable for the solids concentration in the lower sloped portion to reach a first conditioned pre-hydraulic solids concentration; wherein the first conditioned pre-hydraulic solids concentration is increased from about 1.2-fold to about 10-fold compared to the solids concentration of the hydraulic pre-concentrate; wherein the period of time is from about 10 min to about 72 hours; and wherein the temperature is from about 5° C. to about 50° C.

19. The method of claim 1, further comprising collecting the first conditioned hydraulic pre-concentrate; wherein the collecting further comprises:
   (g) transferring the first condition hydraulic pre-concentrate to a second conditioning tank; and
   (h) condition the first conditioned hydraulic pre-concentrate in the second conditioning tank for a period of time sufficient and at a temperature suitable for the solids concentration in the lower sloped portion to increase from about 1.1-fold to about 5-fold compared to the solids concentration of the first conditioned hydraulic pre-concentrate;
   thereby forming in the lower portion of the second conditioning tank a second conditioned hydraulic pre-concentrate.

20. The method of claim 19, wherein the period of time sufficient and the temperature suitable for the solids concentration in the lower sloped portion to increase from about 1.2-fold to about 5-fold compared to the solids concentration of the hydraulic pre-concentrate is a period of time from about 30 min to about 72 hours at a temperature from about 5° C. to about 50° C.

21. A method for preparing a pregnant leach solution, the method comprising:
   transferring the first conditioned hydraulic pre-concentrate of claim 17 or the second conditioned hydraulic pre-concentrate of claim 19 to a mixing tank; and
   adding a first acid to the mixing tank in an amount sufficient to adjust the pH from about 2.0 to about 4.0, thereby forming the pregnant leach solution;

wherein the first acid is mixed with the first conditioned hydraulic pre-concentrate or the second conditioned hydraulic pre-concentrate as the first acid is added.

22. The method of claim 21, wherein the first acid is a mineral acid.

23. The method of claim 22, wherein the mineral acid comprises a mineral acid selected from nitric acid, hydrochloric acid, phosphoric acid, sulfuric acid, sulfurous acid, and combinations thereof.

24. The method of claim 21, further comprising adding a flocculating agent, coagulating agent, or combinations thereof to: (a) the first conditioned hydraulic pre-concentrate; and/or (b) the second conditioned hydraulic pre-concentrate.

25. The method of 21, further comprising neutralizing the pregnant leach solution by contacting the pregnant leach solution with a third base in an amount sufficient to raise the pH of the pregnant leach solution to a pH of from about 4.5 to 5.0, thereby forming a neutralized pregnant leach solution.

26. The method of claim 1, further comprising adding a flocculating agent, coagulating agent, or combinations thereof to: (a) the mixture comprising the first aqueous phase and the first solid concentrate; and/or (b) the mixture comprising the second aqueous phase and the hydraulic pre-concentrate.

* * * * *